United States Patent
Woop et al.

(10) Patent No.: US 11,069,118 B2
(45) Date of Patent: Jul. 20, 2021

(54) TEMPORAL DATA STRUCTURES IN A RAY TRACING ARCHITECTURE

(71) Applicant: INTEL CORPORATION, Santa Clara, CA (US)

(72) Inventors: Sven Woop, Völklingen (DE); Attila Afra, Satu Mare (SE); Carsten Benthin, Voelklingen (DE); Ingo Wald, Salt Lake City, UT (US); Johannes Guenther, Munich (DE)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 16/749,856

(22) Filed: Jan. 22, 2020

(65) Prior Publication Data
US 2020/0160583 A1 May 21, 2020

Related U.S. Application Data

(62) Division of application No. 15/477,035, filed on Apr. 1, 2017, now Pat. No. 10,553,010.

(51) Int. Cl.
*G06T 15/00* (2011.01)
*G06T 15/06* (2011.01)
(Continued)

(52) U.S. Cl.
CPC .............. *G06T 15/005* (2013.01); *G06T 1/20* (2013.01); *G06T 15/06* (2013.01); *G06T 17/00* (2013.01); *G09G 2360/00* (2013.01)

(58) Field of Classification Search
CPC ......... G06T 15/005; G06T 1/20; G06T 15/06; G06T 17/005; G06T 2210/12;
(Continued)

(56) References Cited

U.S. PATENT DOCUMENTS 5,579,455 A 11/1996 Greene et al.
6,111,582 A 8/2000 Jenkins
(Continued)

OTHER PUBLICATIONS

Gribel et al., "High-Quality Spatio-Temporal Rendering using Semi-Analytical Visibility", ACM Transactions on Graphics, vol. 30, No. 4, Article 54, Jul. 2011, pp. 54:1-54:11.
(Continued)

*Primary Examiner* — Abderrahim Merouan
(74) *Attorney, Agent, or Firm* — Nicholson De Vos Webster & Elliott LLP

(57) ABSTRACT

A graphics processing apparatus comprising bounding volume hierarchy (BVH) construction circuitry to perform a spatial analysis and temporal analysis related to a plurality of input primitives and responsively generate a BVH comprising spatial, temporal, and spatial-temporal components that are hierarchically arranged, wherein the spatial components include a plurality of spatial nodes with children, the spatial nodes bounding the children using spatial bounds, and the temporal components comprise temporal nodes with children, the temporal nodes bounding their children using temporal bounds and the spatial-temporal components comprise spatial-temporal nodes with children, the spatial-temporal nodes bounding their children using spatial and temporal bounds; and ray traversal/intersection circuitry to traverse a ray or a set of rays through the BVH in accordance with the spatial and temporal components.

8 Claims, 31 Drawing Sheets

(51) Int. Cl.
*G06T 1/20* (2006.01)
*G06T 17/00* (2006.01)

(58) Field of Classification Search
CPC ... G06T 15/50; G06T 15/506; G06T 2210/52; G06T 2210/61; G06T 2200/28; G06T 15/08; G06T 11/40; G06T 15/40; G06T 2200/04; G06T 2207/20021; G06T 2210/21; G06T 15/00; G06F 17/30327; G09G 2360/00; G09G 2360/06

See application file for complete search history.

(56) References Cited

U.S. PATENT DOCUMENTS

| | | | |
|---|---|---|---|
| 6,556,200 | B1 | 4/2003 | Pfister et al. |
| 8,339,398 | B2 | 12/2012 | Shearer |
| 8,411,088 | B2 | 4/2013 | Sevastianov et al. |
| 8,791,945 | B2 | 7/2014 | Clarberg et al. |
| 9,064,346 | B2 | 6/2015 | Ha et al. |
| 9,430,863 | B1 | 8/2016 | Grunschloss et al. |
| 2008/0043018 | A1 | 2/2008 | Keller et al. |
| 2008/0180440 | A1 | 7/2008 | Stich |
| 2008/0259075 | A1 | 10/2008 | Fowler et al. |
| 2009/0167763 | A1* | 7/2009 | Waechter ............ G06T 15/06 345/426 |
| 2009/0256845 | A1 | 10/2009 | Sevastianov et al. |
| 2010/0185984 | A1 | 7/2010 | Wright et al. |
| 2010/0289799 | A1 | 11/2010 | Hanka et al. |
| 2012/0330620 | A1 | 12/2012 | Sullivan et al. |
| 2013/0016109 | A1* | 1/2013 | Garanzha ............ G06F 12/0897 345/501 |
| 2013/0328875 | A1 | 12/2013 | Burley et al. |
| 2015/0279092 | A1* | 10/2015 | Ganestam ............ G06T 15/005 345/419 |
| 2016/0085510 | A1 | 3/2016 | Hwang et al. |
| 2016/0260193 | A1 | 9/2016 | Richards et al. |
| 2016/0299910 | A1* | 10/2016 | Mokbel ................ G06F 16/29 |
| 2017/0061673 | A1 | 3/2017 | Park et al. |
| 2017/0178387 | A1 | 6/2017 | Woop et al. |
| 2017/0228920 | A1 | 8/2017 | Peterson et al. |
| 2018/0082466 | A1 | 3/2018 | Akenine-Moller et al. |

OTHER PUBLICATIONS

Grunschlob et al., "MSBVH: An Efficient Acceleration Data Structure for Ray Traced Motion Blur," Proceedings of the ACM SIGGRAPH Symposium on High Performance Graphics, Aug. 2011, pp. 65-70.

Hou et al., "Micropolygon Ray Tracing with Defocus and Motion Blur," ACM Transactions on Graphics, vol. 29, No. 4, Article 64, Jul. 2010, pp. 64:1-64:10.

Non-Final Office Action, U.S. Appl. No. 15/477,035, dated Jun. 6, 2019, 21 pages.

Notice of Allowance, U.S. Appl. No. 15/477,035, dated Sep. 24, 2019, 9 pages.

Olsson, Jens, "Ray-Tracing Time-Continuous Animations using 4D KD-Trees," Master's Thesis, Lund University, 2007, pp. 1-30.

Requirement for Restriction/Election, U.S. Appl. No. 15/477,035, dated Nov. 29, 2018, 6 pages.

* cited by examiner

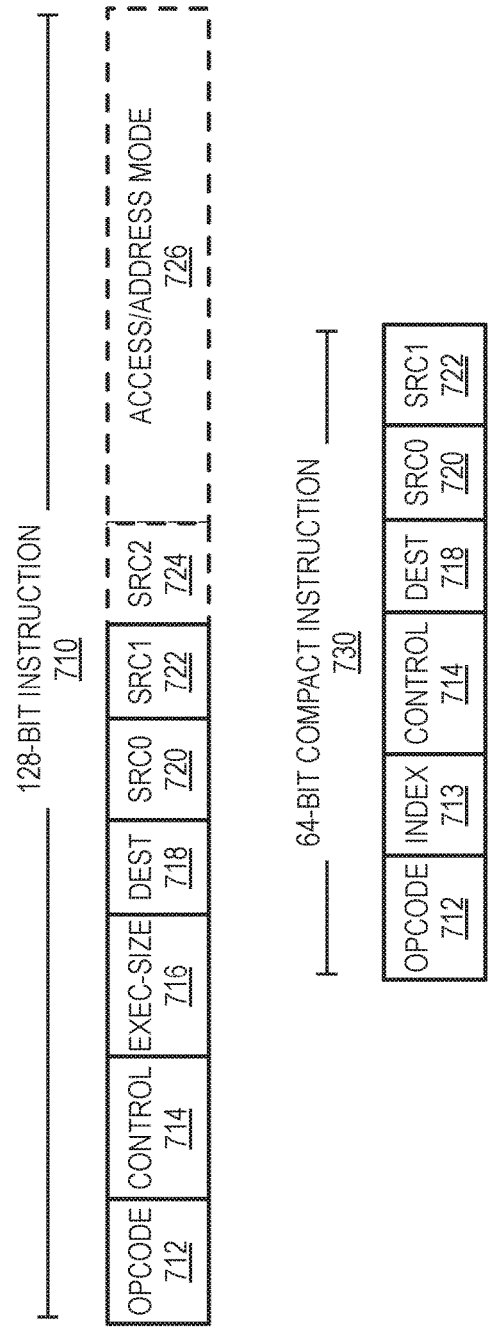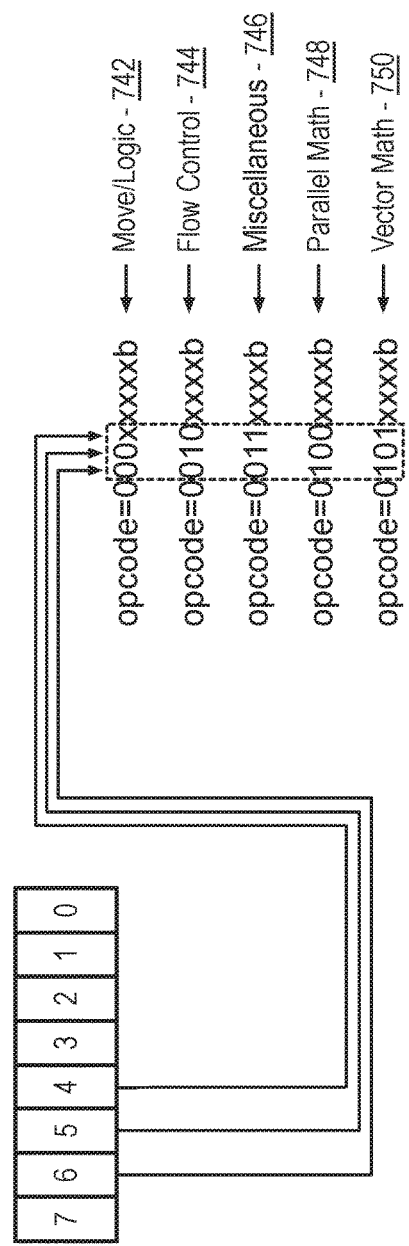
FIG. 7

TEMPORAL DATA STRUCTURES IN A RAY TRACING ARCHITECTURE

CROSS-REFERENCE TO RELATED APPLICATIONS

This application is a divisional of application Ser. No. 15/477,035, filed Apr. 1, 2017, which is hereby incorporated by reference.

TECHNICAL FIELD

This invention relates generally to the field of computer processors. More particularly, the invention relates to a ray tracing apparatus and method utilizing both spatial and temporal data structures.

BACKGROUND ART

Ray tracing is a graphics processing technique for generating an image by traversing the path of each light ray through pixels in an image plane and simulating the effects of its incidence upon different objects. Following traversal calculations, each ray is typically tested for intersection with some subset of the objects in the scene. Once the nearest object has been identified, the incoming light at the point of intersection is estimated, the material properties of the object are determined, and this information is used to calculate the final color of the pixel.

Ray tracing is a time consuming part of movie production rendering. When dealing with dynamic content, rendering of motion blur is essential for high visual quality, but also very challenging. In particular, the preferred method for rendering movies today is Monte Carlo path tracing, which handles motion blur by integrating over the camera's shutter time; i.e., any ray being traced has a certain "time" associated with it. This in turn complicates the job of the underlying ray tracing kernel in that it has to find the proper intersection for the given time stored with the ray (different rays will have different time stamps). For objects that are moving quickly (such as rotor blades, etc.) the respective primitives' locations can vary significantly over the time the shutter is open, making it significantly harder for the ray tracer to quickly find which primitives may intersect the given ray at that point in time.

BRIEF DESCRIPTION OF THE DRAWINGS

A better understanding of the present invention can be obtained from the following detailed description in conjunction with the following drawings, in which:

FIG. 7 illustrates a graphics processor execution unit instruction format according to an embodiment;

DETAILED DESCRIPTION

In the following description, for the purposes of explanation, numerous specific details are set forth in order to provide a thorough understanding of the embodiments of the invention described below. It will be apparent, however, to one skilled in the art that the embodiments of the invention may be practiced without some of these specific details. In other instances, well-known structures and devices are shown in block diagram form to avoid obscuring the underlying principles of the embodiments of the invention.

Exemplary Graphics Processor Architectures and Data Types

System Overview

Figure 1:
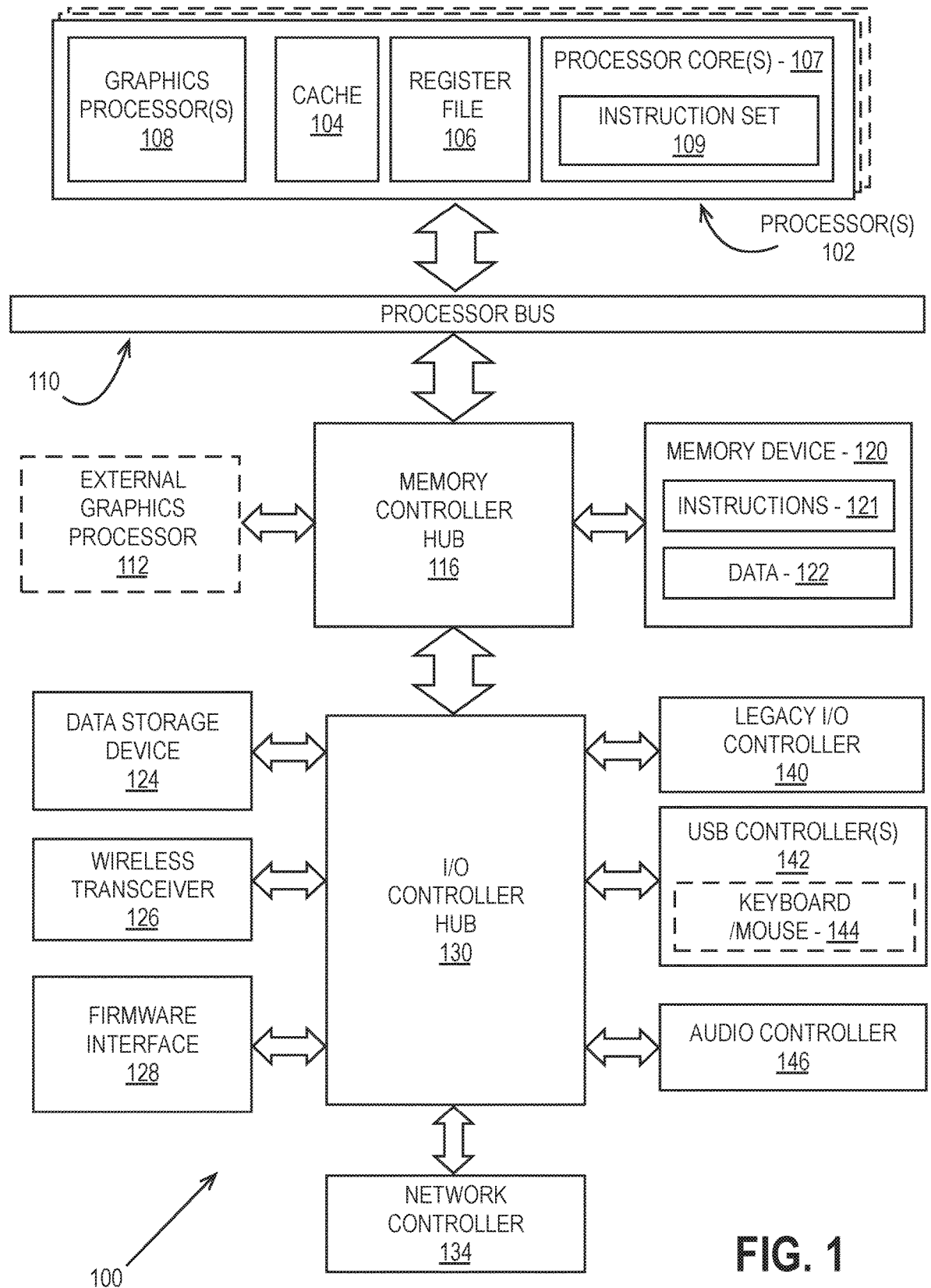
FIG. 1 is a block diagram of an embodiment of a computer system with a processor having one or more processor cores and graphics processors.

FIG. 1 is a block diagram of a processing system 100, according to an embodiment. In various embodiments the system 100 includes one or more processors 102 and one or more graphics processors 108, and may be a single processor desktop system, a multiprocessor workstation system, or a server system having a large number of processors 102 or processor cores 107. In one embodiment, the system 100 is a processing platform incorporated within a system-on-a-chip (SoC) integrated circuit for use in mobile, handheld, or embedded devices.

An embodiment of system 100 can include, or be incorporated within a server-based gaming platform, a game console, including a game and media console, a mobile gaming console, a handheld game console, or an online game console. In some embodiments system 100 is a mobile phone, smart phone, tablet computing device or mobile Internet device. Data processing system 100 can also include, couple with, or be integrated within a wearable device, such as a smart watch wearable device, smart eyewear device, augmented reality device, or virtual reality device. In some embodiments, data processing system 100 is a television or set top box device having one or more processors 102 and a graphical interface generated by one or more graphics processors 108.

In some embodiments, the one or more processors 102 each include one or more processor cores 107 to process instructions which, when executed, perform operations for system and user software. In some embodiments, each of the one or more processor cores 107 is configured to process a specific instruction set 109. In some embodiments, instruction set 109 may facilitate Complex Instruction Set Computing (CISC), Reduced Instruction Set Computing (RISC), or computing via a Very Long Instruction Word (VLIW). Multiple processor cores 107 may each process a different instruction set 109, which may include instructions to facilitate the emulation of other instruction sets. Processor core 107 may also include other processing devices, such a Digital Signal Processor (DSP).

In some embodiments, the processor 102 includes cache memory 104. Depending on the architecture, the processor 102 can have a single internal cache or multiple levels of internal cache. In some embodiments, the cache memory is shared among various components of the processor 102. In some embodiments, the processor 102 also uses an external cache (e.g., a Level-3 (L3) cache or Last Level Cache (LLC)) (not shown), which may be shared among processor cores 107 using known cache coherency techniques. A register file 106 is additionally included in processor 102 which may include different types of registers for storing different types of data (e.g., integer registers, floating point registers, status registers, and an instruction pointer register). Some registers may be general-purpose registers, while other registers may be specific to the design of the processor 102.

In some embodiments, processor 102 is coupled with a processor bus 110 to transmit communication signals such as address, data, or control signals between processor 102 and other components in system 100. In one embodiment the system 100 uses an exemplary 'hub' system architecture, including a memory controller hub 116 and an Input Output (I/O) controller hub 130. A memory controller hub 116 facilitates communication between a memory device and other components of system 100, while an I/O Controller Hub (ICH) 130 provides connections to I/O devices via a local I/O bus. In one embodiment, the logic of the memory controller hub 116 is integrated within the processor.

Memory device 120 can be a dynamic random access memory (DRAM) device, a static random access memory (SRAM) device, flash memory device, phase-change memory device, or some other memory device having suitable performance to serve as process memory. In one embodiment the memory device 120 can operate as system memory for the system 100, to store data 122 and instructions 121 for use when the one or more processors 102 executes an application or process. Memory controller hub 116 also couples with an optional external graphics processor 112, which may communicate with the one or more graphics processors 108 in processors 102 to perform graphics and media operations.

In some embodiments, ICH 130 enables peripherals to connect to memory device 120 and processor 102 via a high-speed I/O bus. The I/O peripherals include, but are not limited to, an audio controller 146, a firmware interface 128, a wireless transceiver 126 (e.g., Wi-Fi, Bluetooth), a data storage device 124 (e.g., hard disk drive, flash memory, etc.), and a legacy I/O controller 140 for coupling legacy (e.g., Personal System 2 (PS/2)) devices to the system. One or more Universal Serial Bus (USB) controllers 142 connect input devices, such as keyboard and mouse 144 combinations. A network controller 134 may also couple with ICH 130. In some embodiments, a high-performance network controller (not shown) couples with processor bus 110. It will be appreciated that the system 100 shown is exemplary and not limiting, as other types of data processing systems that are differently configured may also be used. For example, the I/O controller hub 130 may be integrated within the one or more processor 102, or the memory controller hub 116 and I/O controller hub 130 may be integrated into a discreet external graphics processor, such as the external graphics processor 112.

Figure 2:
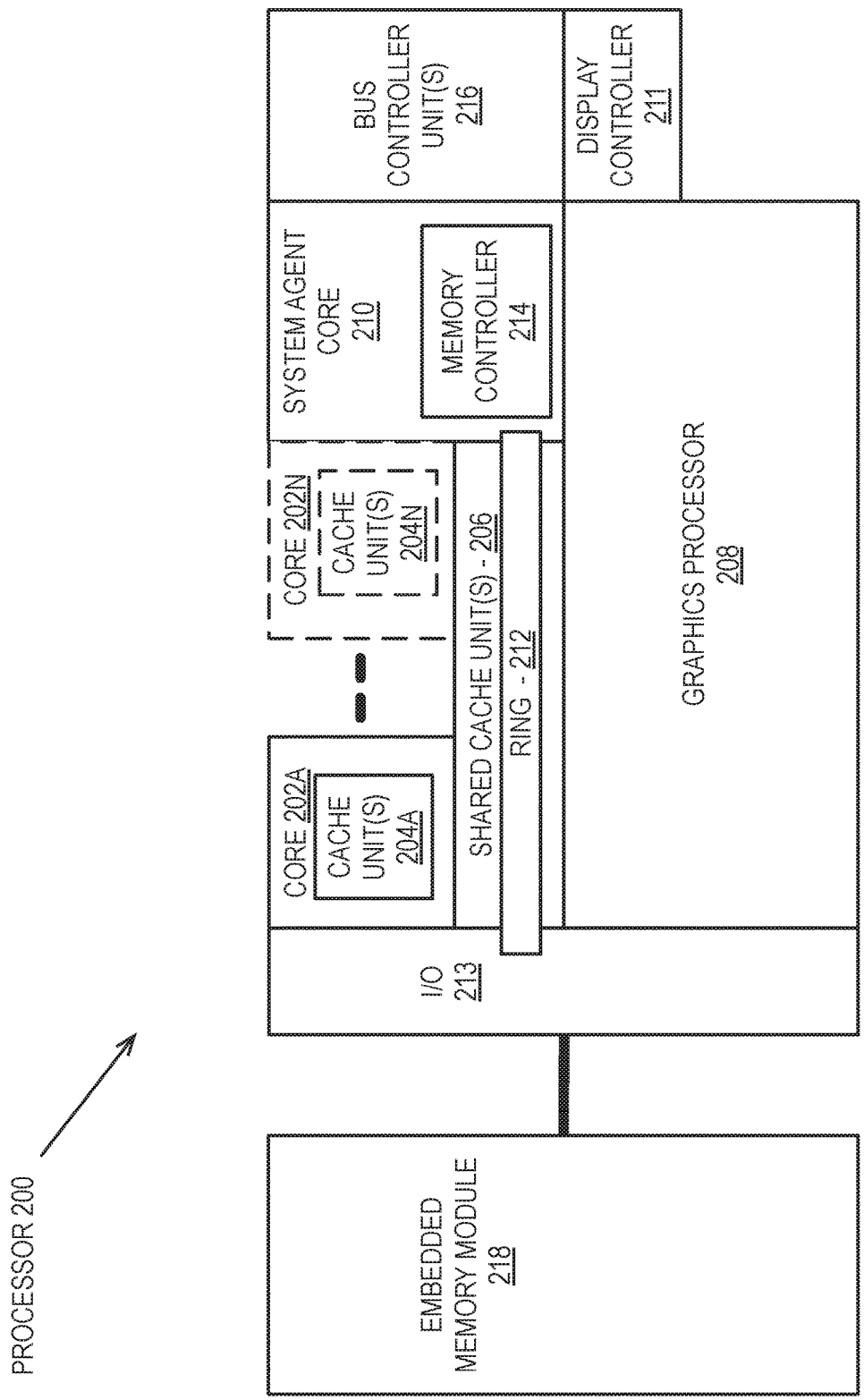
FIG. 2 is a block diagram of one embodiment of a processor having one or more processor cores, an integrated memory controller, and an integrated graphics processor.

FIG. 2 is a block diagram of an embodiment of a processor 200 having one or more processor cores 202A-202N, an integrated memory controller 214, and an integrated graphics processor 208. Those elements of FIG. 2 having the same reference numbers (or names) as the elements of any other figure herein can operate or function in any manner similar to that described elsewhere herein, but are not limited to such. Processor 200 can include additional cores up to and including additional core 202N represented by the dashed lined boxes. Each of processor cores 202A-202N includes one or more internal cache units 204A-204N. In some embodiments each processor core also has access to one or more shared cached units 206.

The internal cache units 204A-204N and shared cache units 206 represent a cache memory hierarchy within the processor 200. The cache memory hierarchy may include at least one level of instruction and data cache within each processor core and one or more levels of shared mid-level cache, such as a Level 2 (L2), Level 3 (L3), Level 4 (L4), or other levels of cache, where the highest level of cache before external memory is classified as the LLC. In some embodiments, cache coherency logic maintains coherency between the various cache units 206 and 204A-204N.

In some embodiments, processor 200 may also include a set of one or more bus controller units 216 and a system agent core 210. The one or more bus controller units 216 manage a set of peripheral buses, such as one or more Peripheral Component Interconnect buses (e.g., PCI, PCI Express). System agent core 210 provides management functionality for the various processor components. In some embodiments, system agent core 210 includes one or more integrated memory controllers 214 to manage access to various external memory devices (not shown).

In some embodiments, one or more of the processor cores 202A-202N include support for simultaneous multi-threading. In such embodiment, the system agent core 210 includes components for coordinating and operating cores 202A-202N during multi-threaded processing. System agent core 210 may additionally include a power control unit (PCU), which includes logic and components to regulate the power state of processor cores 202A-202N and graphics processor 208.

In some embodiments, processor 200 additionally includes graphics processor 208 to execute graphics processing operations. In some embodiments, the graphics processor 208 couples with the set of shared cache units 206, and the system agent core 210, including the one or more integrated memory controllers 214. In some embodiments, a display controller 211 is coupled with the graphics processor 208 to drive graphics processor output to one or more coupled displays. In some embodiments, display controller 211 may be a separate module coupled with the graphics processor via at least one interconnect, or may be integrated within the graphics processor 208 or system agent core 210.

In some embodiments, a ring based interconnect unit 212 is used to couple the internal components of the processor 200. However, an alternative interconnect unit may be used, such as a point-to-point interconnect, a switched interconnect, or other techniques, including techniques well known in the art. In some embodiments, graphics processor 208 couples with the ring interconnect 212 via an I/O link 213.

The exemplary I/O link 213 represents at least one of multiple varieties of I/O interconnects, including an on package I/O interconnect which facilitates communication between various processor components and a high-performance embedded memory module 218, such as an eDRAM module. In some embodiments, each of the processor cores 202A-202N and graphics processor 208 use embedded memory modules 218 as a shared Last Level Cache.

In some embodiments, processor cores 202A-202N are homogenous cores executing the same instruction set architecture. In another embodiment, processor cores 202A-202N are heterogeneous in terms of instruction set architecture (ISA), where one or more of processor cores 202A-202N execute a first instruction set, while at least one of the other cores executes a subset of the first instruction set or a different instruction set. In one embodiment processor cores 202A-202N are heterogeneous in terms of microarchitecture, where one or more cores having a relatively higher power consumption couple with one or more power cores having a lower power consumption. Additionally, processor 200 can be implemented on one or more chips or as an SoC integrated circuit having the illustrated components, in addition to other components.

Figure 3:
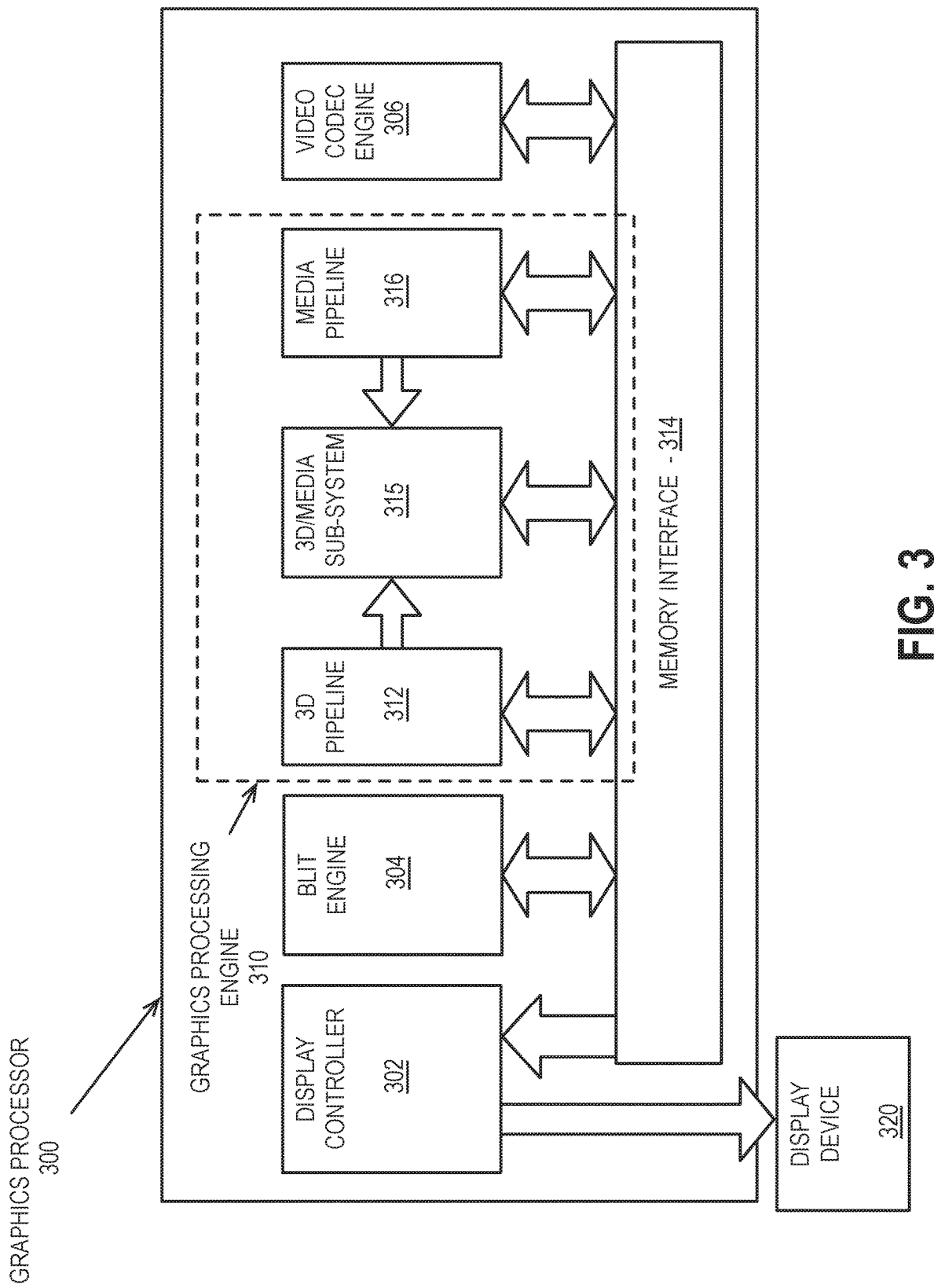
FIG. 3 is a block diagram of one embodiment of a graphics processor which may be a discreet graphics processing unit, or may be graphics processor integrated with a plurality of processing cores.

FIG. 3 is a block diagram of a graphics processor 300, which may be a discrete graphics processing unit, or may be a graphics processor integrated with a plurality of processing cores. In some embodiments, the graphics processor communicates via a memory mapped I/O interface to registers on the graphics processor and with commands placed into the processor memory. In some embodiments, graphics processor 300 includes a memory interface 314 to access memory. Memory interface 314 can be an interface to local memory, one or more internal caches, one or more shared external caches, and/or to system memory.

In some embodiments, graphics processor 300 also includes a display controller 302 to drive display output data to a display device 320. Display controller 302 includes hardware for one or more overlay planes for the display and composition of multiple layers of video or user interface elements. In some embodiments, graphics processor 300 includes a video codec engine 306 to encode, decode, or transcode media to, from, or between one or more media encoding formats, including, but not limited to Moving Picture Experts Group (MPEG) formats such as MPEG-2, Advanced Video Coding (AVC) formats such as H.264/MPEG-4 AVC, as well as the Society of Motion Picture & Television Engineers (SMPTE) 421M/VC-1, and Joint Photographic Experts Group (JPEG) formats such as JPEG, and Motion JPEG (MJPEG) formats.

In some embodiments, graphics processor 300 includes a block image transfer (BLIT) engine 304 to perform two-dimensional (2D) rasterizer operations including, for example, bit-boundary block transfers. However, in one embodiment, 2D graphics operations are performed using one or more components of graphics processing engine (GPE) 310. In some embodiments, GPE 310 is a compute engine for performing graphics operations, including three-dimensional (3D) graphics operations and media operations.

In some embodiments, GPE 310 includes a 3D pipeline 312 for performing 3D operations, such as rendering three-dimensional images and scenes using processing functions that act upon 3D primitive shapes (e.g., rectangle, triangle, etc.). The 3D pipeline 312 includes programmable and fixed function elements that perform various tasks within the element and/or spawn execution threads to a 3D/Media sub-system 315. While 3D pipeline 312 can be used to perform media operations, an embodiment of GPE 310 also includes a media pipeline 316 that is specifically used to perform media operations, such as video post-processing and image enhancement.

In some embodiments, media pipeline 316 includes fixed function or programmable logic units to perform one or more specialized media operations, such as video decode acceleration, video de-interlacing, and video encode acceleration in place of, or on behalf of video codec engine 306. In some embodiments, media pipeline 316 additionally includes a thread spawning unit to spawn threads for execution on 3D/Media sub-system 315. The spawned threads perform computations for the media operations on one or more graphics execution units included in 3D/Media subsystem 315.

In some embodiments, 3D/Media subsystem 315 includes logic for executing threads spawned by 3D pipeline 312 and media pipeline 316. In one embodiment, the pipelines send thread execution requests to 3D/Media subsystem 315, which includes thread dispatch logic for arbitrating and dispatching the various requests to available thread execution resources. The execution resources include an array of graphics execution units to process the 3D and media threads. In some embodiments, 3D/Media subsystem 315 includes one or more internal caches for thread instructions and data. In some embodiments, the subsystem also includes shared memory, including registers and addressable memory, to share data between threads and to store output data.

Graphics Processing Engine

Figure 4:
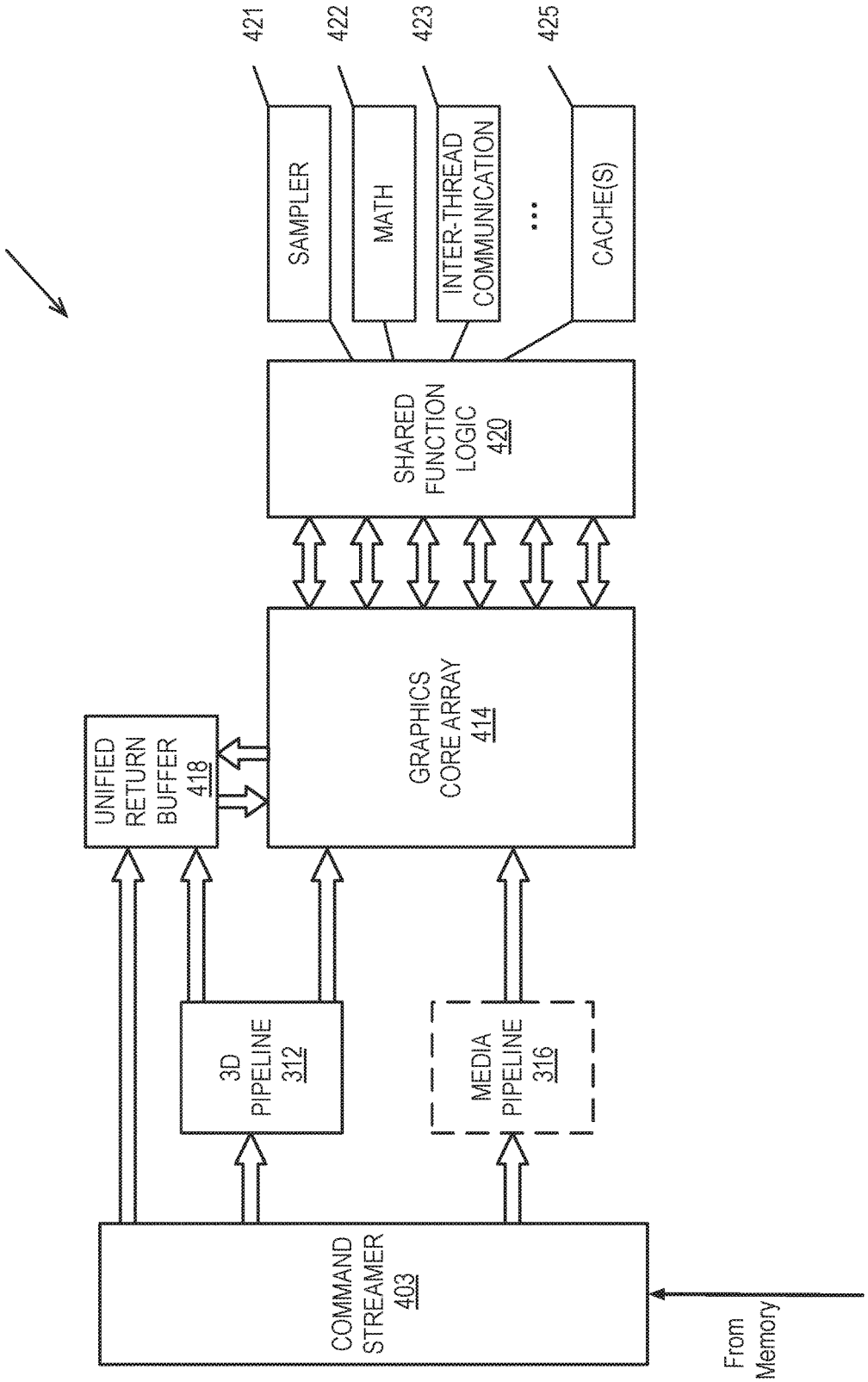
FIG. 4 is a block diagram of an embodiment of a graphics-processing engine for a graphics processor.

FIG. 4 is a block diagram of a graphics processing engine 410 of a graphics processor in accordance with some embodiments. In one embodiment, the graphics processing engine (GPE) 410 is a version of the GPE 310 shown in FIG. 3. Elements of FIG. 4 having the same reference numbers (or names) as the elements of any other figure herein can operate or function in any manner similar to that described elsewhere herein, but are not limited to such. For example, the 3D pipeline 312 and media pipeline 316 of FIG. 3 are illustrated. The media pipeline 316 is optional in some embodiments of the GPE 410 and may not be explicitly included within the GPE 410. For example and in at least one embodiment, a separate media and/or image processor is coupled to the GPE 410.

In some embodiments, GPE 410 couples with or includes a command streamer 403, which provides a command stream to the 3D pipeline 312 and/or media pipelines 316. In some embodiments, command streamer 403 is coupled with memory, which can be system memory, or one or more of internal cache memory and shared cache memory. In some embodiments, command streamer 403 receives commands from the memory and sends the commands to 3D pipeline 312 and/or media pipeline 316. The commands are directives fetched from a ring buffer, which stores commands for the 3D pipeline 312 and media pipeline 316. In one embodiment, the ring buffer can additionally include batch command buffers storing batches of multiple commands. The commands for the 3D pipeline 312 can also include references to data stored in memory, such as but not limited to vertex and geometry data for the 3D pipeline 312 and/or image data and memory objects for the media pipeline 316. The 3D pipeline 312 and media pipeline 316 process the commands and data by performing operations via logic within the respective pipelines or by dispatching one or more execution threads to a graphics core array 414.

In various embodiments the 3D pipeline 312 can execute one or more shader programs, such as vertex shaders, geometry shaders, pixel shaders, fragment shaders, compute shaders, or other shader programs, by processing the instructions and dispatching execution threads to the graphics core array 414. The graphics core array 414 provides a unified block of execution resources. Multi-purpose execution logic (e.g., execution units) within the graphic core array 414 includes support for various 3D API shader languages and can execute multiple simultaneous execution threads associated with multiple shaders.

In some embodiments the graphics core array 414 also includes execution logic to perform media functions, such as video and/or image processing. In one embodiment, the execution units additionally include general-purpose logic that is programmable to perform parallel general purpose computational operations, in addition to graphics processing operations. The general purpose logic can perform processing operations in parallel or in conjunction with general purpose logic within the processor core(s) 107 of FIG. 1 or core 202A-202N as in FIG. 2.

Output data generated by threads executing on the graphics core array 414 can output data to memory in a unified return buffer (URB) 418. The URB 418 can store data for multiple threads. In some embodiments the URB 418 may be used to send data between different threads executing on the graphics core array 414. In some embodiments the URB 418 may additionally be used for synchronization between threads on the graphics core array and fixed function logic within the shared function logic 420.

In some embodiments, graphics core array 414 is scalable, such that the array includes a variable number of graphics cores, each having a variable number of execution units based on the target power and performance level of GPE 410. In one embodiment the execution resources are dynamically scalable, such that execution resources may be enabled or disabled as needed.

The graphics core array 414 couples with shared function logic 420 that includes multiple resources that are shared between the graphics cores in the graphics core array. The shared functions within the shared function logic 420 are hardware logic units that provide specialized supplemental functionality to the graphics core array 414. In various embodiments, shared function logic 420 includes but is not limited to sampler 421, math 422, and inter-thread communication (ITC) 423 logic. Additionally, some embodiments implement one or more cache(s) 425 within the shared function logic 420. A shared function is implemented where the demand for a given specialized function is insufficient for inclusion within the graphics core array 414. Instead a single instantiation of that specialized function is implemented as a stand-alone entity in the shared function logic 420 and shared among the execution resources within the graphics core array 414. The precise set of functions that are shared between the graphics core array 414 and included within the graphics core array 414 varies between embodiments.

Figure 5:
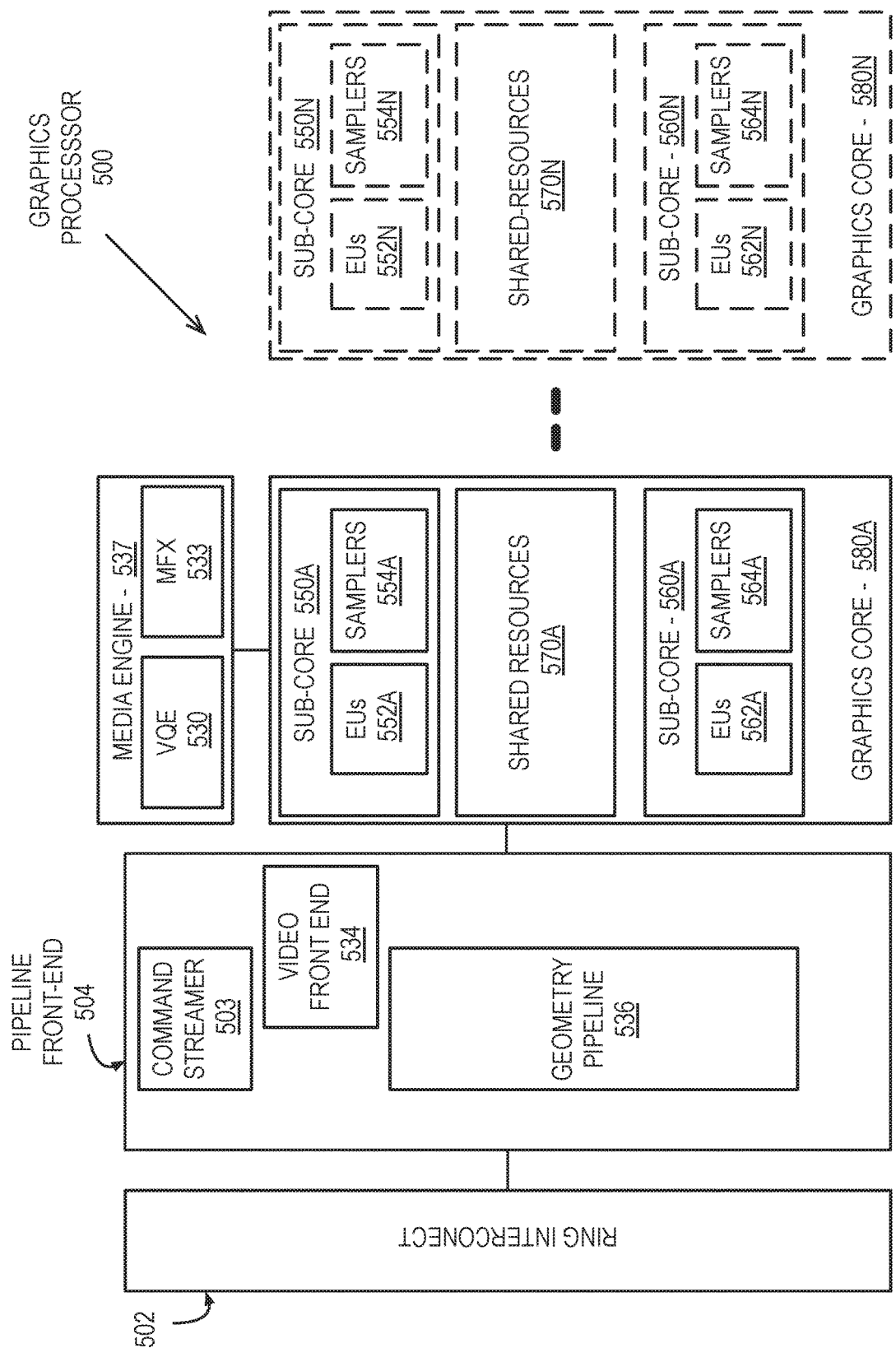
FIG. 5 is a block diagram of another embodiment of a graphics processor.

FIG. 5 is a block diagram of another embodiment of a graphics processor 500. Elements of FIG. 5 having the same reference numbers (or names) as the elements of any other figure herein can operate or function in any manner similar to that described elsewhere herein, but are not limited to such.

In some embodiments, graphics processor 500 includes a ring interconnect 502, a pipeline front-end 504, a media engine 537, and graphics cores 580A-580N. In some embodiments, ring interconnect 502 couples the graphics processor to other processing units, including other graphics processors or one or more general-purpose processor cores. In some embodiments, the graphics processor is one of many processors integrated within a multi-core processing system.

In some embodiments, graphics processor 500 receives batches of commands via ring interconnect 502. The incoming commands are interpreted by a command streamer 503 in the pipeline front-end 504. In some embodiments, graphics processor 500 includes scalable execution logic to perform 3D geometry processing and media processing via the graphics core(s) 580A-580N. For 3D geometry processing commands, command streamer 503 supplies commands to geometry pipeline 536. For at least some media processing commands, command streamer 503 supplies the commands to a video front end 534, which couples with a media engine 537. In some embodiments, media engine 537 includes a Video Quality Engine (VQE) 530 for video and image post-processing and a multi-format encode/decode (MFX) 533 engine to provide hardware-accelerated media data encode and decode. In some embodiments, geometry pipeline 536 and media engine 537 each generate execution threads for the thread execution resources provided by at least one graphics core 580 A.

In some embodiments, graphics processor 500 includes scalable thread execution resources featuring modular cores 580A-580N (sometimes referred to as core slices), each having multiple sub-cores 550A-550N, 560A-560N (sometimes referred to as core sub-slices). In some embodiments, graphics processor 500 can have any number of graphics cores 580A through 580N. In some embodiments, graphics processor 500 includes a graphics core 580A having at least a first sub-core 550A and a second sub-core 560A. In other embodiments, the graphics processor is a low power processor with a single sub-core (e.g., 550A). In some embodiments, graphics processor 500 includes multiple graphics cores 580A-580N, each including a set of first sub-cores 550A-550N and a set of second sub-cores 560A-560N. Each sub-core in the set of first sub-cores 550A-550N includes at least a first set of execution units 552A-552N and media/texture samplers 554A-554N. Each sub-core in the set of second sub-cores 560A-560N includes at least a second set of execution units 562A-562N and samplers 564A-564N. In some embodiments, each sub-core 550A-550N, 560A-560N shares a set of shared resources 570A-570N. In some embodiments, the shared resources include shared cache memory and pixel operation logic. Other shared resources may also be included in the various embodiments of the graphics processor.

Execution Units

Figure 6:
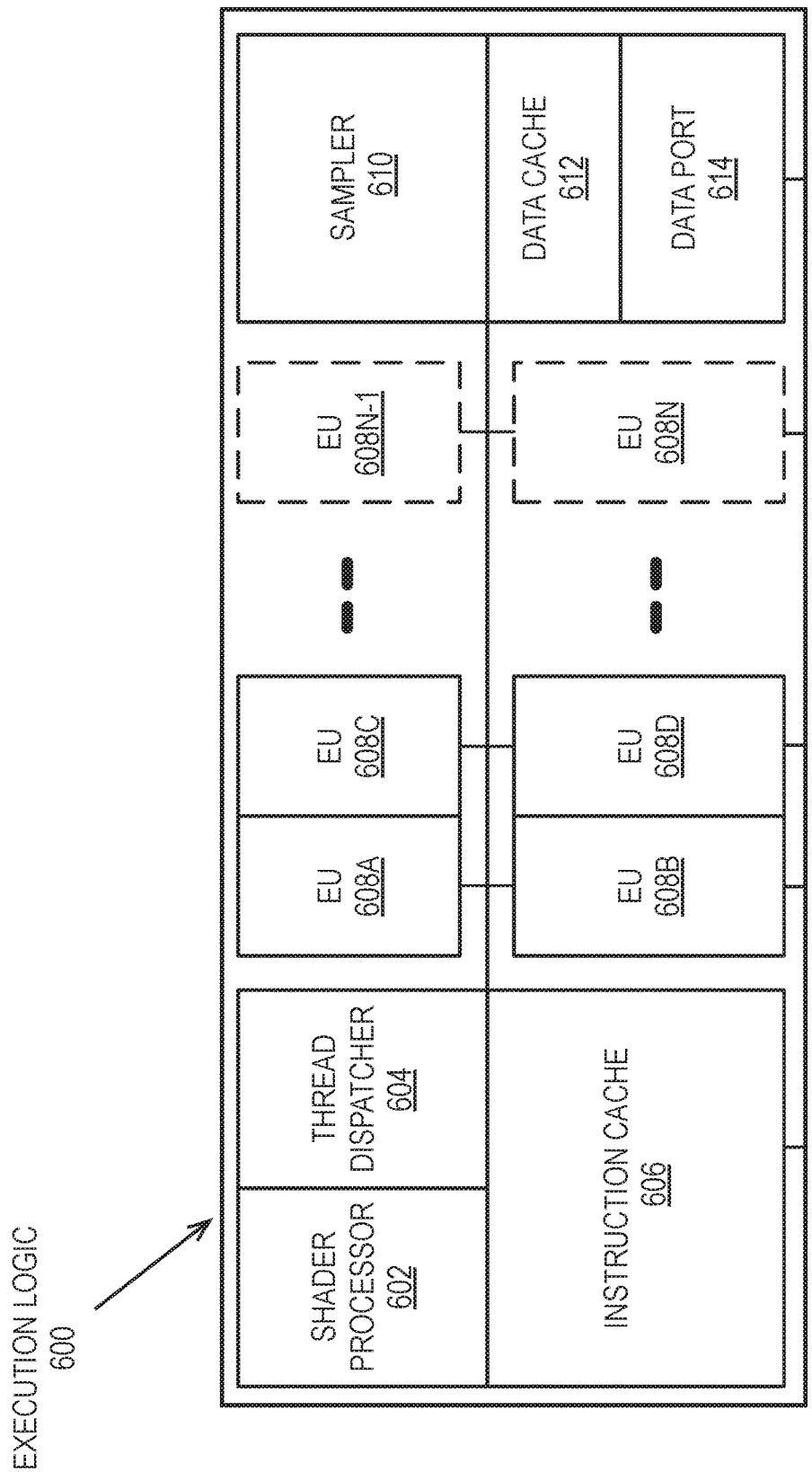
FIG. 6 is a block diagram of thread execution logic including an array of processing elements.

FIG. 6 illustrates thread execution logic 600 including an array of processing elements employed in some embodiments of a GPE. Elements of FIG. 6 having the same reference numbers (or names) as the elements of any other figure herein can operate or function in any manner similar to that described elsewhere herein, but are not limited to such.

In some embodiments, thread execution logic 600 includes a shader processor 602, a thread dispatcher 604, instruction cache 606, a scalable execution unit array including a plurality of execution units 608A-608N, a sampler 610, a data cache 612, and a data port 614. In one embodiment the scalable execution unit array can dynamically scale by enabling or disabling one or more execution units (e.g., any of execution unit 608A, 608B, 608C, 608D, through 608N-1 and 608N) based on the computational requirements of a workload. In one embodiment the included components are interconnected via an interconnect fabric that links to each of the components. In some embodiments, thread execution logic 600 includes one or more connections to memory, such as system memory or cache memory, through one or more of instruction cache 606, data port 614, sampler 610, and execution units 608A-608N. In some embodiments, each execution unit (e.g. 608A) is a stand-alone programmable general purpose computational unit that is capable of executing multiple simultaneous hardware threads while processing multiple data elements in parallel for each thread. In various embodiments, the array of execution units 608A-608N is scalable to include any number individual execution units.

In some embodiments, the execution units 608A-608N are primarily used to execute shader programs. A shader processor 602 can process the various shader programs and dispatch execution threads associated with the shader programs via a thread dispatcher 604. In one embodiment the thread dispatcher includes logic to arbitrate thread initiation requests from the graphics and media pipelines and instantiate the requested threads on one or more execution unit in the execution units 608A-608N. For example, the geometry pipeline (e.g., 536 of FIG. 5) can dispatch vertex, tessellation, or geometry shaders to the thread execution logic 600 (FIG. 6) for processing. In some embodiments, thread dispatcher 604 can also process runtime thread spawning requests from the executing shader programs.

In some embodiments, the execution units 608A-608N support an instruction set that includes native support for many standard 3D graphics shader instructions, such that shader programs from graphics libraries (e.g., Direct 3D and OpenGL) are executed with a minimal translation. The execution units support vertex and geometry processing (e.g., vertex programs, geometry programs, vertex shaders), pixel processing (e.g., pixel shaders, fragment shaders) and general-purpose processing (e.g., compute and media shaders). Each of the execution units 608A-608N is capable of multi-issue single instruction multiple data (SIMD) execution and multi-threaded operation enables an efficient execution environment in the face of higher latency memory accesses. Each hardware thread within each execution unit has a dedicated high-bandwidth register file and associated independent thread-state. Execution is multi-issue per clock to pipelines capable of integer, single and double precision floating point operations, SIMD branch capability, logical operations, transcendental operations, and other miscellaneous operations. While waiting for data from memory or one of the shared functions, dependency logic within the execution units 608A-608N causes a waiting thread to sleep until the requested data has been returned. While the waiting thread is sleeping, hardware resources may be devoted to processing other threads. For example, during a delay associated with a vertex shader operation, an execution unit can perform operations for a pixel shader, fragment shader, or another type of shader program, including a different vertex shader.

Each execution unit in execution units 608A-608N operates on arrays of data elements. The number of data elements is the "execution size," or the number of channels for the instruction. An execution channel is a logical unit of execution for data element access, masking, and flow control within instructions. The number of channels may be independent of the number of physical Arithmetic Logic Units (ALUs) or Floating Point Units (FPUs) for a particular graphics processor. In some embodiments, execution units 608A-608N support integer and floating-point data types.

The execution unit instruction set includes SIMD instructions. The various data elements can be stored as a packed data type in a register and the execution unit will process the various elements based on the data size of the elements. For example, when operating on a 256-bit wide vector, the 256 bits of the vector are stored in a register and the execution unit operates on the vector as four separate 64-bit packed data elements (Quad-Word (QW) size data elements), eight separate 32-bit packed data elements (Double Word (DW) size data elements), sixteen separate 16-bit packed data elements (Word (W) size data elements), or thirty-two separate 8-bit data elements (byte (B) size data elements). However, different vector widths and register sizes are possible.

One or more internal instruction caches (e.g., 606) are included in the thread execution logic 600 to cache thread instructions for the execution units. In some embodiments, one or more data caches (e.g., 612) are included to cache thread data during thread execution. In some embodiments, a sampler 610 is included to provide texture sampling for 3D operations and media sampling for media operations. In some embodiments, sampler 610 includes specialized texture or media sampling functionality to process texture or media data during the sampling process before providing the sampled data to an execution unit.

During execution, the graphics and media pipelines send thread initiation requests to thread execution logic 600 via thread spawning and dispatch logic. Once a group of geometric objects has been processed and rasterized into pixel data, pixel processor logic (e.g., pixel shader logic, fragment shader logic, etc.) within the shader processor 602 is invoked to further compute output information and cause results to be written to output surfaces (e.g., color buffers, depth buffers, stencil buffers, etc.). In some embodiments, a pixel shader or fragment shader calculates the values of the various vertex attributes that are to be interpolated across the rasterized object. In some embodiments, pixel processor logic within the shader processor 602 then executes an application programming interface (API)-supplied pixel or fragment shader program. To execute the shader program, the shader processor 602 dispatches threads to an execution unit (e.g., 608A) via thread dispatcher 604. In some embodiments, pixel shader 602 uses texture sampling logic in the sampler 610 to access texture data in texture maps stored in memory. Arithmetic operations on the texture data and the input geometry data compute pixel color data for each geometric fragment, or discards one or more pixels from further processing.

In some embodiments, the data port 614 provides a memory access mechanism for the thread execution logic 600 output processed data to memory for processing on a graphics processor output pipeline. In some embodiments, the data port 614 includes or couples to one or more cache memories (e.g., data cache 612) to cache data for memory access via the data port.

FIG. 7 is a block diagram illustrating a graphics processor instruction formats 700 according to some embodiments. In one or more embodiment, the graphics processor execution units support an instruction set having instructions in multiple formats. The solid lined boxes illustrate the components that are generally included in an execution unit instruction, while the dashed lines include components that are optional or that are only included in a sub-set of the instructions. In some embodiments, instruction format 700 described and illustrated are macro-instructions, in that they are instructions supplied to the execution unit, as opposed to micro-operations resulting from instruction decode once the instruction is processed.

In some embodiments, the graphics processor execution units natively support instructions in a 128-bit instruction format 710. A 64-bit compacted instruction format 730 is available for some instructions based on the selected instruction, instruction options, and number of operands. The native 128-bit instruction format 710 provides access to all instruction options, while some options and operations are restricted in the 64-bit instruction format 730. The native instructions available in the 64-bit instruction format 730 vary by embodiment. In some embodiments, the instruction is compacted in part using a set of index values in an index field 713. The execution unit hardware references a set of compaction tables based on the index values and uses the compaction table outputs to reconstruct a native instruction in the 128-bit instruction format 710.

For each format, instruction opcode 712 defines the operation that the execution unit is to perform. The execution units execute each instruction in parallel across the multiple data elements of each operand. For example, in response to an add instruction the execution unit performs a simultaneous add operation across each color channel representing a texture element or picture element. By default, the execution unit performs each instruction across all data channels of the operands. In some embodiments, instruction control field 714 enables control over certain execution options, such as channels selection (e.g., predication) and data channel order (e.g., swizzle). For instructions in the 128-bit instruction format 710 an exec-size field 716 limits the number of data channels that will be executed in parallel. In some embodiments, exec-size field 716 is not available for use in the 64-bit compact instruction format 730.

Some execution unit instructions have up to three operands including two source operands, src0 720, src1 722, and one destination 718. In some embodiments, the execution units support dual destination instructions, where one of the destinations is implied. Data manipulation instructions can have a third source operand (e.g., SRC2 724), where the instruction opcode 712 determines the number of source operands. An instruction's last source operand can be an immediate (e.g., hard-coded) value passed with the instruction.

In some embodiments, the 128-bit instruction format 710 includes an access/address mode field 726 specifying, for example, whether direct register addressing mode or indirect register addressing mode is used. When direct register addressing mode is used, the register address of one or more operands is directly provided by bits in the instruction.

In some embodiments, the 128-bit instruction format 710 includes an access/address mode field 726, which specifies an address mode and/or an access mode for the instruction. In one embodiment the access mode is used to define a data access alignment for the instruction. Some embodiments support access modes including a 16-byte aligned access mode and a 1-byte aligned access mode, where the byte alignment of the access mode determines the access alignment of the instruction operands. For example, when in a first mode, the instruction may use byte-aligned addressing for source and destination operands and when in a second mode, the instruction may use 16-byte-aligned addressing for all source and destination operands.

In one embodiment, the address mode portion of the access/address mode field 726 determines whether the instruction is to use direct or indirect addressing. When direct register addressing mode is used bits in the instruction directly provide the register address of one or more operands. When indirect register addressing mode is used, the register address of one or more operands may be computed based on an address register value and an address immediate field in the instruction.

In some embodiments instructions are grouped based on opcode 712 bit-fields to simplify Opcode decode 740. For an 8-bit opcode, bits 4, 5, and 6 allow the execution unit to determine the type of opcode. The precise opcode grouping shown is merely an example. In some embodiments, a move and logic opcode group 742 includes data movement and logic instructions (e.g., move (mov), compare (cmp)). In some embodiments, move and logic group 742 shares the five most significant bits (MSB), where move (mov) instructions are in the form of 0000xxxxb and logic instructions are in the form of 0001xxxxb. A flow control instruction group 744 (e.g., call, jump (jmp)) includes instructions in the form of 0010xxxxb (e.g., 0x20). A miscellaneous instruction group 746 includes a mix of instructions, including synchronization instructions (e.g., wait, send) in the form of 0011xxxxb (e.g., 0x30). A parallel math instruction group 748 includes component-wise arithmetic instructions (e.g., add, multiply (mul)) in the form of 0100xxxxb (e.g., 0x40). The parallel math group 748 performs the arithmetic operations in parallel across data channels. The vector math group 750 includes arithmetic instructions (e.g., dp4) in the form of 0101xxxxb (e.g., 0x50). The vector math group performs arithmetic such as dot product calculations on vector operands.

Graphics Pipeline

Figure 8:
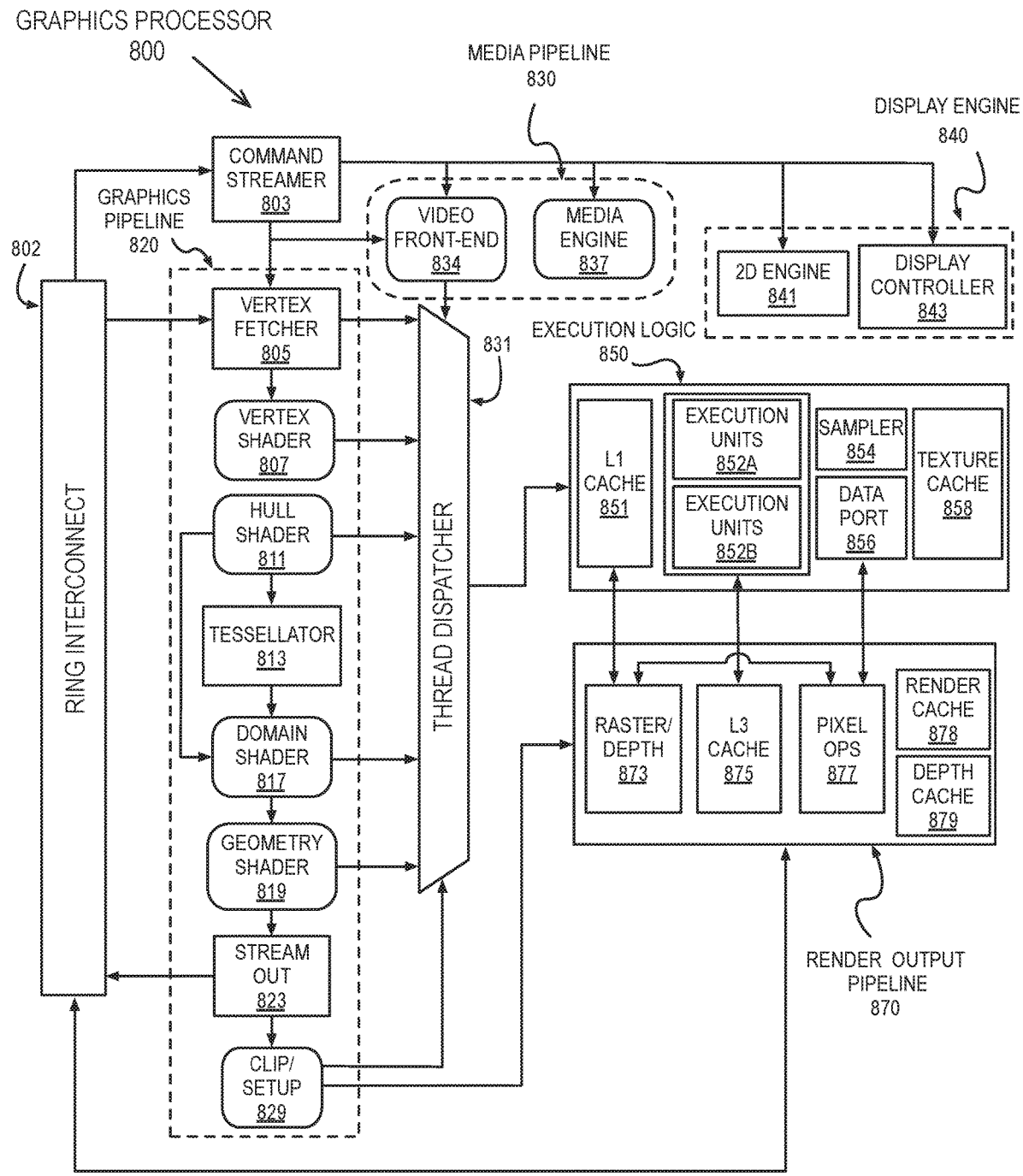
FIG. 8 is a block diagram of another embodiment of a graphics processor which includes a graphics pipeline, a media pipeline, a display engine, thread execution logic, and a render output pipeline.

FIG. 8 is a block diagram of another embodiment of a graphics processor 800. Elements of FIG. 8 having the same reference numbers (or names) as the elements of any other figure herein can operate or function in any manner similar to that described elsewhere herein, but are not limited to such.

In some embodiments, graphics processor 800 includes a graphics pipeline 820, a media pipeline 830, a display engine 840, thread execution logic 850, and a render output pipeline 870. In some embodiments, graphics processor 800 is a graphics processor within a multi-core processing system that includes one or more general purpose processing cores. The graphics processor is controlled by register writes to one or more control registers (not shown) or via commands issued to graphics processor 800 via a ring interconnect 802. In some embodiments, ring interconnect 802 couples graphics processor 800 to other processing components, such as other graphics processors or general-purpose processors. Commands from ring interconnect 802 are interpreted by a command streamer 803, which supplies instructions to individual components of graphics pipeline 820 or media pipeline 830.

In some embodiments, command streamer 803 directs the operation of a vertex fetcher 805 that reads vertex data from memory and executes vertex-processing commands provided by command streamer 803. In some embodiments, vertex fetcher 805 provides vertex data to a vertex shader 807, which performs coordinate space transformation and lighting operations to each vertex. In some embodiments, vertex fetcher 805 and vertex shader 807 execute vertex-processing instructions by dispatching execution threads to execution units 852A-852B via a thread dispatcher 831.

In some embodiments, execution units 852A-852B are an array of vector processors having an instruction set for performing graphics and media operations. In some embodiments, execution units 852A-852B have an attached L1 cache 851 that is specific for each array or shared between the arrays. The cache can be configured as a data cache, an instruction cache, or a single cache that is partitioned to contain data and instructions in different partitions.

In some embodiments, graphics pipeline 820 includes tessellation components to perform hardware-accelerated tessellation of 3D objects. In some embodiments, a programmable hull shader 811 configures the tessellation operations. A programmable domain shader 817 provides back-end evaluation of tessellation output. A tessellator 813 operates at the direction of hull shader 811 and contains special purpose logic to generate a set of detailed geometric objects based on a coarse geometric model that is provided as input to graphics pipeline 820. In some embodiments, if tessellation is not used, tessellation components (e.g., hull shader 811, tessellator 813, and domain shader 817) can be bypassed.

In some embodiments, complete geometric objects can be processed by a geometry shader 819 via one or more threads dispatched to execution units 852A-852B, or can proceed directly to the clipper 829. In some embodiments, the geometry shader operates on entire geometric objects, rather than vertices or patches of vertices as in previous stages of the graphics pipeline. If the tessellation is disabled the geometry shader 819 receives input from the vertex shader 807. In some embodiments, geometry shader 819 is programmable by a geometry shader program to perform geometry tessellation if the tessellation units are disabled.

Before rasterization, a clipper 829 processes vertex data. The clipper 829 may be a fixed function clipper or a programmable clipper having clipping and geometry shader functions. In some embodiments, a rasterizer and depth test component 873 in the render output pipeline 870 dispatches pixel shaders to convert the geometric objects into their per pixel representations. In some embodiments, pixel shader logic is included in thread execution logic 850. In some embodiments, an application can bypass the rasterizer and depth test component 873 and access un-rasterized vertex data via a stream out unit 823.

The graphics processor 800 has an interconnect bus, interconnect fabric, or some other interconnect mechanism that allows data and message passing amongst the major components of the processor. In some embodiments, execution units 852A-852B and associated cache(s) 851, texture and media sampler 854, and texture/sampler cache 858 interconnect via a data port 856 to perform memory access and communicate with render output pipeline components of the processor. In some embodiments, sampler 854, caches 851, 858 and execution units 852A-852B each have separate memory access paths.

In some embodiments, render output pipeline 870 contains a rasterizer and depth test component 873 that converts vertex-based objects into an associated pixel-based representation. In some embodiments, the rasterizer logic includes a windower/masker unit to perform fixed function triangle and line rasterization. An associated render cache 878 and depth cache 879 are also available in some embodiments. A pixel operations component 877 performs pixel-based operations on the data, though in some instances, pixel operations associated with 2D operations (e.g. bit block image transfers with blending) are performed by the 2D engine 841, or substituted at display time by the display controller 843 using overlay display planes. In some embodiments, a shared L3 cache 875 is available to all graphics components, allowing the sharing of data without the use of main system memory.

In some embodiments, graphics processor media pipeline 830 includes a media engine 837 and a video front end 834. In some embodiments, video front end 834 receives pipeline commands from the command streamer 803. In some embodiments, media pipeline 830 includes a separate command streamer. In some embodiments, video front-end 834 processes media commands before sending the command to the media engine 837. In some embodiments, media engine 837 includes thread spawning functionality to spawn threads for dispatch to thread execution logic 850 via thread dispatcher 831.

In some embodiments, graphics processor 800 includes a display engine 840. In some embodiments, display engine 840 is external to processor 800 and couples with the graphics processor via the ring interconnect 802, or some other interconnect bus or fabric. In some embodiments, display engine 840 includes a 2D engine 841 and a display controller 843. In some embodiments, display engine 840 contains special purpose logic capable of operating independently of the 3D pipeline. In some embodiments, display controller 843 couples with a display device (not shown), which may be a system integrated display device, as in a laptop computer, or an external display device attached via a display device connector.

In some embodiments, graphics pipeline 820 and media pipeline 830 are configurable to perform operations based on multiple graphics and media programming interfaces and are not specific to any one application programming interface (API). In some embodiments, driver software for the graphics processor translates API calls that are specific to a particular graphics or media library into commands that can be processed by the graphics processor. In some embodiments, support is provided for the Open Graphics Library (OpenGL), Open Computing Language (OpenCL), and/or Vulkan graphics and compute API, all from the Khronos Group. In some embodiments, support may also be provided for the Direct 3D library from the Microsoft Corporation. In some embodiments, a combination of these libraries may be supported. Support may also be provided for the Open Source Computer Vision Library (OpenCV). A future API with a compatible 3D pipeline would also be supported if a mapping can be made from the pipeline of the future API to the pipeline of the graphics processor.

Graphics Pipeline Programming

Figure 9:
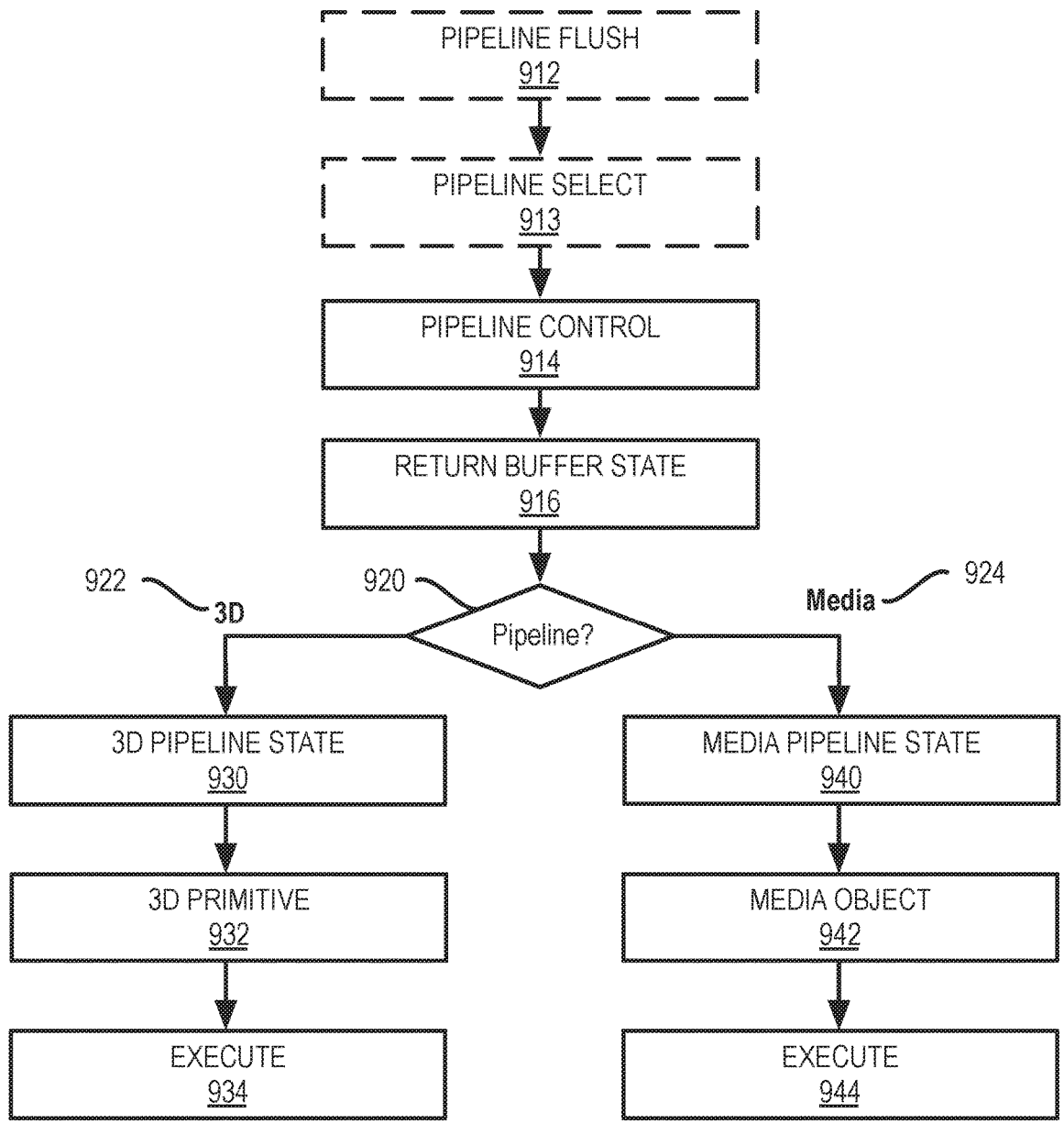
FIG. 9A is a block diagram illustrating a graphics processor command format according to an embodiment.
FIG. 9B is a block diagram illustrating a graphics processor command sequence according to an embodiment.

FIG. 9A is a block diagram illustrating a graphics processor command format 900 according to some embodiments. FIG. 9B is a block diagram illustrating a graphics processor command sequence 910 according to an embodiment. The solid lined boxes in FIG. 9A illustrate the components that are generally included in a graphics command while the dashed lines include components that are optional or that are only included in a sub-set of the graphics commands. The exemplary graphics processor command format 900 of FIG. 9A includes data fields to identify a target client 902 of the command, a command operation code (opcode) 904, and the relevant data 906 for the command A sub-opcode 905 and a command size 908 are also included in some commands.

In some embodiments, client 902 specifies the client unit of the graphics device that processes the command data. In some embodiments, a graphics processor command parser examines the client field of each command to condition the further processing of the command and route the command data to the appropriate client unit. In some embodiments, the graphics processor client units include a memory interface unit, a render unit, a 2D unit, a 3D unit, and a media unit. Each client unit has a corresponding processing pipeline that processes the commands Once the command is received by the client unit, the client unit reads the opcode 904 and, if present, sub-opcode 905 to determine the operation to perform. The client unit performs the command using information in data field 906. For some commands an explicit command size 908 is expected to specify the size of the command. In some embodiments, the command parser automatically determines the size of at least some of the commands based on the command opcode. In some embodiments commands are aligned via multiples of a double word.

The flow diagram in FIG. 9B shows an exemplary graphics processor command sequence 910. In some embodiments, software or firmware of a data processing system that features an embodiment of a graphics processor uses a version of the command sequence shown to set up, execute, and terminate a set of graphics operations. A sample command sequence is shown and described for purposes of example only as embodiments are not limited to these specific commands or to this command sequence. Moreover, the commands may be issued as batch of commands in a command sequence, such that the graphics processor will process the sequence of commands in at least partially concurrence.

In some embodiments, the graphics processor command sequence 910 may begin with a pipeline flush command 912 to cause any active graphics pipeline to complete the currently pending commands for the pipeline. In some embodiments, the 3D pipeline 922 and the media pipeline 924 do not operate concurrently. The pipeline flush is performed to cause the active graphics pipeline to complete any pending commands In response to a pipeline flush, the command parser for the graphics processor will pause command processing until the active drawing engines complete pending operations and the relevant read caches are invalidated. Optionally, any data in the render cache that is marked 'dirty' can be flushed to memory. In some embodiments, pipeline flush command 912 can be used for pipeline synchronization or before placing the graphics processor into a low power state.

In some embodiments, a pipeline select command 913 is used when a command sequence requires the graphics processor to explicitly switch between pipelines. In some embodiments, a pipeline select command 913 is required only once within an execution context before issuing pipeline commands unless the context is to issue commands for both pipelines. In some embodiments, a pipeline flush command 912 is required immediately before a pipeline switch via the pipeline select command 913.

In some embodiments, a pipeline control command 914 configures a graphics pipeline for operation and is used to program the 3D pipeline 922 and the media pipeline 924. In some embodiments, pipeline control command 914 configures the pipeline state for the active pipeline. In one embodiment, the pipeline control command 914 is used for pipeline synchronization and to clear data from one or more cache memories within the active pipeline before processing a batch of commands.

In some embodiments, commands for the return buffer state 916 are used to configure a set of return buffers for the respective pipelines to write data. Some pipeline operations require the allocation, selection, or configuration of one or more return buffers into which the operations write intermediate data during processing. In some embodiments, the graphics processor also uses one or more return buffers to store output data and to perform cross thread communication. In some embodiments, configuring the return buffer state 916 includes selecting the size and number of return buffers to use for a set of pipeline operations.

The remaining commands in the command sequence differ based on the active pipeline for operations. Based on a pipeline determination 920, the command sequence is tailored to the 3D pipeline 922 beginning with the 3D pipeline state 930 or the media pipeline 924 beginning at the media pipeline state 940.

The commands to configure the 3D pipeline state 930 include 3D state setting commands for vertex buffer state, vertex element state, constant color state, depth buffer state, and other state variables that are to be configured before 3D primitive commands are processed. The values of these commands are determined at least in part based on the particular 3D API in use. In some embodiments, 3D pipeline state 930 commands are also able to selectively disable or bypass certain pipeline elements if those elements will not be used.

In some embodiments, 3D primitive 932 command is used to submit 3D primitives to be processed by the 3D pipeline. Commands and associated parameters that are passed to the graphics processor via the 3D primitive 932 command are forwarded to the vertex fetch function in the graphics pipeline. The vertex fetch function uses the 3D primitive 932 command data to generate vertex data structures. The vertex data structures are stored in one or more return buffers. In some embodiments, 3D primitive 932 command is used to perform vertex operations on 3D primitives via vertex shaders. To process vertex shaders, 3D pipeline 922 dispatches shader execution threads to graphics processor execution units.

In some embodiments, 3D pipeline 922 is triggered via an execute 934 command or event. In some embodiments, a register write triggers command execution. In some embodiments execution is triggered via a 'go' or 'kick' command in the command sequence. In one embodiment, command execution is triggered using a pipeline synchronization command to flush the command sequence through the graphics pipeline. The 3D pipeline will perform geometry processing for the 3D primitives. Once operations are complete, the resulting geometric objects are rasterized and the pixel engine colors the resulting pixels. Additional commands to control pixel shading and pixel back end operations may also be included for those operations.

In some embodiments, the graphics processor command sequence 910 follows the media pipeline 924 path when performing media operations. In general, the specific use and manner of programming for the media pipeline 924 depends on the media or compute operations to be performed. Specific media decode operations may be offloaded to the media pipeline during media decode. In some embodiments, the media pipeline can also be bypassed and media decode can be performed in whole or in part using resources provided by one or more general purpose processing cores. In one embodiment, the media pipeline also includes elements for general-purpose graphics processor unit (GPGPU) operations, where the graphics processor is used to perform SIMD vector operations using computational shader programs that are not explicitly related to the rendering of graphics primitives.

In some embodiments, media pipeline 924 is configured in a similar manner as the 3D pipeline 922. A set of commands to configure the media pipeline state 940 are dispatched or placed into a command queue before the media object commands 942. In some embodiments, commands for the media pipeline state 940 include data to configure the media pipeline elements that will be used to process the media objects. This includes data to configure the video decode and video encode logic within the media pipeline, such as encode or decode format. In some embodiments, commands for the media pipeline state 940 also support the use of one or more pointers to "indirect" state elements that contain a batch of state settings.

In some embodiments, media object commands 942 supply pointers to media objects for processing by the media pipeline. The media objects include memory buffers containing video data to be processed. In some embodiments, all media pipeline states must be valid before issuing a media object command 942. Once the pipeline state is configured and media object commands 942 are queued, the media pipeline 924 is triggered via an execute command 944 or an equivalent execute event (e.g., register write). Output from media pipeline 924 may then be post processed by operations provided by the 3D pipeline 922 or the media pipeline 924. In some embodiments, GPGPU operations are configured and executed in a similar manner as media operations.

Graphics Software Architecture

Figure 10:
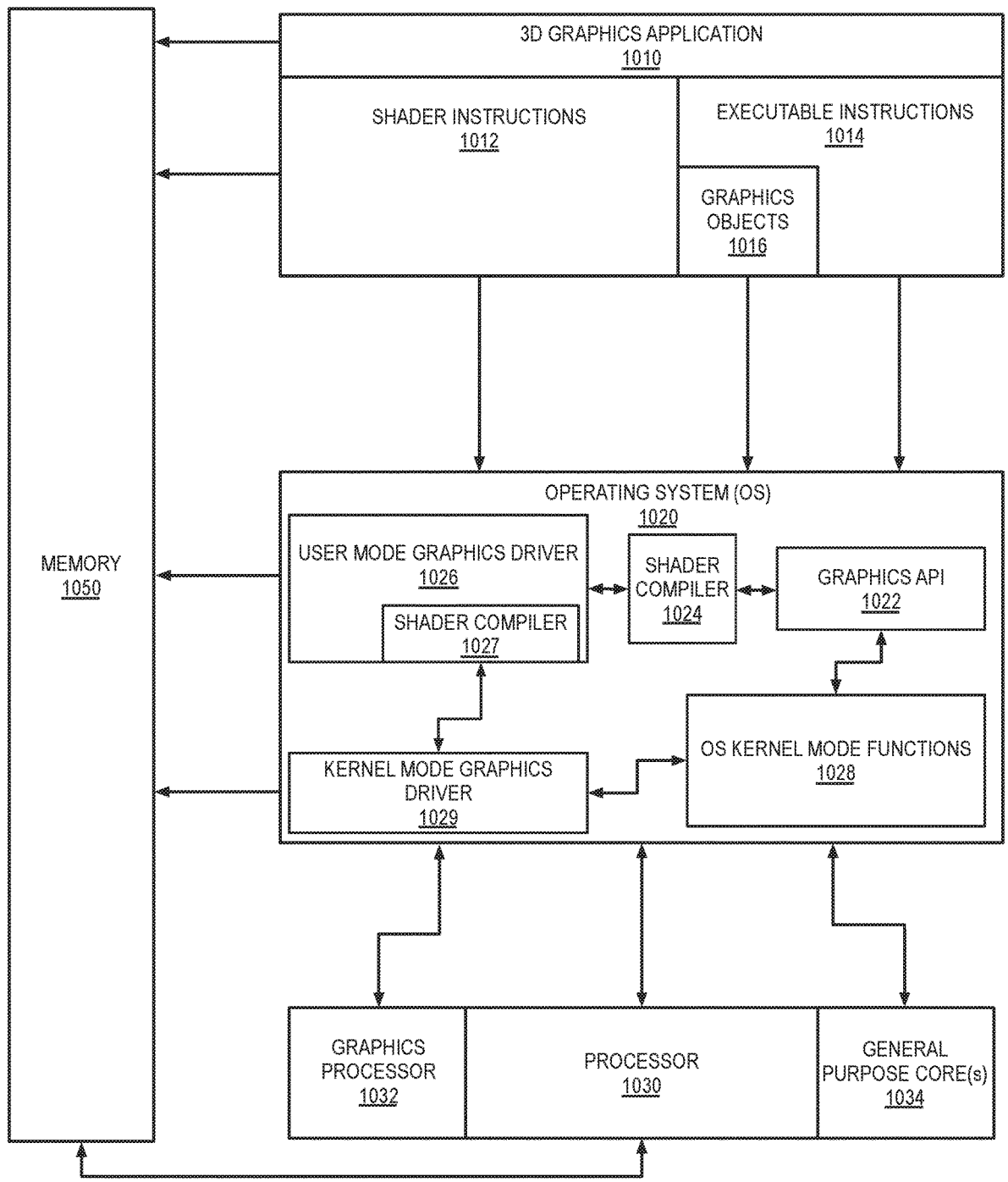
FIG. 10 illustrates exemplary graphics software architecture for a data processing system according to an embodiment.

FIG. 10 illustrates exemplary graphics software architecture for a data processing system 1000 according to some embodiments. In some embodiments, software architecture includes a 3D graphics application 1010, an operating system 1020, and at least one processor 1030. In some embodiments, processor 1030 includes a graphics processor 1032 and one or more general-purpose processor core(s) 1034. The graphics application 1010 and operating system 1020 each execute in the system memory 1050 of the data processing system.

In some embodiments, 3D graphics application 1010 contains one or more shader programs including shader instructions 1012. The shader language instructions may be in a high-level shader language, such as the High Level Shader Language (HLSL) or the OpenGL Shader Language (GLSL). The application also includes executable instructions 1014 in a machine language suitable for execution by the general-purpose processor core 1034. The application also includes graphics objects 1016 defined by vertex data.

In some embodiments, operating system 1020 is a Microsoft® Windows® operating system from the Microsoft Corporation, a proprietary UNIX-like operating system, or an open source UNIX-like operating system using a variant of the Linux kernel. The operating system 1020 can support a graphics API 1022 such as the Direct 3D API, the OpenGL API, or the Vulkan API. When the Direct 3D API is in use, the operating system 1020 uses a front-end shader compiler 1024 to compile any shader instructions 1012 in HLSL into a lower-level shader language. The compilation may be a just-in-time (JIT) compilation or the application can perform shader pre-compilation. In some embodiments, high-level shaders are compiled into low-level shaders during the compilation of the 3D graphics application 1010. In some embodiments, the shader instructions 1012 are provided in an intermediate form, such as a version of the Standard Portable Intermediate Representation (SPIR) used by the Vulkan API.

In some embodiments, user mode graphics driver 1026 contains a back-end shader compiler 1027 to convert the shader instructions 1012 into a hardware specific representation. When the OpenGL API is in use, shader instructions 1012 in the GLSL high-level language are passed to a user mode graphics driver 1026 for compilation. In some embodiments, user mode graphics driver 1026 uses operating system kernel mode functions 1028 to communicate with a kernel mode graphics driver 1029. In some embodiments, kernel mode graphics driver 1029 communicates with graphics processor 1032 to dispatch commands and instructions.

IP Core Implementations

One or more aspects of at least one embodiment may be implemented by representative code stored on a machine-readable medium which represents and/or defines logic within an integrated circuit such as a processor. For example, the machine-readable medium may include instructions which represent various logic within the processor. When read by a machine, the instructions may cause the machine to fabricate the logic to perform the techniques described herein. Such representations, known as "IP cores," are reusable units of logic for an integrated circuit that may be stored on a tangible, machine-readable medium as a hardware model that describes the structure of the integrated circuit. The hardware model may be supplied to various customers or manufacturing facilities, which load the hardware model on fabrication machines that manufacture the integrated circuit. The integrated circuit may be fabricated such that the circuit performs operations described in association with any of the embodiments described herein.

Figure 11:
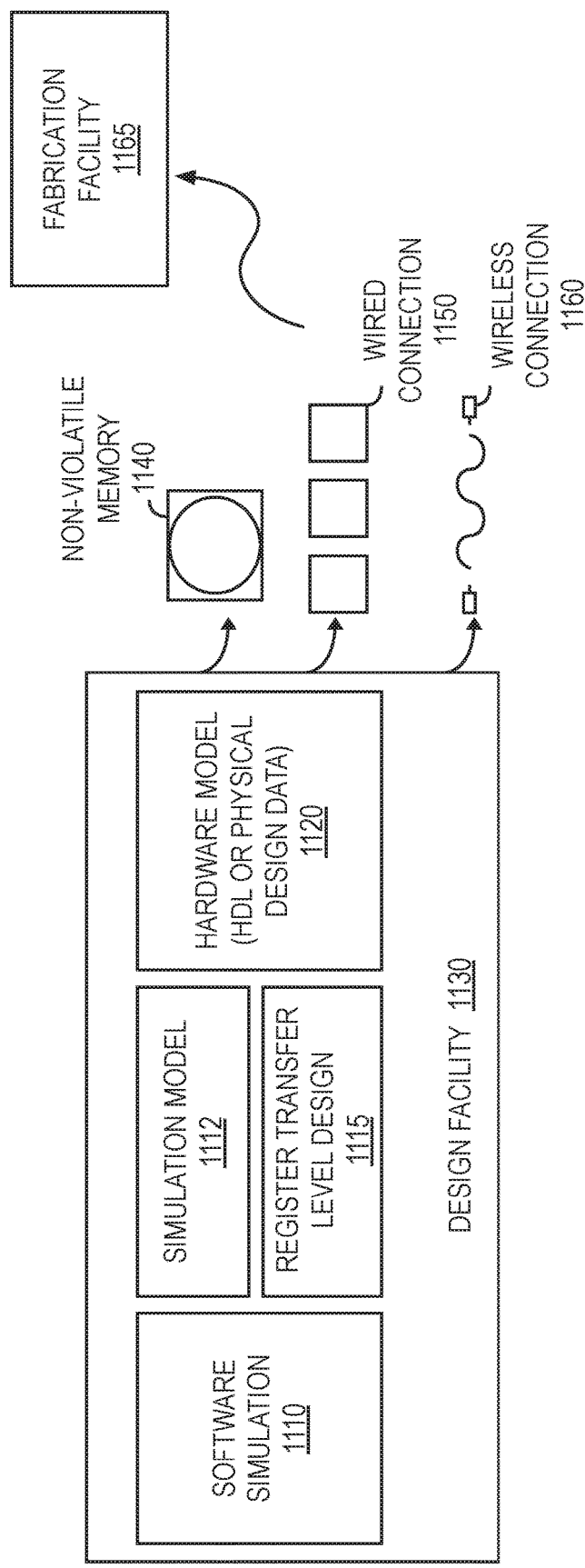
FIG. 11 illustrates an exemplary IP core development system that may be used to manufacture an integrated circuit to perform operations according to an embodiment.

FIG. 11 is a block diagram illustrating an IP core development system 1100 that may be used to manufacture an integrated circuit to perform operations according to an embodiment. The IP core development system 1100 may be used to generate modular, re-usable designs that can be incorporated into a larger design or used to construct an entire integrated circuit (e.g., an SOC integrated circuit). A design facility 1130 can generate a software simulation 1110 of an IP core design in a high level programming language (e.g., C/C++). The software simulation 1110 can be used to design, test, and verify the behavior of the IP core using a simulation model 1112. The simulation model 1112 may include functional, behavioral, and/or timing simulations. A register transfer level (RTL) design 1115 can then be created or synthesized from the simulation model 1112. The RTL design 1115 is an abstraction of the behavior of the integrated circuit that models the flow of digital signals between hardware registers, including the associated logic performed using the modeled digital signals. In addition to an RTL design 1115, lower-level designs at the logic level or transistor level may also be created, designed, or synthesized. Thus, the particular details of the initial design and simulation may vary.

The RTL design 1115 or equivalent may be further synthesized by the design facility into a hardware model 1120, which may be in a hardware description language (HDL), or some other representation of physical design data. The HDL may be further simulated or tested to verify the IP core design. The IP core design can be stored for delivery to a 3rd party fabrication facility 1165 using non-volatile memory 1140 (e.g., hard disk, flash memory, or any non-volatile storage medium). Alternatively, the IP core design may be transmitted (e.g., via the Internet) over a wired connection 1150 or wireless connection 1160. The fabrication facility 1165 may then fabricate an integrated circuit that is based at least in part on the IP core design. The fabricated integrated circuit can be configured to perform operations in accordance with at least one embodiment described herein.

Exemplary System on a Chip Integrated Circuit

Figure 12:
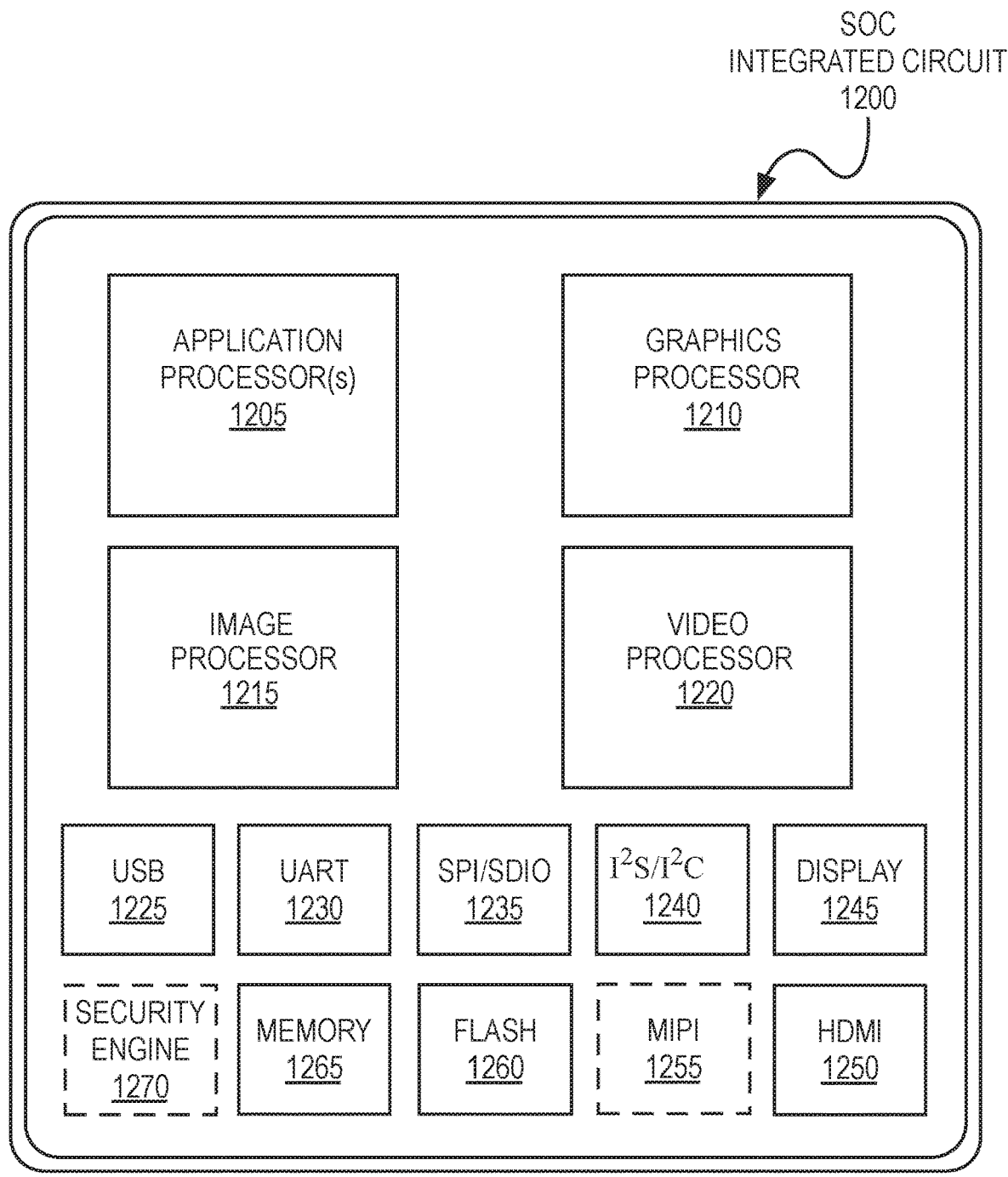
FIG. 12 illustrates an exemplary system on a chip integrated circuit that may be fabricated using one or more IP cores, according to an embodiment.
Figure 13:
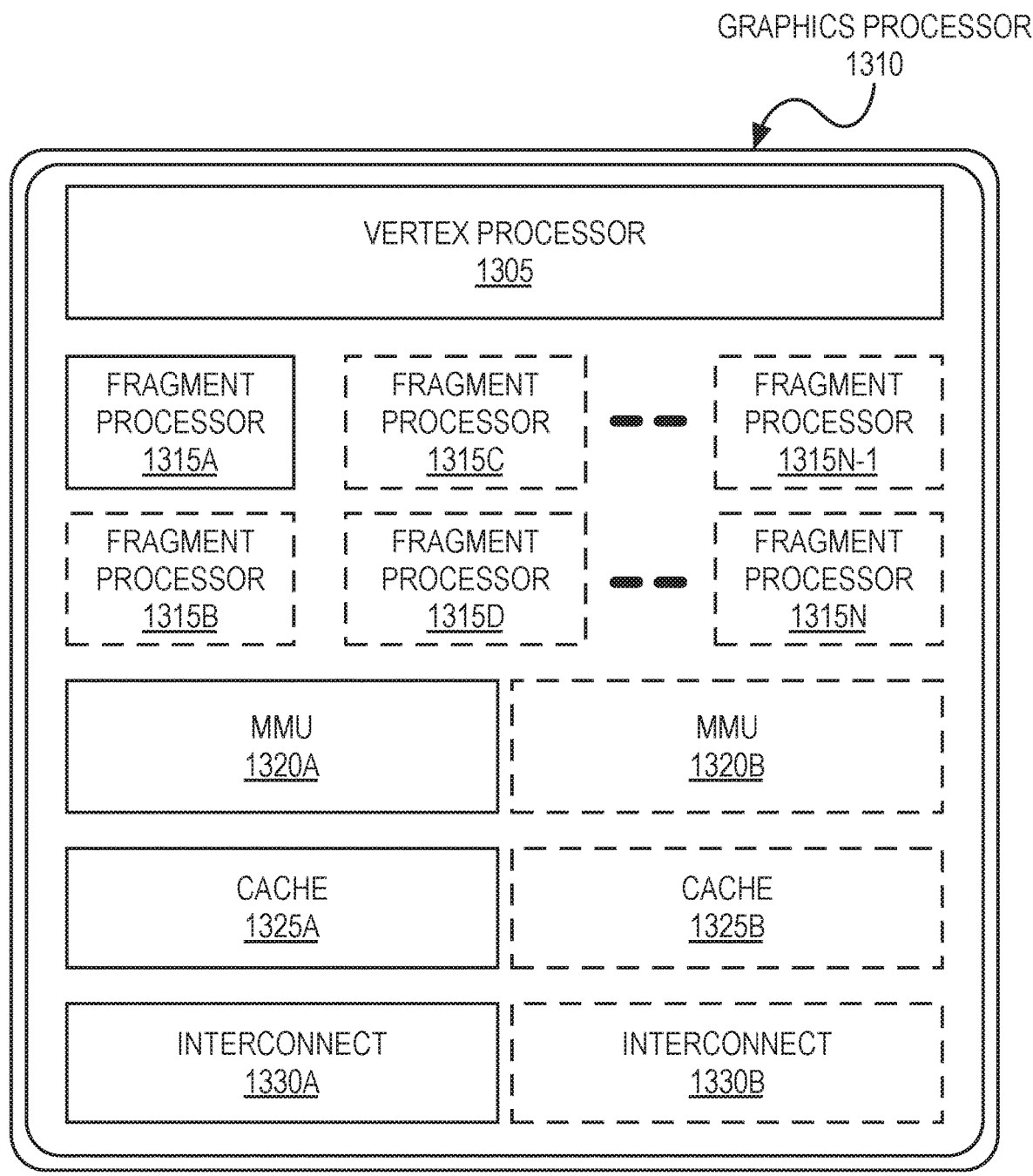
FIG. 13 illustrates an exemplary graphics processor of a system on a chip integrated circuit that may be fabricated using one or more IP cores.
Figure 14:
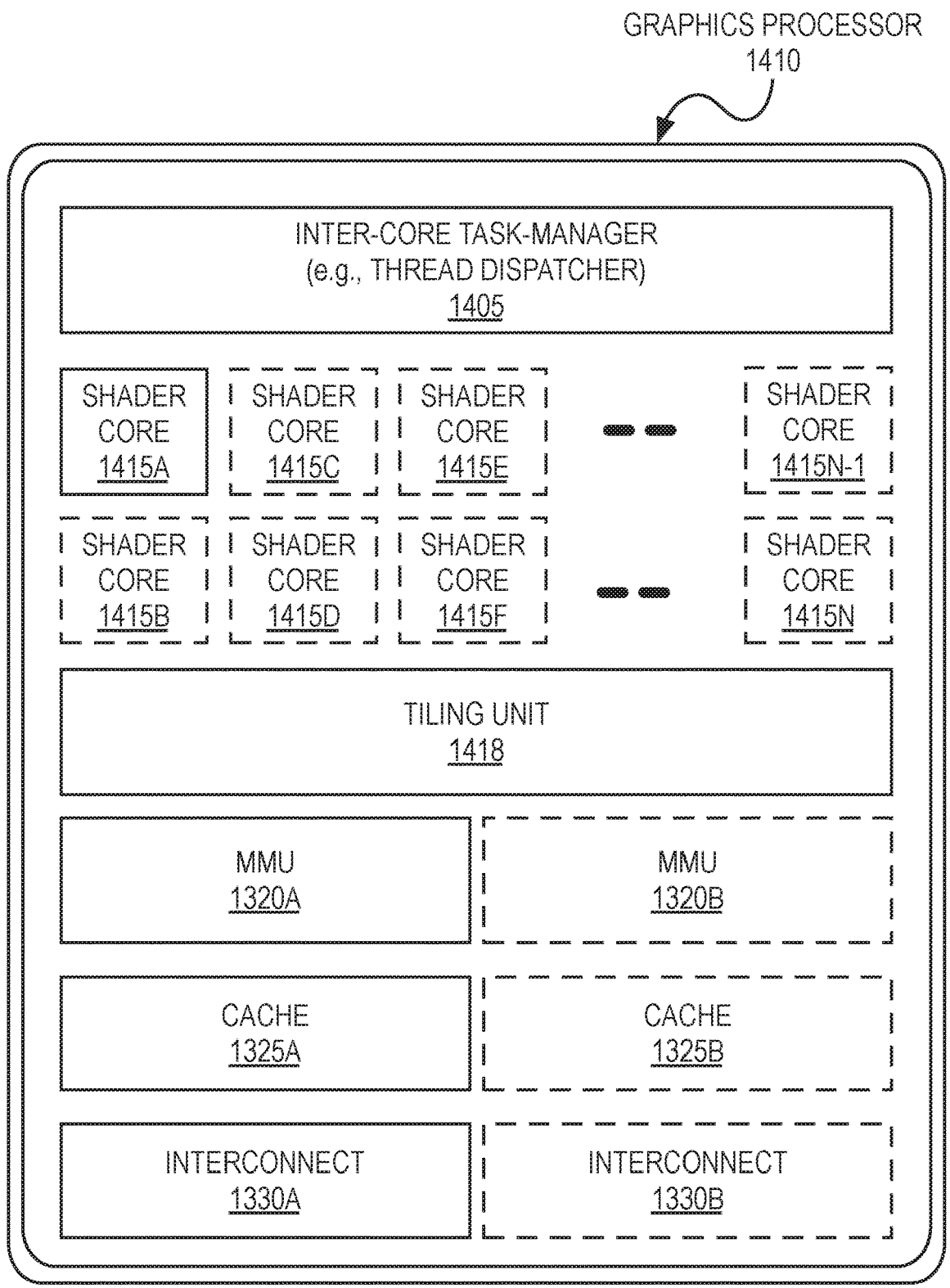
FIG. 14 illustrates an additional exemplary graphics processor of a system on a chip integrated circuit that may be fabricated using one or more IP cores.

FIGS. 12-14 illustrate exemplary integrated circuits and associated graphics processors that may be fabricated using one or more IP cores, according to various embodiments described herein. In addition to what is illustrated, other logic and circuits may be included, including additional graphics processors/cores, peripheral interface controllers, or general purpose processor cores.

FIG. 12 is a block diagram illustrating an exemplary system on a chip integrated circuit 1200 that may be fabricated using one or more IP cores, according to an embodiment. Exemplary integrated circuit 1200 includes one or more application processor(s) 1205 (e.g., CPUs), at least one graphics processor 1210, and may additionally include an image processor 1215 and/or a video processor 1220, any of which may be a modular IP core from the same or multiple different design facilities. Integrated circuit 1200 includes peripheral or bus logic including a USB controller 1225, UART controller 1230, an SPI/SDIO controller 1235, and an I2S/I2C controller 1240. Additionally, the integrated circuit can include a display device 1245 coupled to one or more of a high-definition multimedia interface (HDMI) controller 1250 and a mobile industry processor interface (MIPI) display interface 1255. Storage may be provided by a flash memory subsystem 1260 including flash memory and a flash memory controller. Memory interface may be provided via a memory controller 1265 for access to SDRAM or SRAM memory devices. Some integrated circuits additionally include an embedded security engine 1270.

FIG. 13 is a block diagram illustrating an exemplary graphics processor 1310 of a system on a chip integrated circuit that may be fabricated using one or more IP cores, according to an embodiment. Graphics processor 1310 can be a variant of the graphics processor 1210 of FIG. 12. Graphics processor 1310 includes a vertex processor 1305 and one or more fragment processor(s) 1315A1315N (e.g., 1315A, 1315B, 1315C, 1315D, through 1315N-1, and 1315N). Graphics processor 1310 can execute different shader programs via separate logic, such that the vertex processor 1305 is optimized to execute operations for vertex shader programs, while the one or more fragment processor(s) 1315A-1315N execute fragment (e.g., pixel) shading operations for fragment or pixel shader programs. The vertex processor 1305 performs the vertex processing stage of the 3D graphics pipeline and generates primitives and vertex data. The fragment processor(s) 1315A-1315N use the primitive and vertex data generated by the vertex processor 1305 to produce a framebuffer that is displayed on a display device. In one embodiment, the fragment processor(s) 1315A-1315N are optimized to execute fragment shader programs as provided for in the OpenGL API, which may be used to perform similar operations as a pixel shader program as provided for in the Direct 3D API.

Graphics processor 1310 additionally includes one or more memory management units (MMUs) 1320A-1320B, cache(s) 1325A-1325B, and circuit interconnect(s) 1330A-1330B. The one or more MMU(s) 1320A-1320B provide for virtual to physical address mapping for graphics processor 1310, including for the vertex processor 1305 and/or fragment processor(s) 1315A-1315N, which may reference vertex or image/texture data stored in memory, in addition to vertex or image/texture data stored in the one or more cache(s) 1325A-1325B. In one embodiment the one or more MMU(s) 1320A-1320B may be synchronized with other MMUs within the system, including one or more MMUs associated with the one or more application processor(s) 1205, image processor 1215, and/or video processor 1220 of FIG. 12, such that each processor 1205-1220 can participate in a shared or unified virtual memory system. The one or more circuit interconnect(s) 1330A-1330B enable graphics processor 1310 to interface with other IP cores within the SoC, either via an internal bus of the SoC or via a direct connection, according to embodiments.

FIG. 14 is a block diagram illustrating an additional exemplary graphics processor 1410 of a system on a chip integrated circuit that may be fabricated using one or more IP cores, according to an embodiment. Graphics processor 1410 can be a variant of the graphics processor 1210 of FIG. 12. Graphics processor 1410 includes the one or more MMU(s) 1320A-1320B, cache(s) 1325A-1325B, and circuit interconnect(s) 1330A-1330B of the integrated circuit 1300 of FIG. 13.

Graphics processor 1410 includes one or more shader core(s) 1415A-1415N (e.g., 1415A, 1415B, 1415C, 1415D, 1415E, 1415F, through 1315N-1, and 1315N), which provides for a unified shader core architecture in which a single core or type or core can execute all types of programmable shader code, including shader program code to implement vertex shaders, fragment shaders, and/or compute shaders. The exact number of shader cores present can vary among embodiments and implementations. Additionally, graphics processor 1410 includes an inter-core task manager 1405, which acts as a thread dispatcher to dispatch execution threads to one or more shader core(s) 1415A-1415N and a tiling unit 1418 to accelerate tiling operations for tile-based rendering, in which rendering operations for a scene are subdivided in image space, for example to exploit local spatial coherence within a scene or to optimize use of internal caches.

Exemplary Graphics Microarchitectures

System Overview

Figure 15:
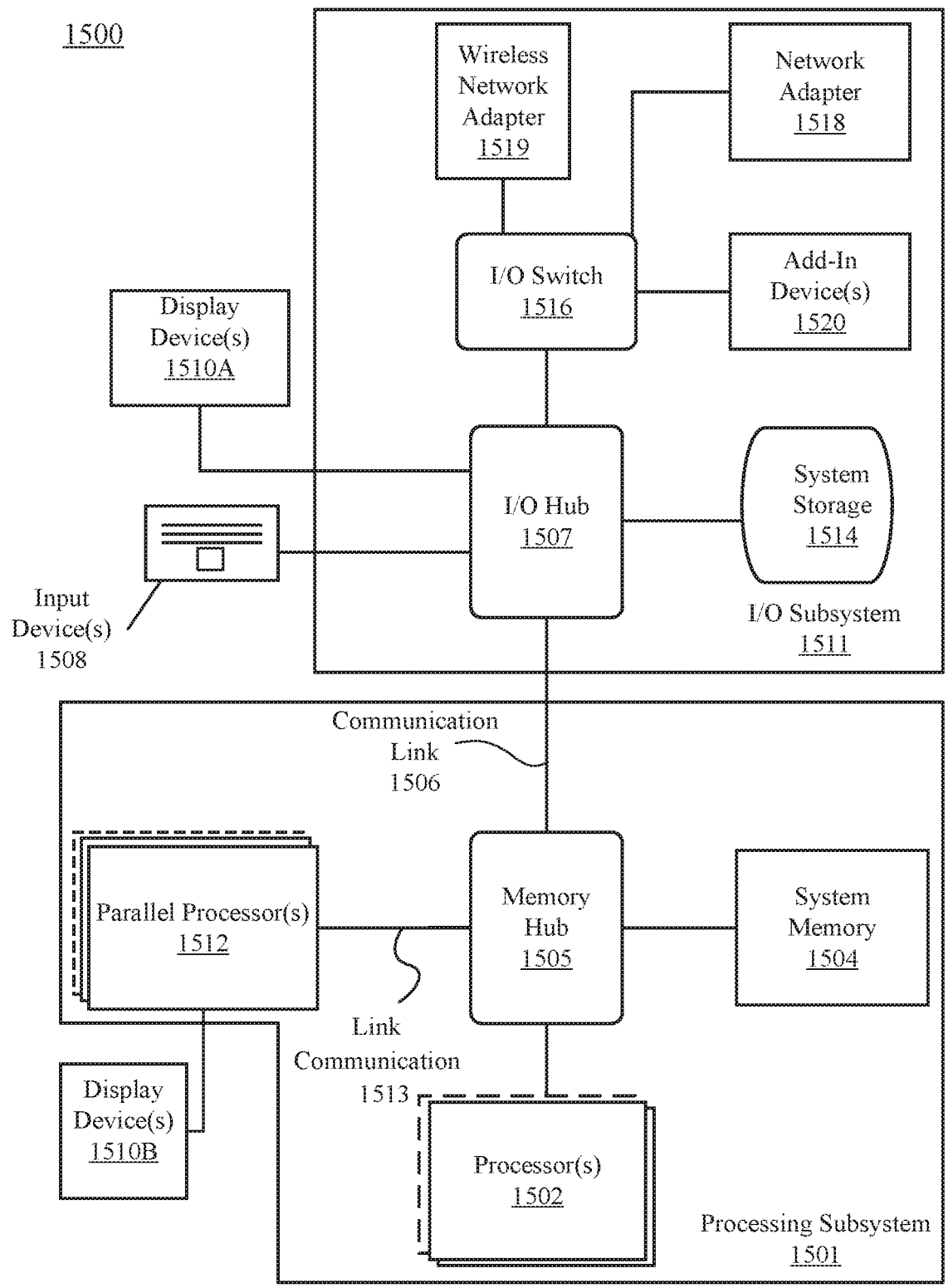
FIG. 15 is a block diagram illustrating a computer system configured to implement one or more aspects of the present invention.

FIG. 15 is a block diagram illustrating a computing system 1500 configured to implement one or more aspects of the embodiments described herein. The computing system 1500 includes a processing subsystem 1501 having one or more processor(s) 1502 and a system memory 1504 communicating via an interconnection path that may include a memory hub 1505. The memory hub 1505 may be a separate component within a chipset component or may be integrated within the one or more processor(s) 1502. The memory hub 1505 couples with an I/O subsystem 1511 via a communication link 1506. The I/O subsystem 1511 includes an I/O hub 1507 that can enable the computing system 1500 to receive input from one or more input device(s) 1508. Additionally, the I/O hub 1507 can enable a display controller, which may be included in the one or more processor(s) 1502, to provide outputs to one or more display device(s) 1510A. In one embodiment the one or more display device(s) 1510A coupled with the I/O hub 1507 can include a local, internal, or embedded display device.

In one embodiment the processing subsystem 1501 includes one or more parallel processor(s) 1512 coupled to memory hub 1505 via a bus or other communication link 1513. The communication link 1513 may be one of any number of standards based communication link technologies or protocols, such as, but not limited to PCI Express, or may be a vendor specific communications interface or communications fabric. In one embodiment the one or more parallel processor(s) 1512 form a computationally focused parallel or vector processing system that an include a large number of processing cores and/or processing clusters, such as a many integrated core (MIC) processor. In one embodiment the one or more parallel processor(s) 1512 form a graphics processing subsystem that can output pixels to one of the one or more display device(s) 1510A coupled via the I/O Hub 1507. The one or more parallel processor(s) 1512 can also include a display controller and display interface (not shown) to enable a direct connection to one or more display device(s) 1510B.

Within the I/O subsystem 1511, a system storage unit 1514 can connect to the I/O hub 1507 to provide a storage mechanism for the computing system 1500. An I/O switch 1516 can be used to provide an interface mechanism to enable connections between the I/O hub 1507 and other components, such as a network adapter 1518 and/or wireless network adapter 119 that may be integrated into the platform, and various other devices that can be added via one or more add-in device(s) 1520. The network adapter 1518 can be an Ethernet adapter or another wired network adapter. The wireless network adapter 1519 can include one or more of a Wi-Fi, Bluetooth, near field communication (NFC), or other network device that includes one or more wireless radios.

The computing system 1500 can include other components not explicitly shown, including USB or other port connections, optical storage drives, video capture devices, and the like, may also be connected to the I/O hub 1507. Communication paths interconnecting the various components in FIG. 15 may be implemented using any suitable protocols, such as PCI (Peripheral Component Interconnect) based protocols (e.g., PCI-Express), or any other bus or point-to-point communication interfaces and/or protocol(s), such as the NV-Link high-speed interconnect, or interconnect protocols known in the art.

In one embodiment, the one or more parallel processor(s) 1512 incorporate circuitry optimized for graphics and video processing, including, for example, video output circuitry, and constitutes a graphics processing unit (GPU). In another embodiment, the one or more parallel processor(s) 1512 incorporate circuitry optimized for general purpose processing, while preserving the underlying computational architecture, described in greater detail herein. In yet another embodiment, components of the computing system 1500 may be integrated with one or more other system elements on a single integrated circuit. For example, the one or more parallel processor(s), 1512 memory hub 1505, processor(s) 1502, and I/O hub 1507 can be integrated into a system on chip (SoC) integrated circuit. Alternatively, the components of the computing system 1500 can be integrated into a single package to form a system in package (SIP) configuration. In one embodiment at least a portion of the components of the computing system 1500 can be integrated into a multi-chip module (MCM), which can be interconnected with other multi-chip modules into a modular computing system.

It will be appreciated that the computing system 1500 shown herein is illustrative and that variations and modifications are possible. The connection topology, including the number and arrangement of bridges, the number of processor(s) 1502, and the number of parallel processor(s) 1512, may be modified as desired. For instance, in some embodiments, system memory 1504 is connected to the processor(s) 1502 directly rather than through a bridge, while other devices communicate with system memory 1504 via the memory hub 1505 and the processor(s) 1502. In other alternative topologies, the parallel processor(s) 1512 are connected to the I/O hub 1507 or directly to one of the one or more processor(s) 1502, rather than to the memory hub 1505. In other embodiments, the I/O hub 1507 and memory hub 1505 may be integrated into a single chip. Large embodiments may include two or more sets of processor(s) 1502 attached via multiple sockets, which can couple with two or more instances of the parallel processor(s) 1512. Some of the particular components shown herein are optional and may not be included in all implementations of the computing system 1500. For example, any number of add-in cards or peripherals may be supported, or some components may be eliminated.

Figure 16A:
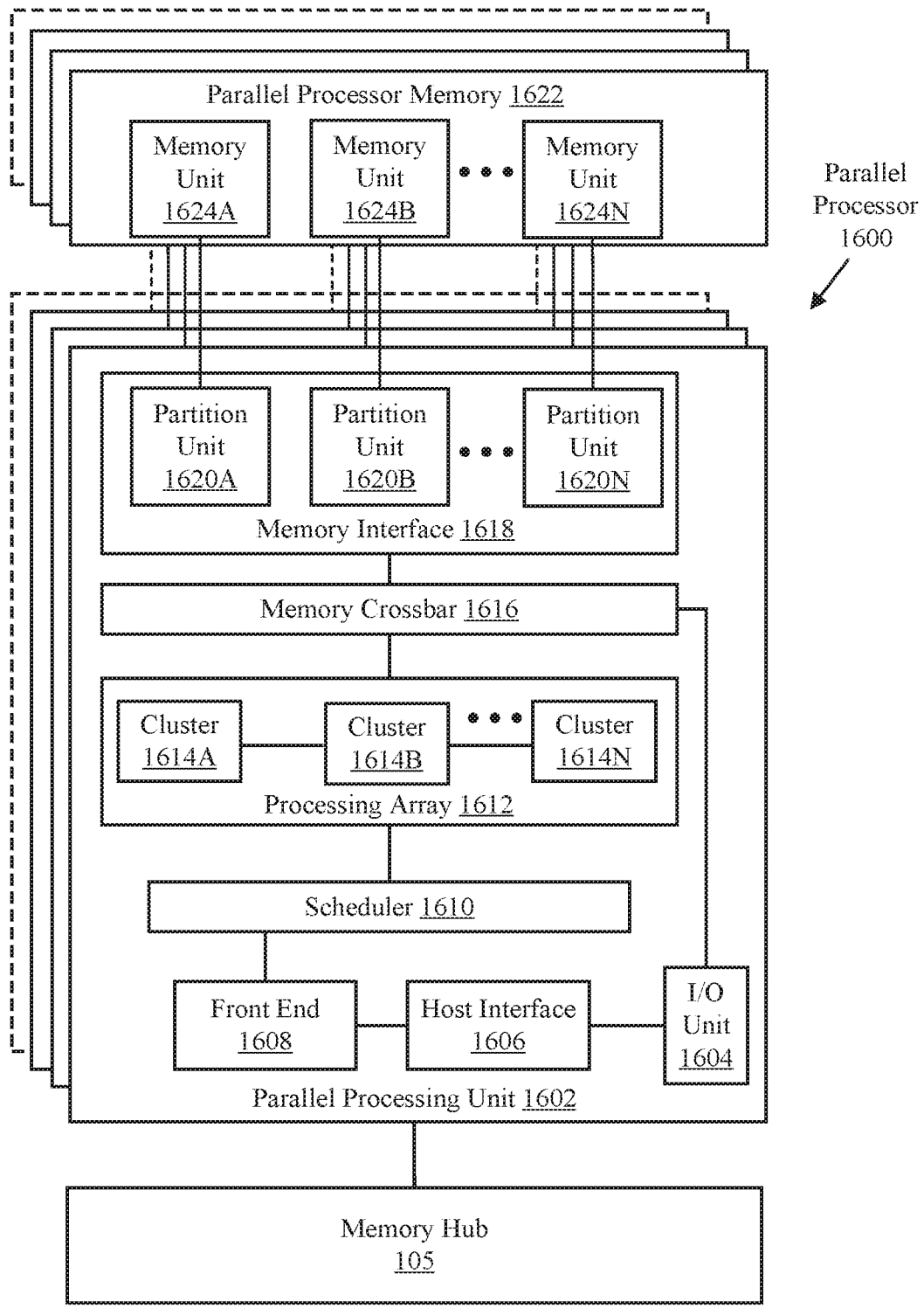
FIGS. 16A-16D illustrate a parallel processing subsystem, according to an embodiment.

FIG. 16A illustrates a parallel processor 1600, according to an embodiment. The various components of the parallel processor 1600 may be implemented using one or more integrated circuit devices, such as programmable processors, application specific integrated circuits (ASICs), or field programmable gate arrays (FPGA). The illustrated parallel processor 1600 is a variant of the one or more parallel processor(s) 1512 shown in FIG. 15, according to an embodiment.

In one embodiment the parallel processor 1600 includes a parallel processing unit 1602. The parallel processing unit includes an I/O unit 1604 that enables communication with other devices, including other instances of the parallel processing unit 1602. The I/O unit 1604 may be directly connected to other devices. In one embodiment the I/O unit 1604 connects with other devices via the use of a hub or switch interface, such as memory hub 1505. The connections between the memory hub 1505 and the I/O unit 1604 form a communication link 1513. Within the parallel processing unit 1602, the I/O unit 1604 connects with a host interface 1606 and a memory crossbar 1616, where the host interface 1606 receives commands directed to performing processing operations and the memory crossbar 1616 receives commands directed to performing memory operations.

When the host interface 1606 receives a command buffer via the I/O unit 1604, the host interface 1606 can direct work operations to perform those commands to a front end 1608. In one embodiment the front end 1608 couples with a scheduler 1610, which is configured to distribute commands or other work items to a processing cluster array 1612. In one embodiment the scheduler 1610 ensures that the processing cluster array 1612 is properly configured and in a valid state before tasks are distributed to the processing clusters of the processing cluster array 1612.

The processing cluster array 1612 can include up to "N" processing clusters (e.g., cluster 1614A, cluster 1614B, through cluster 1614N). Each cluster 1614A-1614N of the processing cluster array 1612 is capable of executing a large number (e.g., thousands) of concurrent threads, where each thread is an instance of a program.

In one embodiment, different clusters 1614A-1614N can be allocated for processing different types of programs or for performing different types of computations. The scheduler 1610 can allocate work to the clusters 1614A-1614N of the processing cluster array 1612 using various scheduling and/or work distribution algorithms, which may vary depending on the workload arising for each type of program or computation. The scheduling can be handled dynamically by the scheduler 1610, or can be assisted in part by compiler logic during compilation of program logic configured for execution by the processing cluster array 1612.

The processing cluster array 1612 can be configured to perform various types of parallel processing operations. In one embodiment the processing cluster array 1612 is configured to perform general-purpose parallel compute operations. For example, the processing cluster array 1612 can include logic to execute processing tasks including but not limited to, linear and nonlinear data transforms, filtering of video and/or audio data, and/or modeling operations (e.g., applying laws of physics to determine position, velocity and other attributes of objects).

In one embodiment the processing cluster array 1612 is configured to perform parallel graphics processing operations. In embodiments in which the parallel processor 1600 is configured to perform graphics processing operations, the processing cluster array 1612 can include additional logic to support the execution of such graphics processing operations, including, but not limited to texture sampling logic to perform texture operations, as well as tessellation logic and other vertex processing logic. Additionally, the processing cluster array 1612 can be configured to execute graphics processing related shader programs such as, but not limited to vertex shaders, tessellation shaders, geometry shaders, and pixel shaders. The parallel processing unit 1602 can transfer data from system memory via the I/O unit 1604 for processing. During processing the transferred data can be stored to on-chip memory (e.g., parallel processor memory 1622) during processing, then written back to system memory.

In one embodiment, when the parallel processing unit 1602 is used to perform graphics processing, the scheduler 1610 can be configured to divide the processing workload into approximately equal sized tasks, to better enable distribution of the graphics processing operations to multiple clusters 1614A-1614N of the processing cluster array 1612. In some embodiments, portions of the processing cluster array 1612 can be configured to perform different types of processing. For example a first portion may be configured to perform vertex shading and topology generation, a second portion may be configured to perform tessellation and geometry shading, and a third portion may be configured to perform pixel shading or other screen space operations, to produce a rendered image for display. Intermediate data produced by one or more of the clusters 1614A-1614N may be stored in buffers to allow the intermediate data to be transmitted between clusters 1614A-1614N for further processing.

During operation, the processing cluster array 1612 can receive processing tasks to be executed via the scheduler 1610, which receives commands defining processing tasks from front end 1608. For graphics processing operations, processing tasks can include indices of data to be processed, e.g., surface (patch) data, primitive data, vertex data, and/or pixel data, as well as state parameters and commands defining how the data is to be processed (e.g., what program is to be executed). The scheduler 1610 may be configured to fetch the indices corresponding to the tasks or may receive the indices from the front end 1608. The front end 1608 can be configured to ensure the processing cluster array 1612 is configured to a valid state before the workload specified by incoming command buffers (e.g., batch-buffers, push buffers, etc.) is initiated.

Each of the one or more instances of the parallel processing unit 1602 can couple with parallel processor memory 1622. The parallel processor memory 1622 can be accessed via the memory crossbar 1616, which can receive memory requests from the processing cluster array 1612 as well as the I/O unit 1604. The memory crossbar 1616 can access the parallel processor memory 1622 via a memory interface 1618. The memory interface 1618 can include multiple partition units (e.g., partition unit 1620A, partition unit 1620B, through partition unit 1620N) that are each directly coupled to a portion (e.g., memory unit) of parallel processor memory 1622. The number of partition units 1620A-1620N generally equals the number of memory units, such that a first partition unit 1620A has a corresponding first memory unit 1624A, a second partition unit 1620B has a corresponding memory unit 1624B, and an Nth partition unit 1620N has a corresponding Nth memory unit 1624N. In other embodiments, the number of partition units 1620A-1620N may not equal the number of memory devices.

In various embodiments, the memory units 1624A-1624N can include various types of memory devices, including dynamic random access memory (DRAM) or graphics random access memory, such as synchronous graphics random access memory (SGRAM), including graphics double data rate (GDDR) memory. In one embodiment, the memory units 1624A-1624N may also include 3D stacked memory, including but not limited to high bandwidth memory (HBM). Persons skilled in the art will appreciate that the specific implementation of the memory units 1624A-1624N can vary, and can be selected from one of various conventional designs. Render targets, such as frame buffers or texture maps may be stored across the memory units 1624A-1624N, allowing partition units 2160A-1620N to write portions of each render target in parallel to efficiently use the available bandwidth of parallel processor memory 1622. In some embodiments, a local instance of the parallel processor memory 1622 may be excluded in favor of a unified memory design that utilizes system memory in conjunction with local cache memory.

In one embodiment, any one of the clusters 1614A-1614N of the processing cluster array 1612 can process data to be written to any of the memory units 1624A-1624N within parallel processor memory 1622. The memory crossbar 1616 can be configured to route the output of each cluster 1614A-1614N to the input of any partition unit 1620A-1620N or to another cluster 1614A-1614N for further processing. Each cluster 1614A-1614N can communicate with the memory interface 1618 through the memory crossbar 1616 to read from or write to various external memory devices. In one embodiment the memory crossbar 1616 has a connection to the memory interface 1618 to communicate with the I/O unit 1604, as well as a connection to a local instance of the parallel processor memory 1622, enabling the processing units within the different processing clusters 1614A-1614N to communicate with system memory or other memory that is not local to the parallel processing unit 1602. In one embodiment the memory crossbar 1616 can use virtual channels to separate traffic streams between the clusters 1614A-1614N and the partition units 1620A-1620N.

While a single instance of the parallel processing unit 1602 is illustrated within the parallel processor 1600, any number of instances of the parallel processing unit 1602 can be included. For example, multiple instances of the parallel processing unit 1602 can be provided on a single add-in card, or multiple add-in cards can be interconnected. The different instances of the parallel processing unit 1602 can be configured to inter-operate even if the different instances have different numbers of processing cores, different amounts of local parallel processor memory, and/or other configuration differences. For example and in one embodiment, some instances of the parallel processing unit 1602 can include higher precision floating point units relative to other instances. Systems incorporating one or more instances of the parallel processing unit 1602 or the parallel processor 1600 can be implemented in a variety of configurations and form factors, including but not limited to desktop, laptop, or handheld personal computers, servers, workstations, game consoles, and/or embedded systems.

Figure 16B:
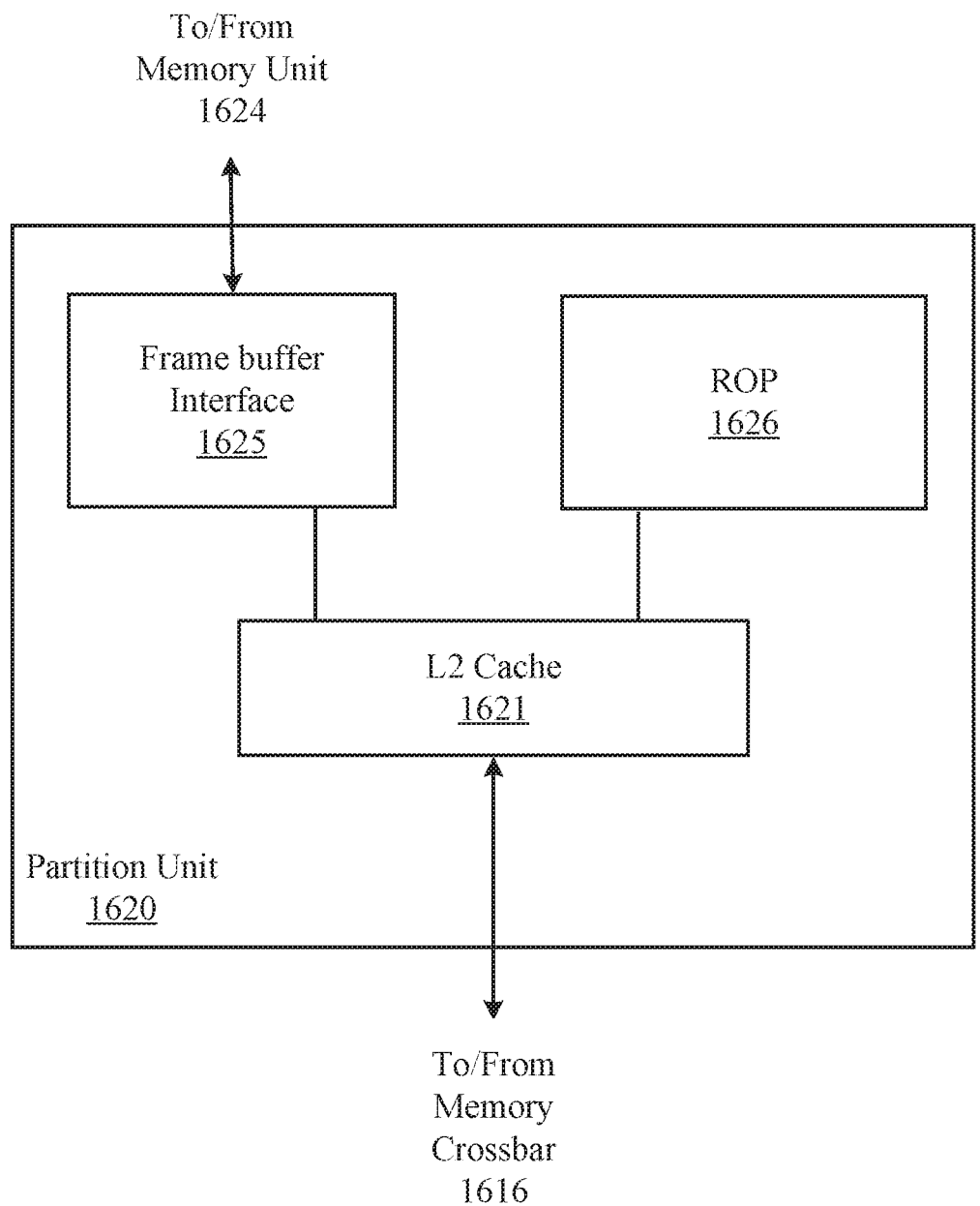

FIG. 16B is a block diagram of a partition unit 1620, according to an embodiment. In one embodiment the partition unit 1620 is an instance of one of the partition units 1620A-1620N of FIG. 16A. As illustrated, the partition unit 1620 includes an L2 cache 1621, a frame buffer interface 1625, and a ROP 1626 (raster operations unit). The L2 cache 1621 is a read/write cache that is configured to perform load and store operations received from the memory crossbar 1616 and ROP 1626. Read misses and urgent write-back requests are output by L2 cache 1621 to frame buffer interface 1625 for processing. Dirty updates can also be sent to the frame buffer via the frame buffer interface 1625 for opportunistic processing. In one embodiment the frame buffer interface 1625 interfaces with one of the memory units in parallel processor memory, such as the memory units 1624A-1624N of FIG. 16 (e.g., within parallel processor memory 1622).

In graphics applications, the ROP 1626 is a processing unit that performs raster operations, such as stencil, z test, blending, and the like, and outputs pixel data as processed graphics data for storage in graphics memory. In some embodiments, ROP 1626 may be configured to compress z or color data that is written to memory and decompress z or color data that is read from memory. In some embodiments, the ROP 1626 is included within each processing cluster (e.g., cluster 1614A-1614N of FIG. 16) instead of within the partition unit 1620. In such embodiment, read and write requests for pixel data are transmitted over the memory crossbar 1616 instead of pixel fragment data.

The processed graphics data may be displayed on display device, such as one of the one or more display device(s) 110 of FIG. 1, routed for further processing by the processor(s) 102, or routed for further processing by one of the processing entities within the parallel processor 1600 of FIG. 16A.

Figure 16C:
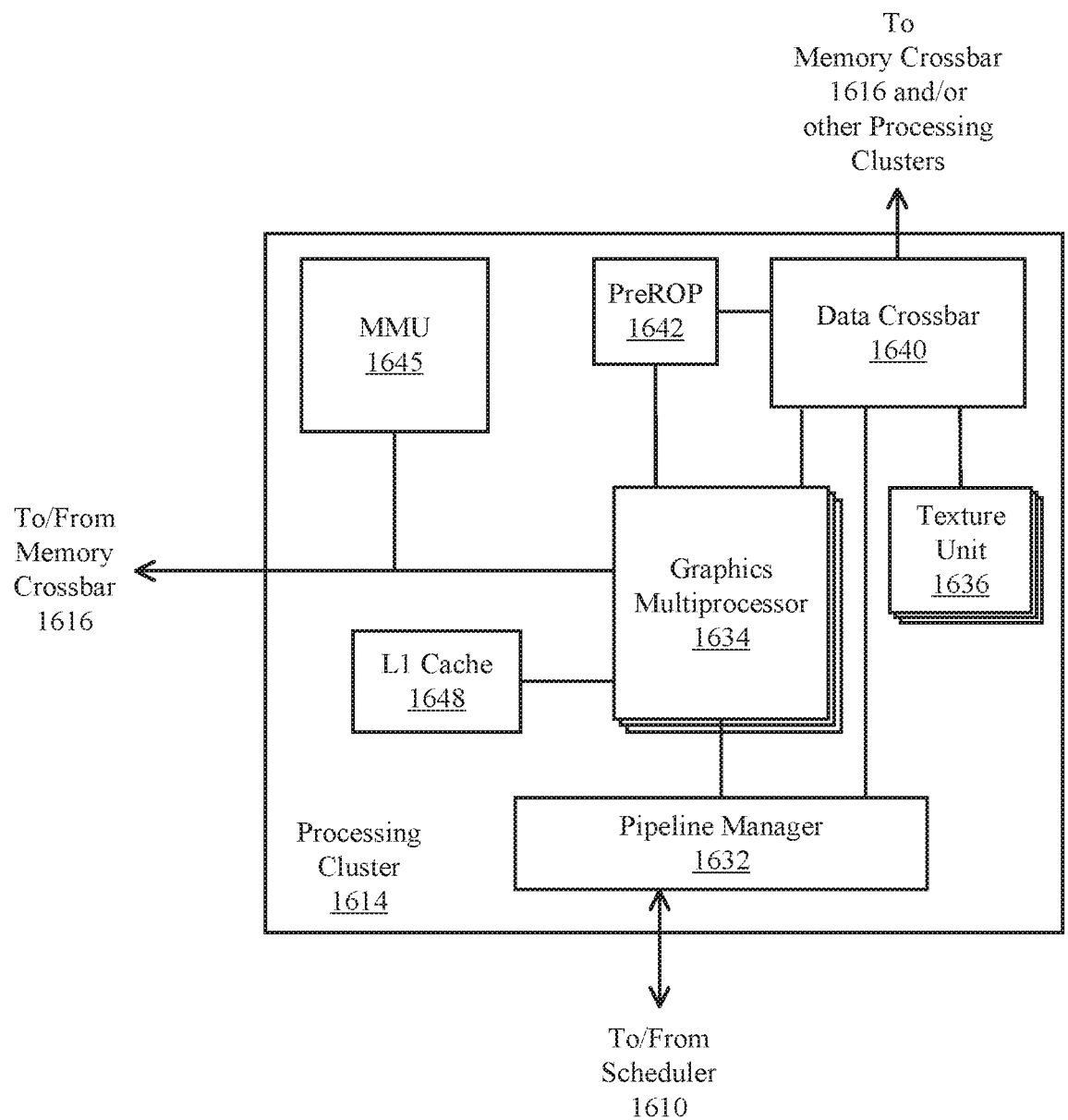

FIG. 16C is a block diagram of a processing cluster 1614 within a parallel processing unit, according to an embodiment. In one embodiment the processing cluster is an instance of one of the processing clusters 1614A-1614N of FIG. 16. The processing cluster 1614 can be configured to execute many threads in parallel, where the term "thread" refers to an instance of a particular program executing on a particular set of input data. In some embodiments, single-instruction, multiple-data (SIMD) instruction issue techniques are used to support parallel execution of a large number of threads without providing multiple independent instruction units. In other embodiments, single-instruction, multiple-thread (SIMT) techniques are used to support parallel execution of a large number of generally synchronized threads, using a common instruction unit configured to issue instructions to a set of processing engines within each one of the processing clusters. Unlike a SIMD execution regime, where all processing engines typically execute identical instructions, SIMT execution allows different threads to more readily follow divergent execution paths through a given thread program. Persons skilled in the art will understand that a SIMD processing regime represents a functional subset of a SIMT processing regime.

Operation of the processing cluster 1614 can be controlled via a pipeline manager 1632 that distributes processing tasks to SIMT parallel processors. The pipeline manager 1632 receives instructions from the scheduler 1610 of FIG. 16 and manages execution of those instructions via a graphics multiprocessor 1634 and/or a texture unit 1636. The illustrated graphics multiprocessor 1634 is an exemplary instance of an SIMT parallel processor. However, various types of SIMT parallel processors of differing architectures may be included within the processing cluster 1614. One or more instances of the graphics multiprocessor 1634 can be included within a processing cluster 1614. The graphics multiprocessor 1634 can process data and a data crossbar 1640 can be used to distribute the processed data to one of multiple possible destinations, including other shader units. The pipeline manager 1632 can facilitate the distribution of processed data by specifying destinations for processed data to be distributed vis the data crossbar 1640.

Each graphics multiprocessor 1634 within the processing cluster 1614 can include an identical set of functional execution logic (e.g., arithmetic logic units, load-store units, etc.), which may be pipelined, allowing a new instruction to be issued before a previous instruction has finished. Any combination of functional execution logic may be provided. In one embodiment, the functional logic supports a variety of operations including integer and floating point arithmetic (e.g., addition and multiplication), comparison operations, Boolean operations (AND, OR, XOR), bit-shifting, and computation of various algebraic functions (e.g., planar interpolation, trigonometric, exponential, and logarithmic functions, etc.); and the same functional-unit hardware can be leveraged to perform different operations.

The series of instructions transmitted to the processing cluster 1614 constitutes a thread, as previously defined herein, and the collection of a certain number of concurrently executing threads across the parallel processing engines (not shown) within an graphics multiprocessor 1634 is referred to herein as a thread group. As used herein, a thread group refers to a group of threads concurrently executing the same program on different input data, with one thread of the group being assigned to a different processing engine within a graphics multiprocessor 1634. A thread group may include fewer threads than the number of processing engines within the graphics multiprocessor 1634, in which case some processing engines will be idle during cycles when that thread group is being processed. A thread group may also include more threads than the number of processing engines within the graphics multiprocessor 1634, in which case processing will take place over consecutive clock cycles. Each graphics multiprocessor 1634 can support up to G thread groups concurrently. Additionally, a plurality of related thread groups may be active (in different phases of execution) at the same time within a graphics multiprocessor 1634.

In one embodiment the graphics multiprocessor 1634 includes an internal cache memory to perform load and store operations. In one embodiment, the graphics multiprocessor 1634 can forego an internal cache and use a cache memory (e.g., L1 cache 308) within the processing cluster 1614. Each graphics multiprocessor 1634 also has access to L2 caches within the partition units (e.g., partition units 1620A-1620N of FIG. 16) that are shared among all processing clusters 1614 and may be used to transfer data between threads. The graphics multiprocessor 1634 may also access off-chip global memory, which can include one or more of local parallel processor memory and/or system memory. Any memory external to the parallel processing unit 1602 may be used as global memory. Embodiments in which the processing cluster 1614 includes multiple instances of the graphics multiprocessor 1634 can share common instructions and data, which may be stored in the L1 cache 308.

Each processing cluster 1614 may include an MMU 1645 (memory management unit) that is configured to map virtual addresses into physical addresses. In other embodiments, one or more instances of the MMU 1645 may reside within the memory interface 1618 of FIG. 16. The MMU 1645 includes a set of page table entries (PTEs) used to map a virtual address to a physical address of a tile (talk more about tiling) and optionally a cache line index. The MMU 1645 may include address translation lookaside buffers (TLB) or caches that may reside within the graphics multiprocessor 1634 or the L1 cache or processing cluster 1614. The physical address is processed to distribute surface data access locality to allow efficient request interleaving among partition units. The cache line index may be used to determine whether or not a request for a cache line is a hit or miss.

In graphics and computing applications, a processing cluster 1614 may be configured such that each graphics multiprocessor 1634 is coupled to a texture unit 1636 for performing texture mapping operations, e.g., determining texture sample positions, reading texture data, and filtering the texture data. Texture data is read from an internal texture L1 cache (not shown) or in some embodiments from the L1 cache within graphics multiprocessor 1634 and is fetched from an L2 cache, local parallel processor memory, or system memory, as needed. Each graphics multiprocessor 1634 outputs processed tasks to the data crossbar 1640 to provide the processed task to another processing cluster 1614 for further processing or to store the processed task in an L2 cache, local parallel processor memory, or system memory via the memory crossbar 1616. A preROP 1642 (pre-raster operations unit) is configured to receive data from graphics multiprocessor 1634, direct data to ROP units, which may be located with partition units as described herein (e.g., partition units 1620A-1620N of FIG. 16). The preROP 1642 unit can perform optimizations for color blending, organize pixel color data, and perform address translations.

It will be appreciated that the core architecture described herein is illustrative and that variations and modifications are possible. Any number of processing units, e.g., graphics multiprocessor 1634, texture units 1636, preROPs 1642, etc., may be included within a processing cluster 1614. Further, while only one processing cluster 1614 is shown, a parallel processing unit as described herein may include any number of instances of the processing cluster 1614. In one embodiment, each processing cluster 1614 can be configured to operate independently of other processing clusters 1614 using separate and distinct processing units, L1 caches, etc.

Figure 16D:
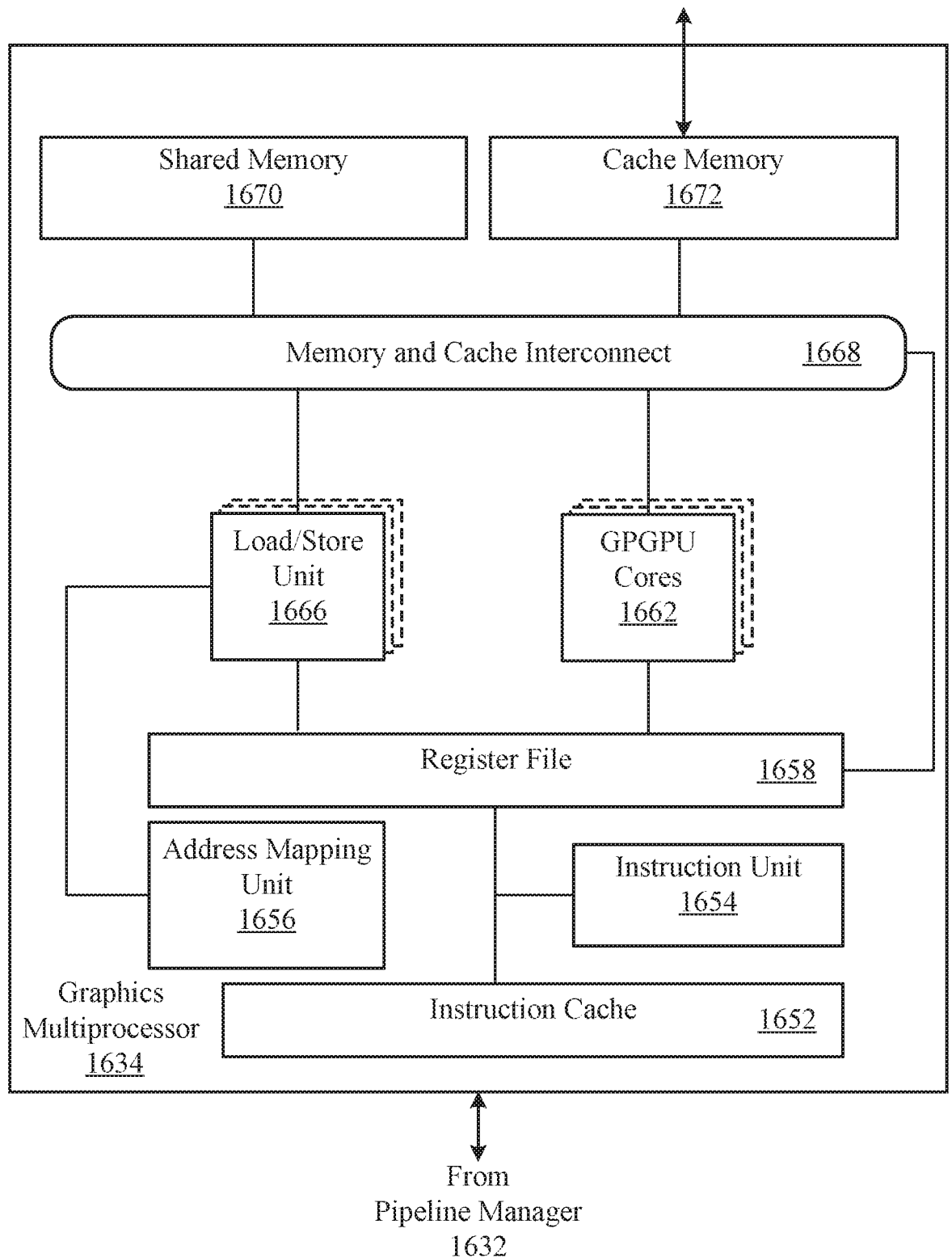

FIG. 16D shows a graphics multiprocessor 1634, according to one embodiment. In such embodiment the graphics multiprocessor 1634 couples with the pipeline manager 1632 of the processing cluster 1614. The graphics multiprocessor 1634 has an execution pipeline including but not limited to an instruction cache 1652, an instruction unit 1654, an address mapping unit 1656, a register file 1658, one or more general purpose graphics processing unit (GPGPU) cores 1662, and one or more load/store units 1666. The GPGPU cores 1662 and load/store units 1666 are coupled with cache memory 1672 and shared memory 1670 via a memory and cache interconnect 1668.

In one embodiment, the instruction cache 1652 receives a stream of instructions to execute from the pipeline manager 1632. The instructions are cached in the instruction cache 1652 and dispatched for execution by the instruction unit 1654. The instruction unit 1654 can dispatch instructions as thread groups (e.g., warps), with each thread of the thread group assigned to a different execution unit within GPGPU core 1662. An instruction can access any of a local, shared, or global address space by specifying an address within a unified address space. The address mapping unit 1656 can be used to translate addresses in the unified address space into a distinct memory address that can be accessed by the load/store units 1666.

The register file 1658 provides a set of registers for the functional units of the graphics multiprocessor 324. The register file 1658 provides temporary storage for operands connected to the data paths of the functional units (e.g., GPGPU cores 1662, load/store units 1666) of the graphics multiprocessor 324. In one embodiment, the register file 1658 is divided between each of the functional units such that each functional unit is allocated a dedicated portion of the register file 1658. In one embodiment, the register file 1658 is divided between the different warps being executed by the graphics multiprocessor 324.

The GPGPU cores 1662 can each include floating point units (FPUs) and/or integer arithmetic logic units (ALUs) that are used to execute instructions of the graphics multiprocessor 1724. The GPGPU cores 1662 can be similar in architecture or can differ in architecture, according to embodiments. For example and in one embodiment, a first portion of the GPGPU cores 1662 include a single precision FPU and an integer ALU while a second portion of the GPGPU cores include a double precision FPU. In one embodiment the FPUs can implement the IEEE 754-2008 standard for floating point arithmetic or enable variable precision floating point arithmetic. The graphics multiprocessor 1724 can additionally include one or more fixed function or special function units to perform specific functions such as copy rectangle or pixel blending operations. In one embodiment one or more of the GPGPU cores can also include fixed or special function logic, The memory and cache interconnect 1668 is an interconnect network that connects each of the functional units of the graphics multiprocessor 1724 to the register file 1658 and to the shared memory 1670. In one embodiment, the memory and cache interconnect 1668 is a crossbar interconnect that allows the load/store unit 1666 to implement load and store operations between the shared memory 1670 and the register file 1658. In one embodiment the shared memory 1670 can be used to enable communication between threads that execute on the functional units. The cache memory 1672 can be used as a data cache for example, to cache texture data communicated between the functional units and the texture unit 1636.

Figure 17A:
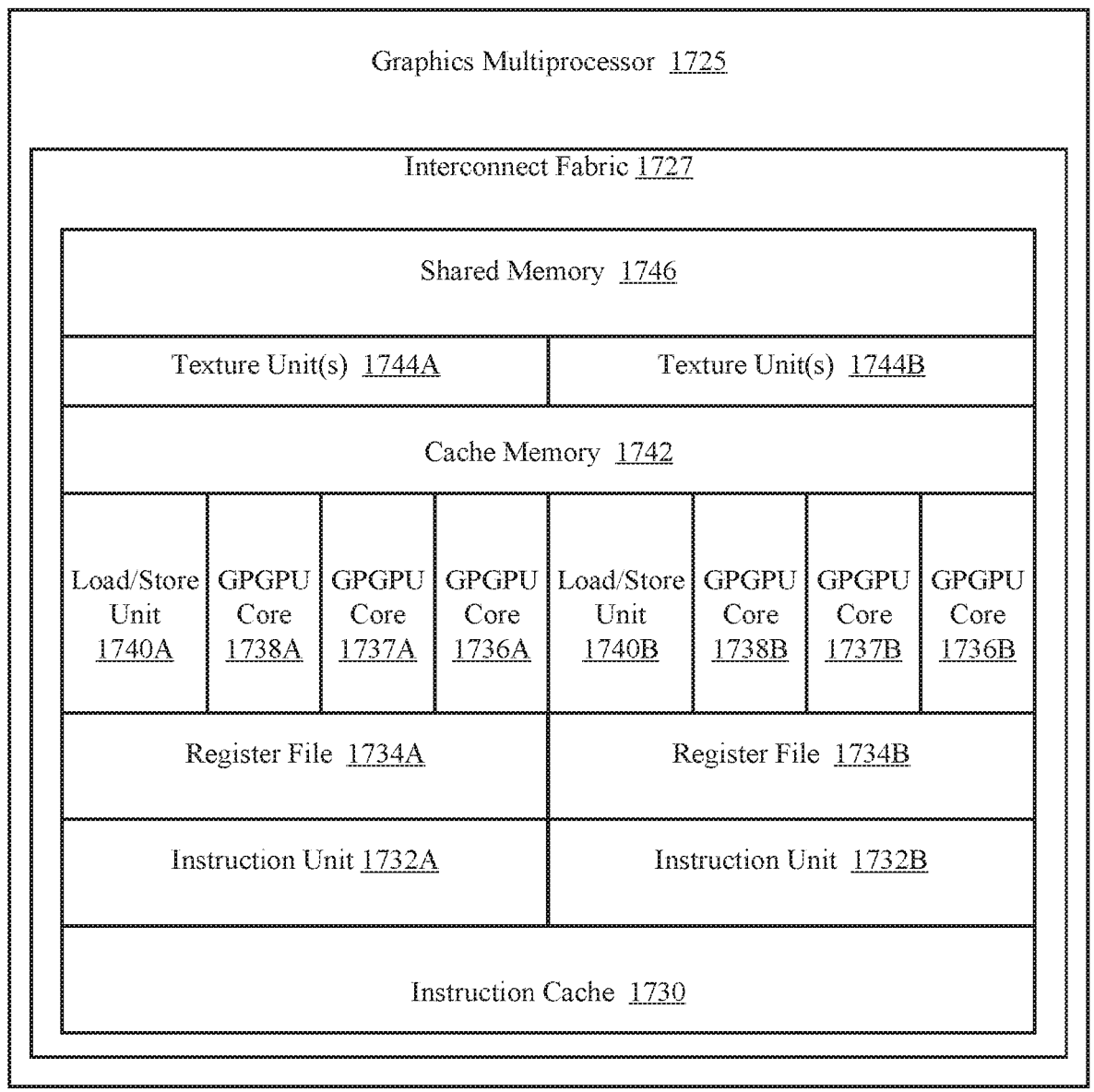
FIGS. 17A-17B is a block diagram of a processing cluster within a parallel processing unit, according to an embodiment.
Figure 17B:
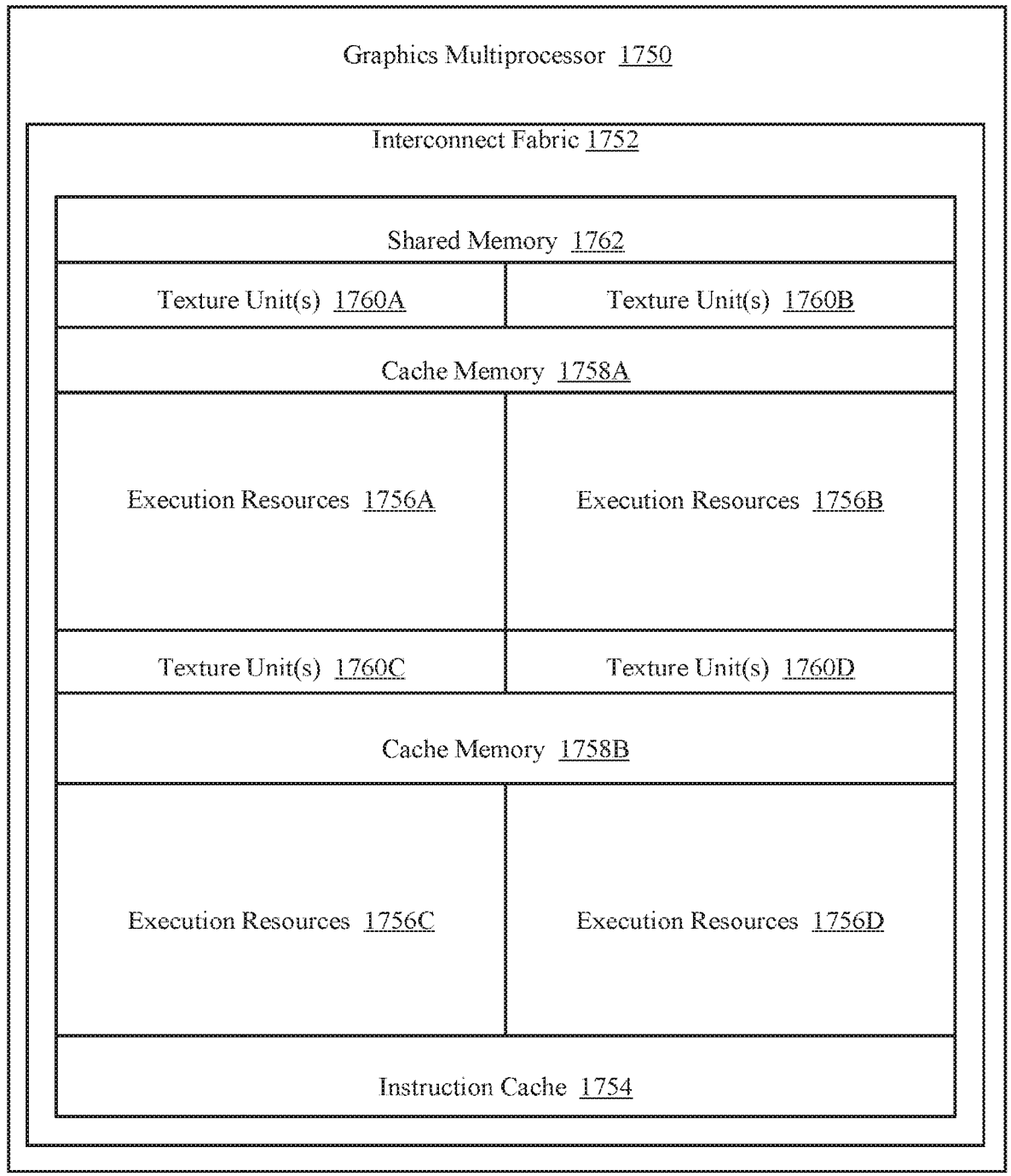

FIGS. 17A-17B illustrate additional graphics multiprocessors, according to embodiments. The illustrated graphics multiprocessors 1725, 1750 are variants of the graphics multiprocessor 1634 of FIG. 16C. The illustrated graphics multiprocessors 1725, 1750 can be configured as a streaming multiprocessor (SM) capable of simultaneous execution of a large number of execution threads.

FIG. 17A shows a graphics multiprocessor 1725 according to an additional embodiment. The graphics multiprocessor 1725 includes multiple additional instances of execution resource units relative to the graphics multiprocessor 234 of FIG. 2D. For example, the graphics multiprocessor 1725 can include multiple instances of the instruction unit 1732A-1732B, register file 1734A-1734B, and texture unit(s) 1744A-1744B. The graphics multiprocessor 1725 also includes multiple sets of graphics or compute execution units (e.g., GPGPU core 1736A-1736B, GPGPU core 1737A-1737B, GPGPU core 1738A-1738B) and multiple sets of load/store units 1740A-1740B. In one embodiment the execution resource units have a common instruction cache 1730, texture and/or data cache memory 1742, and shared memory 1746. The various components can communicate via an interconnect fabric 1727. In one embodiment the interconnect fabric 1727 includes one or more crossbar switches to enable communication between the various components of the graphics multiprocessor 1725.

FIG. 17B shows a graphics multiprocessor 1750 according to an additional embodiment. The graphics processor includes multiple sets of execution resources 1756A-1756D, where each set of execution resource includes multiple instruction units, register files, GPGPU cores, and load store units, as illustrated in FIG. 2D and FIG. 17A. The execution resources 1756A-1756D can work in concert with texture unit(s) 1760A-1760D for texture operations, while sharing an instruction cache 1754, and shared memory 1762. In one embodiment the execution resources 1756A-1756D can share an instruction cache 1754 and shared memory 1762, as well as multiple instances of a texture and/or data cache memory 1758A-1758B. The various components can communicate via an interconnect fabric 1752 similar to the interconnect fabric 1727 of FIG. 17A.

Persons skilled in the art will understand that the architecture described in FIGS. 1, 2A-2D, and 17A-17B are descriptive and not limiting as to the scope of the present embodiments. Thus, the techniques described herein may be implemented on any properly configured processing unit, including, without limitation, one or more mobile application processors, one or more desktop or server central processing units (CPUs) including multi-core CPUs, one or more parallel processing units, such as the parallel processing unit 202 of FIG. 2, as well as one or more graphics processors or special purpose processing units, without departure from the scope of the embodiments described herein.

In some embodiments a parallel processor or GPGPU as described herein is communicatively coupled to host/processor cores to accelerate graphics operations, machine-learning operations, pattern analysis operations, and various general purpose GPU (GPGPU) functions. The GPU may be communicatively coupled to the host processor/cores over a bus or other interconnect (e.g., a high speed interconnect such as PCIe or NVLink). In other embodiments, the GPU may be integrated on the same package or chip as the cores and communicatively coupled to the cores over an internal processor bus/interconnect (i.e., internal to the package or chip). Regardless of the manner in which the GPU is connected, the processor cores may allocate work to the GPU in the form of sequences of commands/instructions contained in a work descriptor. The GPU then uses dedicated circuitry/logic for efficiently processing these commands/instructions.

Techniques for GPU to Host Processor Interconnection

Figure 18A:
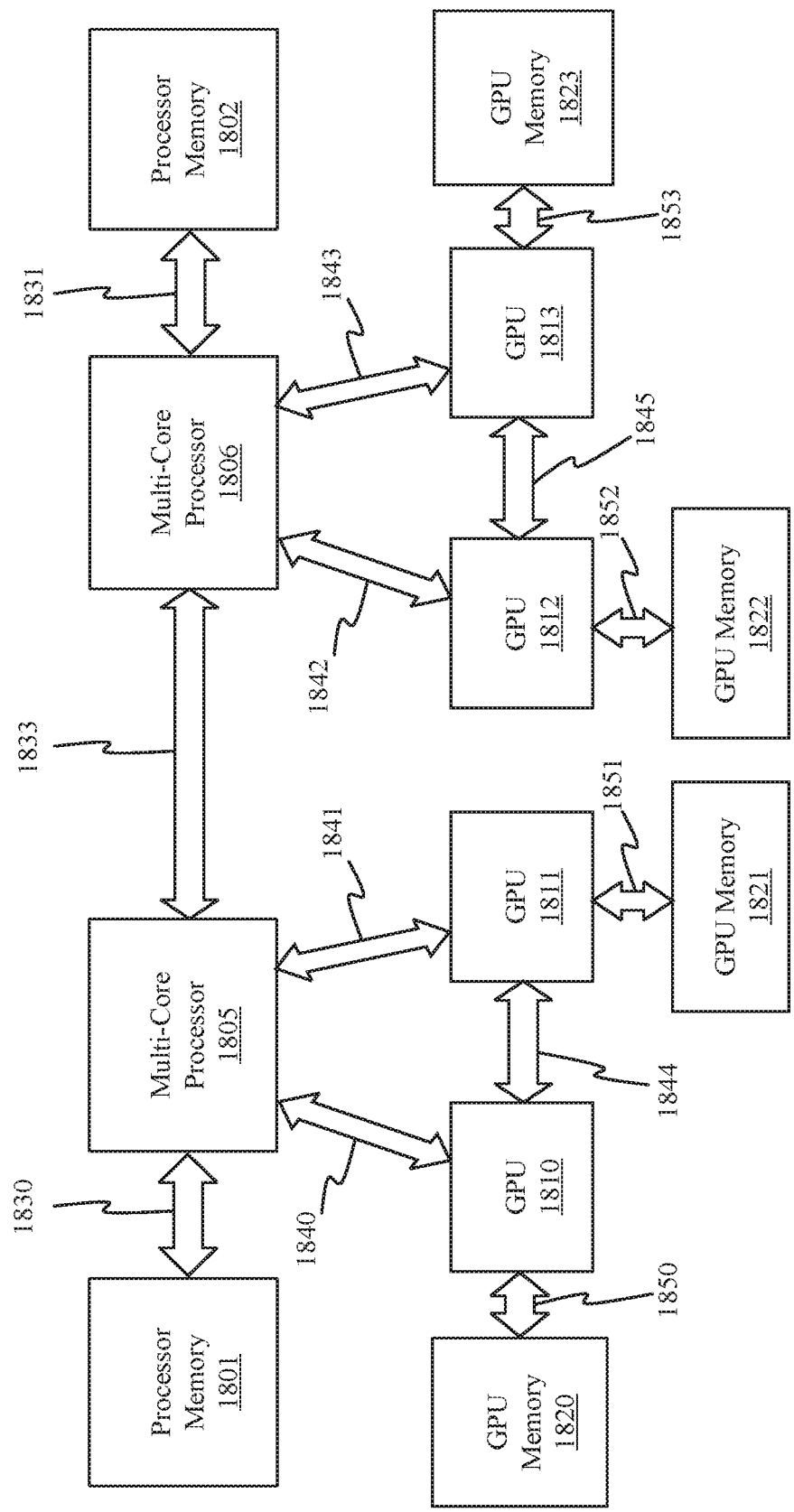
FIG. 18A-18F are block diagrams of a partition unit, according to an embodiment.

FIG. 18A illustrates an exemplary architecture in which a plurality of GPUs 1810-1813 are communicatively coupled to a plurality of multi-core processors 1805-1806 over high-speed links 1840-1843 (e.g., buses, point-to-point interconnects, etc.). In one embodiment, the high-speed links 1840-1843 support a communication throughput of 4 GB/s, 30 GB/s, 80 GB/s or higher, depending on the implementation. Various interconnect protocols may be used including, but not limited to, PCIe 4.0 or 5.0 and NVLink 2.0. However, the underlying principles of the invention are not limited to any particular communication protocol or throughput.

In addition, in one embodiment, two or more of the GPUs 1810-1813 are interconnected over high-speed links 1844-1845, which may be implemented using the same or different protocols/links than those used for high-speed links 1840-1843. Similarly, two or more of the multi-core processors 1805-1806 may be connected over high speed link 1833 which may be symmetric multi-processor (SMP) buses operating at 20 GB/s, 30 GB/s, 120 GB/s or higher. Alternatively, all communication between the various system components shown in FIG. 18A may be accomplished using the same protocols/links (e.g., over a common interconnection fabric). As mentioned, however, the underlying principles of the invention are not limited to any particular type of interconnect technology.

In one embodiment, each multi-core processor 1805-1806 is communicatively coupled to a processor memory 1801-1802, via memory interconnects 1830-1831, respectively, and each GPU 1810-1813 is communicatively coupled to GPU memory 1820-1823 over GPU memory interconnects 1850-1853, respectively. The memory interconnects 1830-1831 and 1850-1853 may utilize the same or different memory access technologies. By way of example, and not limitation, the processor memories 1801-1802 and GPU memories 1820-1823 may be volatile memories such as dynamic random access memories (DRAMs) (including stacked DRAMs), Graphics DDR SDRAM (GDDR) (e.g., GDDR5, GDDR6), or High Bandwidth Memory (HBM) and/or may be non-volatile memories such as 3D XPoint or Nano-Ram. In one embodiment, some portion of the memories may be volatile memory and another portion may be non-volatile memory (e.g., using a two-level memory (2LM) hierarchy).

As described below, although the various processors 1805-1806 and GPUs 1810-1813 may be physically coupled to a particular memory 1801-1802, 1820-1823, respectively, a unified memory architecture may be implemented in which the same virtual system address space (also referred to as the "effective address" space) is distributed among all of the various physical memories. For example, processor memories 1801-1802 may each comprise 64 GB of the system memory address space and GPU memories 1820-1823 may each comprise 32 GB of the system memory address space (resulting in a total of 256 GB addressable memory in this example).

Figure 18B:
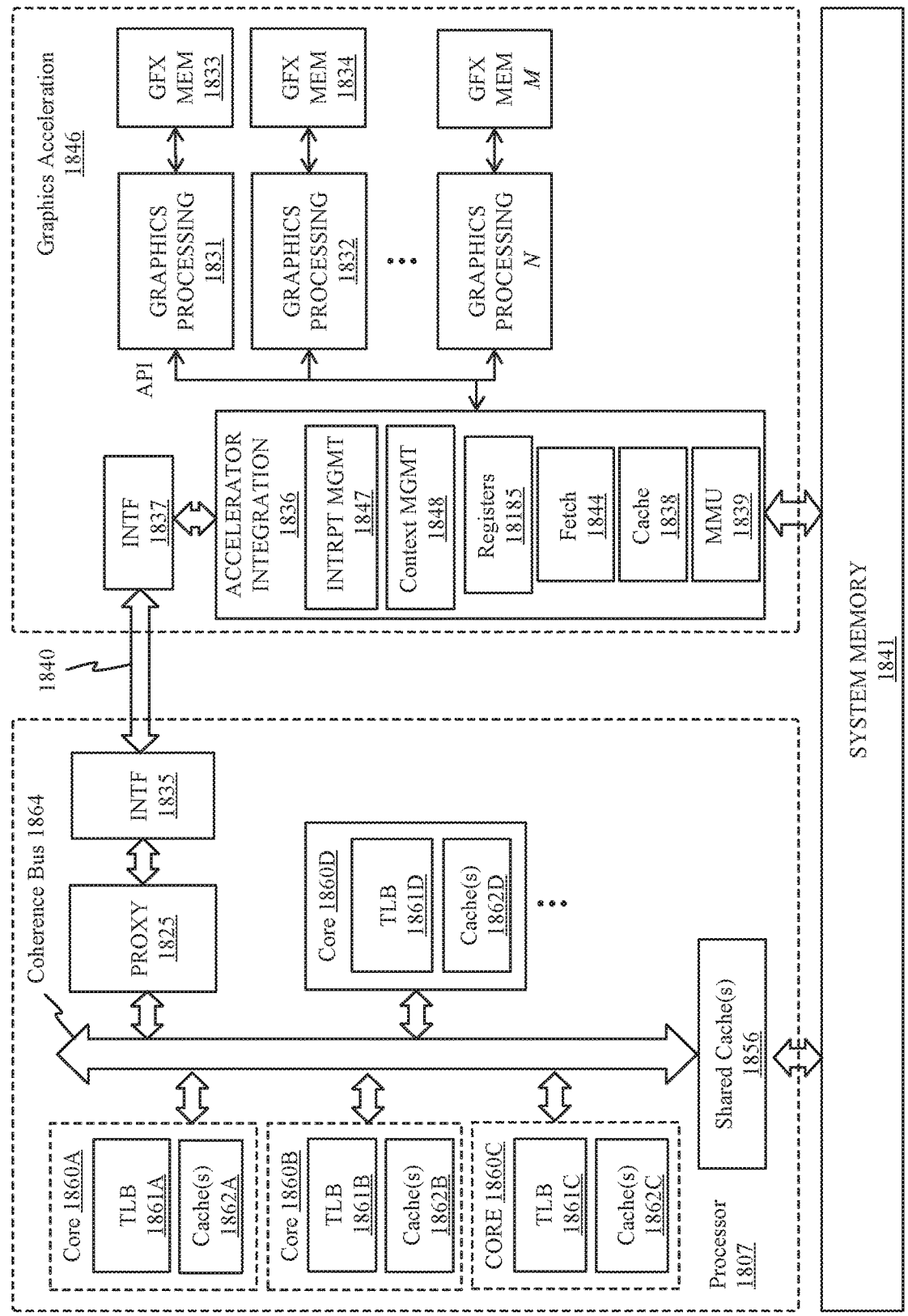

FIG. 18B illustrates additional details for an interconnection between a multi-core processor 1807 and a graphics acceleration module 1846 in accordance with one embodiment. The graphics acceleration module 1846 may include one or more GPU chips integrated on a line card which is coupled to the processor 1807 via the high-speed link 1840. Alternatively, the graphics acceleration module 1846 may be integrated on the same package or chip as the processor 1807.

The illustrated processor 1807 includes a plurality of cores 1860A-1860D, each with a translation lookaside buffer 1861A-1861D and one or more caches 1862A-1862D. The cores may include various other components for executing instructions and processing data which are not illustrated to avoid obscuring the underlying principles of the invention (e.g., instruction fetch units, branch prediction units, decoders, execution units, reorder buffers, etc.). The caches 1862A-1862D may comprise level 1 (L1) and level 2 (L2) caches. In addition, one or more shared caches 1826 may be included in the caching hierarchy and shared by sets of the cores 1860A-1860D. For example, one embodiment of the processor 1807 includes 24 cores, each with its own L1 cache, twelve shared L2 caches, and twelve shared L3 caches. In this embodiment, one of the L2 and L3 caches are shared by two adjacent cores. The processor 1807 and the graphics accelerator integration module 1846 connect with system memory 1841, which may include processor memories 1801-1802

Coherency is maintained for data and instructions stored in the various caches 1862A-1862D, 1856 and system memory 1841 via inter-core communication over a coherence bus 1864. For example, each cache may have cache coherency logic/circuitry associated therewith to communicate to over the coherence bus 1864 in response to detected reads or writes to particular cache lines. In one implementation, a cache snooping protocol is implemented over the coherence bus 1864 to snoop cache accesses. Cache snooping/coherency techniques are well understood by those of skill in the art and will not be described in detail here to avoid obscuring the underlying principles of the invention.

In one embodiment, a proxy circuit 1825 communicatively couples the graphics acceleration module 1846 to the coherence bus 1864, allowing the graphics acceleration module 1846 to participate in the cache coherence protocol as a peer of the cores. In particular, an interface 1835 provides connectivity to the proxy circuit 1825 over high-speed link 1840 (e.g., a PCIe bus, NVLink, etc.) and an interface 1837 connects the graphics acceleration module 1846 to the link 1840.

In one implementation, an accelerator integration circuit 1836 provides cache management, memory access, context management, and interrupt management services on behalf of a plurality of graphics processing engines 1831, 1832, N of the graphics acceleration module 1846. The graphics processing engines 1831, 1832, N may each comprise a separate graphics processing unit (GPU). Alternatively, the graphics processing engines 1831, 1832, N may comprise different types of graphics processing engines within a GPU such as graphics execution units, media processing engines (e.g., video encoders/decoders), samplers, and blit engines. In other words, the graphics acceleration module may be a GPU with a plurality of graphics processing engines 1831-1832, N or the graphics processing engines 1831-1832, N may be individual GPUs integrated on a common package, line card, or chip.

In one embodiment, the accelerator integration circuit 1836 includes a memory management unit (MMU) 1839 for performing various memory management functions such as virtual-to-physical memory translations (also referred to as effective-to-real memory translations) and memory access protocols for accessing system memory 1841. The MMU 1839 may also include a translation lookaside buffer (TLB) (not shown) for caching the virtual/effective to physical/real address translations. In one implementation, a cache 1838 stores commands and data for efficient access by the graphics processing engines 1831-1832, N. In one embodiment, the data stored in cache 1838 and graphics memories 1833-1834, N is kept coherent with the core caches 1862A-1862D, 1856 and system memory 1811. As mentioned, this may be accomplished via proxy circuit 1825 which takes part in the cache coherency mechanism on behalf of cache 1838 and memories 1833-1834, N (e.g., sending updates to the cache 1838 related to modifications/accesses of cache lines on processor caches 1862A-1862D, 1856 and receiving updates from the cache 1838).

A set of registers 1845 store context data for threads executed by the graphics processing engines 1831-1832, N and a context management circuit 1848 manages the thread contexts. For example, the context management circuit 1848 may perform save and restore operations to save and restore contexts of the various threads during contexts switches (e.g., where a first thread is saved and a second thread is stored so that the second thread can be execute by a graphics processing engine). For example, on a context switch, the context management circuit 1848 may store current register values to a designated region in memory (e.g., identified by a context pointer). It may then restore the register values when returning to the context. In one embodiment, an interrupt management circuit 1847 receives and processes interrupts received from system devices.

In one implementation, virtual/effective addresses from a graphics processing engine 1831 are translated to real/physical addresses in system memory 1811 by the MMU 1839. One embodiment of the accelerator integration circuit 1836 supports multiple (e.g., 4, 8, 16) graphics accelerator modules 1846 and/or other accelerator devices. The graphics accelerator module 1846 may be dedicated to a single application executed on the processor 1807 or may be shared between multiple applications. In one embodiment, a virtualized graphics execution environment is presented in which the resources of the graphics processing engines 1831-1832, N are shared with multiple applications or virtual machines (VMs). The resources may be subdivided into "slices" which are allocated to different VMs and/or applications based on the processing requirements and priorities associated with the VMs and/or applications.

Thus, the accelerator integration circuit acts as a bridge to the system for the graphics acceleration module 1846 and provides address translation and system memory cache services. In addition, the accelerator integration circuit 1836 may provide virtualization facilities for the host processor to manage virtualization of the graphics processing engines, interrupts, and memory management.

Because hardware resources of the graphics processing engines 1831-1832, N are mapped explicitly to the real address space seen by the host processor 1807, any host processor can address these resources directly using an effective address value. One function of the accelerator integration circuit 1836, in one embodiment, is the physical separation of the graphics processing engines 1831-1832, N so that they appear to the system as independent units.

As mentioned, in the illustrated embodiment, one or more graphics memories 1833-1834, M are coupled to each of the graphics processing engines 1831-1832, N, respectively.

The graphics memories 1833-1834, M store instructions and data being processed by each of the graphics processing engines 1831-1832, N. The graphics memories 1833-1834, M may be volatile memories such as DRAMs (including stacked DRAMs), GDDR memory (e.g., GDDR5, GDDR6), or HBM, and/or may be non-volatile memories such as 3D XPoint or Nano-Ram.

In one embodiment, to reduce data traffic over link 1840, biasing techniques are used to ensure that the data stored in graphics memories 1833-1834, M is data which will be used most frequently by the graphics processing engines 1831-1832, N and preferably not used by the cores 1860A-1860D (at least not frequently). Similarly, the biasing mechanism attempts to keep data needed by the cores (and preferably not the graphics processing engines 1831-1832, N) within the caches 1862A-1862D, 1856 of the cores and system memory 1811.

Figure 18C:
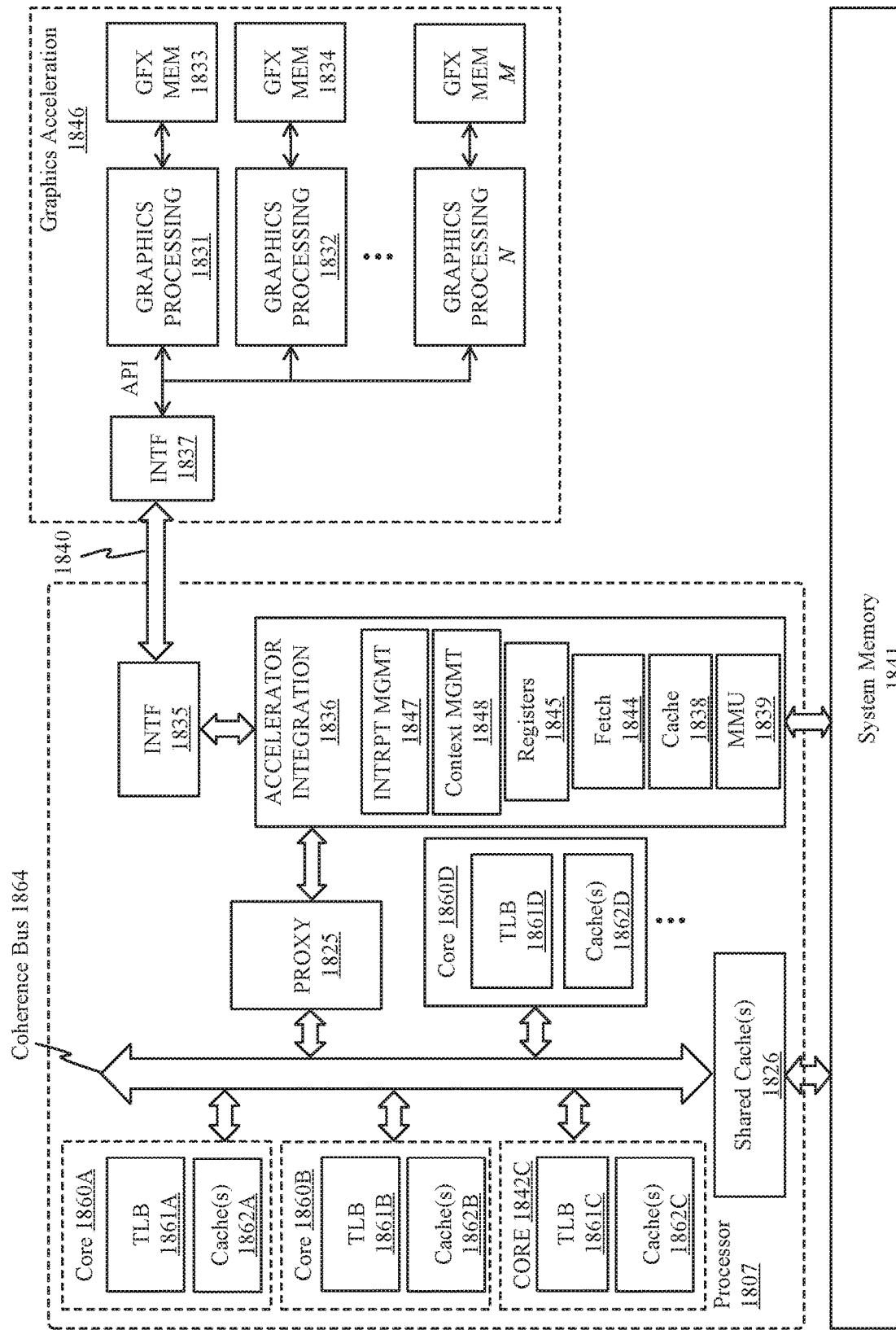

FIG. 18C illustrates another embodiment in which the accelerator integration circuit 1836 is integrated within the processor 1807. In this embodiment, the graphics processing engines 1831-1832, N communicate directly over the high-speed link 1840 to the accelerator integration circuit 1836 via interface 1837 and interface 1835 (which, again, may be utilize any form of bus or interface protocol). The accelerator integration circuit 1836 may perform the same operations as those described with respect to FIG. 18B, but potentially at a higher throughput given its close proximity to the coherency bus 1862 and caches 1862A-1862D, 1826.

One embodiment supports different programming models including a dedicated-process programming model (no graphics acceleration module virtualization) and shared programming models (with virtualization). The latter may include programming models which are controlled by the accelerator integration circuit 1836 and programming models which are controlled by the graphics acceleration module 1846.

In one embodiment of the dedicated process model, graphics processing engines 1831-1832, N are dedicated to a single application or process under a single operating system. The single application can funnel other application requests to the graphics engines 1831-1832, N, providing virtualization within a VM/partition.

In the dedicated-process programming models, the graphics processing engines 1831-1832, N, may be shared by multiple VM/application partitions. The shared models require a system hypervisor to virtualize the graphics processing engines 1831-1832, N to allow access by each operating system. For single-partition systems without a hypervisor, the graphics processing engines 1831-1832, N are owned by the operating system. In both cases, the operating system can virtualize the graphics processing engines 1831-1832, N to provide access to each process or application.

For the shared programming model, the graphics acceleration module 1846 or an individual graphics processing engine 1831-1832, N selects a process element using a process handle. In one embodiment, process elements are stored in system memory 1811 and are addressable using the effective address to real address translation techniques described herein. The process handle may be an implementation-specific value provided to the host process when registering its context with the graphics processing engine 1831-1832, N (that is, calling system software to add the process element to the process element linked list). The lower 16-bits of the process handle may be the offset of the process element within the process element linked list.

Figure 18D:
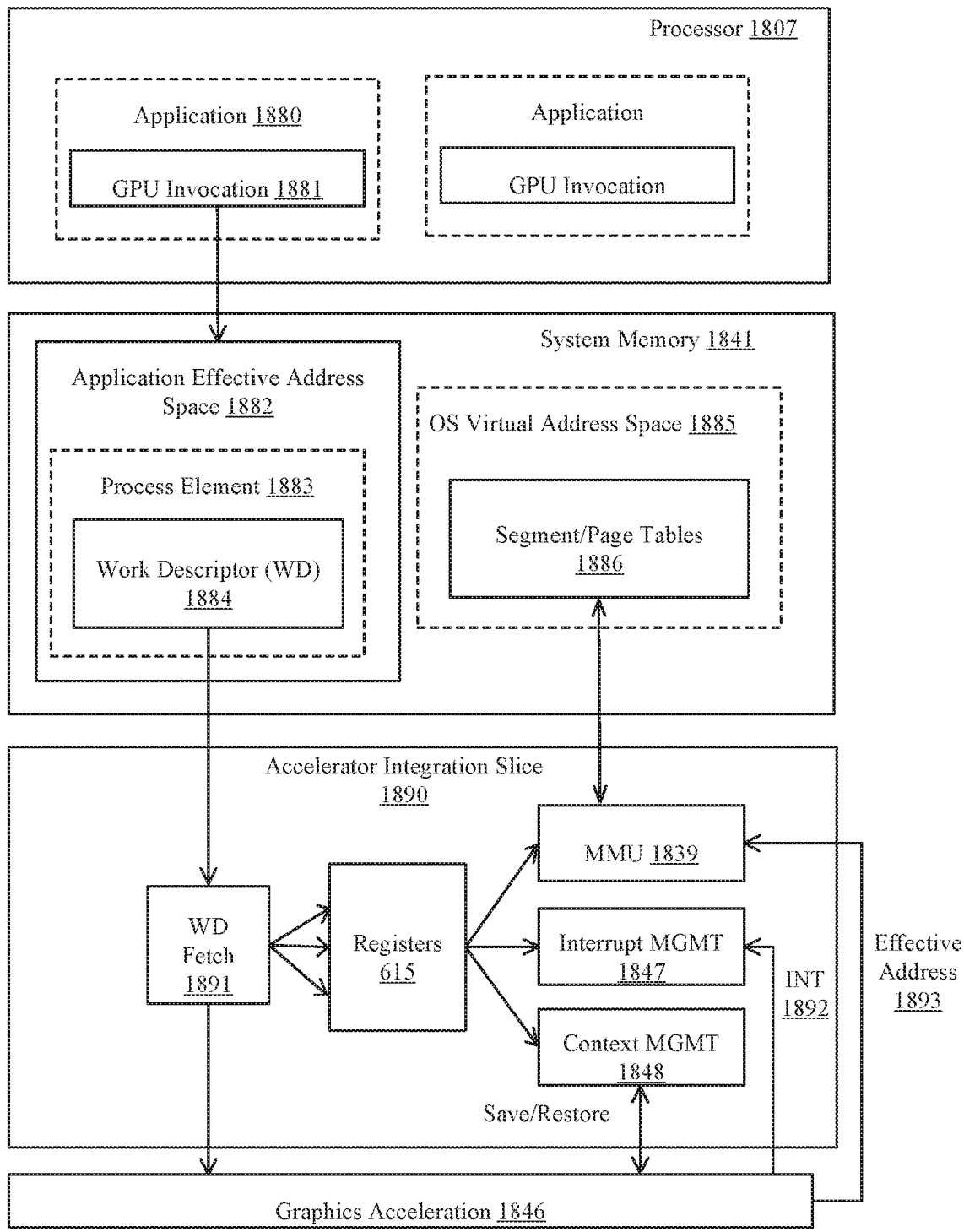

FIG. 18D illustrates an exemplary accelerator integration slice 1890. As used herein, a "slice" comprises a specified portion of the processing resources of the accelerator integration circuit 1836. Application effective address space 1882 within system memory 1811 stores process elements 1883. In one embodiment, the process elements 1883 are stored in response to GPU invocations 1881 from applications 1880 executed on the processor 1807. A process element 1883 contains the process state for the corresponding application 1880. A work descriptor (WD) 1884 contained in the process element 1883 can be a single job requested by an application or may contain a pointer to a queue of jobs. In the latter case, the WD 1884 is a pointer to the job request queue in the application's address space 1882.

The graphics acceleration module 1846 and/or the individual graphics processing engines 1831-1832, N can be shared by all or a subset of the processes in the system. Embodiments of the invention include an infrastructure for setting up the process state and sending a WD 1884 to a graphics acceleration module 1846 to start a job in a virtualized environment.

In one implementation, the dedicated-process programming model is implementation-specific. In this model, a single process owns the graphics acceleration module 1846 or an individual graphics processing engine 1831. Because the graphics acceleration module 1846 is owned by a single process, the hypervisor initializes the accelerator integration circuit 1836 for the owning partition and the operating system initializes the accelerator integration circuit 1836 for the owning process at the time when the graphics acceleration module 1846 is assigned.

In operation, a WD fetch unit 1891 in the accelerator integration slice 1890 fetches the next WD 1884 which includes an indication of the work to be done by one of the graphics processing engines of the graphics acceleration module 1846. Data from the WD 1884 may be stored in registers 1845 and used by the MMU 1839, interrupt management circuit 1847 and/or context management circuit 1846 as illustrated. For example, one embodiment of the MMU 1839 includes segment/page walk circuitry for accessing segment/page tables 1886 within the OS virtual address space 1885. The interrupt management circuit 1847 may process interrupt events 1892 received from the graphics acceleration module 1846. When performing graphics operations, an effective address 1893 generated by a graphics processing engine 1831-1832, N is translated to a real address by the MMU 1839.

In one embodiment, the same set of registers 1845 are duplicated for each graphics processing engine 1831-1832, N and/or graphics acceleration module 1846 and may be initialized by the hypervisor or operating system. Each of these duplicated registers may be included in an accelerator integration slice 1890. Exemplary registers that may be initialized by the hypervisor are shown in Table 1.

TABLE 1

Hypervisor Initialized Registers

1 Slice Control Register
2 Real Address (RA) Scheduled Processes Area Pointer
3 Authority Mask Override Register
4 Interrupt Vector Table Entry Offset
5 Interrupt Vector Table Entry Limit
6 State Register
7 Logical Partition ID
8 Real address (RA) Hypervisor Accelerator Utilization Record Pointer
9 Storage Description Register Exemplary registers that may be initialized by the operating system are shown in Table 2.

TABLE 2

Operating System Initialized Registers

1  Process and Thread Identification
2  Effective Address (EA) Context Save/Restore Pointer
3  Virtual Address (VA) Accelerator Utilization Record Pointer
4  Virtual Address (VA) Storage Segment Table Pointer
5  Authority Mask
6  Work descriptor In one embodiment, each WD 1884 is specific to a particular graphics acceleration module 1846 and/or graphics processing engine 1831-1832, N. It contains all the information a graphics processing engine 1831-1832, N requires to do its work or it can be a pointer to a memory location where the application has set up a command queue of work to be completed.

Figure 18E:
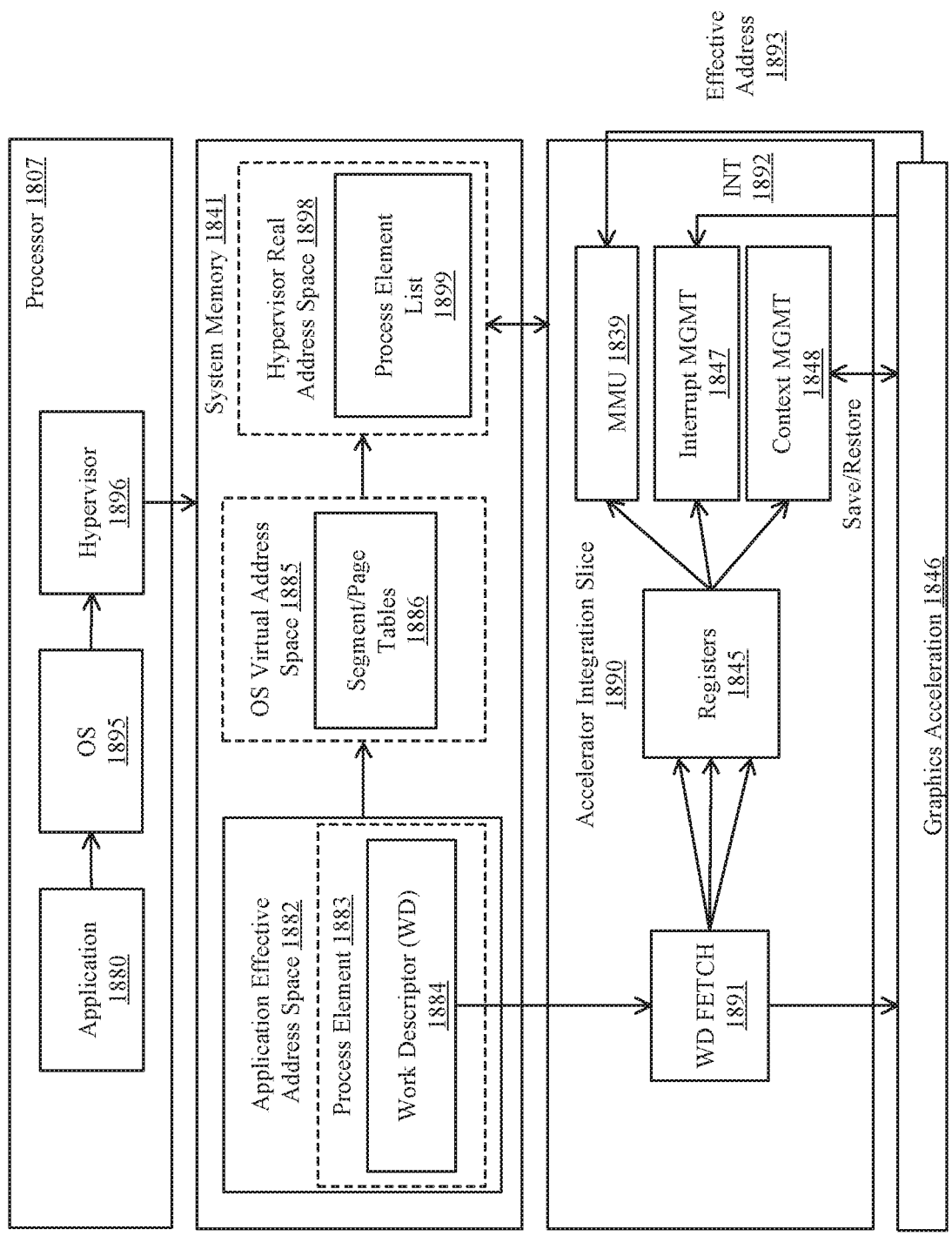

FIG. 18E illustrates additional details for one embodiment of a shared model. This embodiment includes a hypervisor real address space 1898 in which a process element list 1899 is stored. The hypervisor real address space 1898 is accessible via a hypervisor 1896 which virtualizes the graphics acceleration module engines for the operating system 1895.

The shared programming models allow for all or a subset of processes from all or a subset of partitions in the system to use a graphics acceleration module 1846. There are two programming models where the graphics acceleration module 1846 is shared by multiple processes and partitions: time-sliced shared and graphics directed shared.

In this model, the system hypervisor 1896 owns the graphics acceleration module 1846 and makes its function available to all operating systems 1895. For a graphics acceleration module 1846 to support virtualization by the system hypervisor 1896, the graphics acceleration module 1846 may adhere to the following requirements: 1) An application's job request must be autonomous (that is, the state does not need to be maintained between jobs), or the graphics acceleration module 1846 must provide a context save and restore mechanism. 2) An application's job request is guaranteed by the graphics acceleration module 1846 to complete in a specified amount of time, including any translation faults, or the graphics acceleration module 1846 provides the ability to preempt the processing of the job. 3) The graphics acceleration module 1846 must be guaranteed fairness between processes when operating in the directed shared programming model.

In one embodiment, for the shared model, the application 1880 is required to make an operating system 1895 system call with a graphics acceleration module 1846 type, a work descriptor (WD), an authority mask register (AMR) value, and a context save/restore area pointer (CSRP). The graphics acceleration module 1846 type describes the targeted acceleration function for the system call. The graphics acceleration module 1846 type may be a system-specific value. The WD is formatted specifically for the graphics acceleration module 1846 and can be in the form of a graphics acceleration module 1846 command, an effective address pointer to a user-defined structure, an effective address pointer to a queue of commands, or any other data structure to describe the work to be done by the graphics acceleration module 1846. In one embodiment, the AMR value is the AMR state to use for the current process. The value passed to the operating system is similar to an application setting the AMR. If the accelerator integration circuit 1836 and graphics acceleration module 1846 implementations do not support a User Authority Mask Override Register (UAMOR), the operating system may apply the current UAMOR value to the AMR value before passing the AMR in the hypervisor call. The hypervisor 496 may optionally apply the current Authority Mask Override Register (AMOR) value before placing the AMR into the process element 1883. In one embodiment, the CSRP is one of the registers 1845 containing the effective address of an area in the application's address space 1882 for the graphics acceleration module 1846 to save and restore the context state. This pointer is optional if no state is required to be saved between jobs or when a job is preempted. The context save/restore area may be pinned system memory.

Upon receiving the system call, the operating system 1895 may verify that the application 1880 has registered and been given the authority to use the graphics acceleration module 1846. The operating system 1895 then calls the hypervisor 1896 with the information shown in Table 3.

TABLE 3

OS to Hypervisor Call Parameters

1  A work descriptor (WD)
2  An Authority Mask Register (AMR) value (potentially masked).
3  An effective address (EA) Context Save/Restore Area Pointer (CSRP)
4  A process ID (PID) and optional thread ID (TID)
5  A virtual address (VA) accelerator utilization record pointer (AURP)
6  The virtual address of the storage segment table pointer (SSTP)
7  A logical interrupt service number (LISN)

Upon receiving the hypervisor call, the hypervisor 1896 verifies that the operating system 1895 has registered and been given the authority to use the graphics acceleration module 1846. The hypervisor 1896 then puts the process element 1883 into the process element linked list for the corresponding graphics acceleration module 1846 type. The process element may include the information shown in Table 4.

TABLE 4

Process Element Information

1  A work descriptor (WD)
2  An Authority Mask Register (AMR) value (potentially masked).
3  An effective address (EA) Context Save/Restore Area Pointer (CSRP)
4  A process ID (PID) and optional thread ID (TID)
5  A virtual address (VA) accelerator utilization record pointer (AURP)
6  The virtual address of the storage segment table pointer (SSTP)
7  A logical interrupt service number (LISN)
8  Interrupt vector table, derived from the hypervisor call parameters.
9  A state register (SR) value
10 A logical partition ID (LPID)
11 A real address (RA) hypervisor accelerator utilization record pointer
12 The Storage Descriptor Register (SDR)

In one embodiment, the hypervisor initializes a plurality of accelerator integration slice 1890 registers 1845.

Figure 18F:
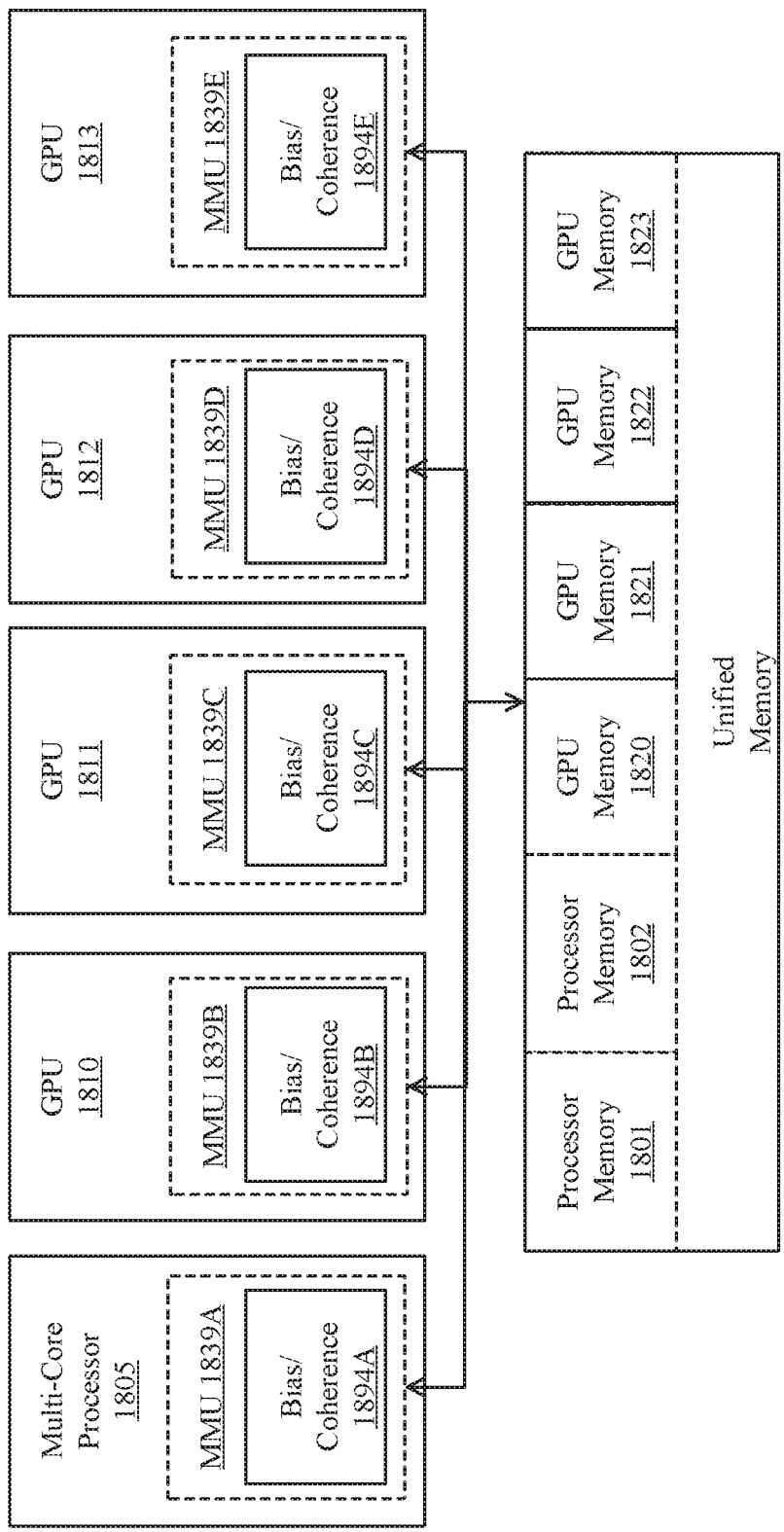

As illustrated in FIG. 18F, one embodiment of the invention employs a unified memory addressable via a common virtual memory address space used to access the physical processor memories 1801-1802 and GPU memories 1820-1823. In this implementation, operations executed on the GPUs 1810-1813 utilize the same virtual/effective memory address space to access the processors memories 1801-1802 and vice versa, thereby simplifying programmability. In one embodiment, a first portion of the virtual/effective address space is allocated to the processor memory 1801, a second portion to the second processor memory 1802, a third portion to the GPU memory 1820, and so on. The entire virtual/effective memory space (sometimes referred to as the effective address space) is thereby distributed across each of the processor memories 1801-1802 and GPU memories 1820-1823, allowing any processor or GPU to access any physical memory with a virtual address mapped to that memory.

In one embodiment, bias/coherence management circuitry 1894A-1894E within one or more of the MMUs 1839A-1839E ensures cache coherence between the caches of the host processors (e.g., 1805) and the GPUs 1810-413 and also implements biasing techniques indicating the physical memories in which certain types of data should be stored. While multiple instances of bias/coherence management circuitry 1894A-1894E are illustrated in FIG. 18F, the bias/coherence circuitry may be implemented within the MMU of one or more host processors 1805 and/or within the accelerator integration circuit 1836.

One embodiment allows GPU-attached memory 1820-1823 to be mapped as part of system memory, and accessed using shared virtual memory (SVM) technology, but without suffering the typical performance drawbacks associated with full system cache coherence. The ability to GPU-attached memory 1820-1823 to be accessed as system memory without onerous cache coherence overhead provides a beneficial operating environment for GPU offload. This arrangement allows the host processor 1805 software to setup operands and access computation results, without the overhead of tradition I/O DMA data copies. Such traditional copies involve driver calls, interrupts and memory mapped I/O (MMIO) accesses that are all inefficient relative to simple memory accesses. At the same time, the ability to access GPU attached memory 1820-1823 without cache coherence overheads can be critical to the execution time of an offloaded computation. In cases with substantial streaming write memory traffic, for example, cache coherence overhead can significantly reduce the effective write bandwidth seen by a GPU 1810-1813. The efficiency of operand setup, the efficiency of results access, and the efficiency of GPU computation all play a role in determining the effectiveness of GPU offload.

In one implementation, the selection of between GPU bias and host processor bias is driven by a bias tracker data structure. A bias table may be used, for example, which may be a page-granular structure (i.e., controlled at the granularity of a memory page) that includes 1 or 2 bits per GPU-attached memory page. The bias table may be implemented in a stolen memory range of one or more GPU-attached memories 1820-1823, with or without a bias cache in the GPU 1810-1813 (e.g., to cache frequently/recently used entries of the bias table). Alternatively, the entire bias table may be maintained within the GPU.

In one implementation, the bias table entry associated with each access to the GPU-attached memory 1820-1823 is accessed prior the actual access to the GPU memory, causing the following operations. First, local requests from the GPU 1810-1813 that find their page in GPU bias are forwarded directly to a corresponding GPU memory 1820-1823. Local requests from the GPU that find their page in host bias are forwarded to the processor 1805 (e.g., over a high speed link as discussed above). In one embodiment, requests from the processor 1805 that find the requested page in host processor bias complete the request like a normal memory read. Alternatively, requests directed to a GPU-biased page may be forwarded to the GPU 1810-1813. The GPU may then transition the page to a host processor bias if it is not currently using the page.

The bias state of a page can be changed either by a software-based mechanism, a hardware-assisted software-based mechanism, or, for a limited set of cases, a purely hardware-based mechanism.

One mechanism for changing the bias state employs an API call (e.g. OpenCL), which, in turn, calls the GPU's device driver which, in turn, sends a message (or enqueues a command descriptor) to the GPU directing it to change the bias state and, for some transitions, perform a cache flushing operation in the host. The cache flushing operation is required for a transition from host processor 1805 bias to GPU bias, but is not required for the opposite transition.

In one embodiment, cache coherency is maintained by temporarily rendering GPU-biased pages uncacheable by the host processor 1805. In order to access these pages, the processor 1805 may request access from the GPU 1810 which may or may not grant access right away, depending on the implementation. Thus, to reduce communication between the processor 1805 and GPU 1810 it is beneficial to ensure that GPU-biased pages are those which are required by the GPU but not the host processor 1805 and vice versa.

Graphics Processing Pipeline

Figure 19:
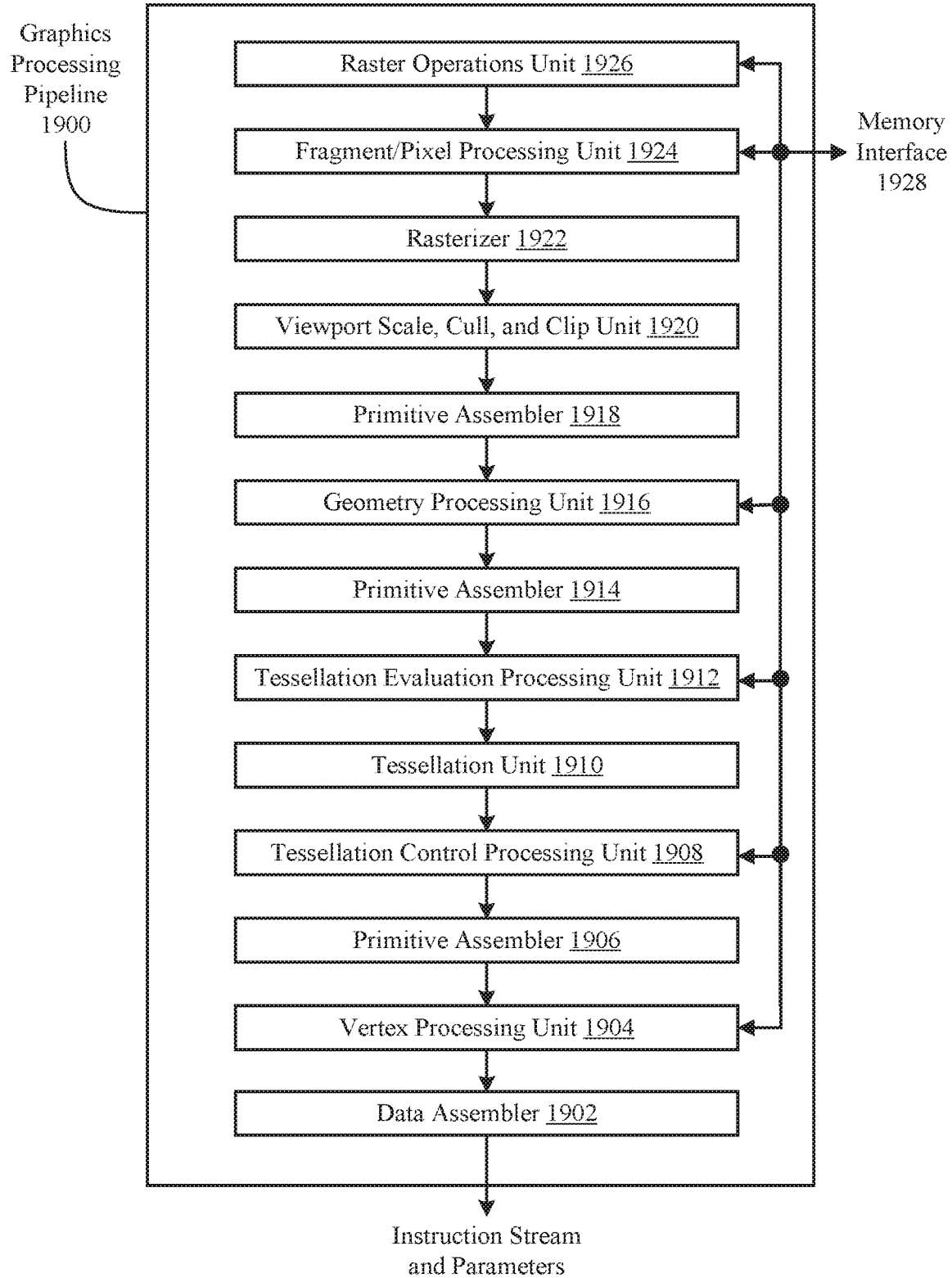
FIG. 19 is a conceptual diagram of a graphics processing pipeline, according to an embodiment.

FIG. 19 is a conceptual diagram of a graphics processing pipeline 1900, according to an embodiment. In one embodiment a graphics processor can implement the illustrated graphics processing pipeline 1900. The graphics processor can be included within the parallel processing subsystems as described herein, such as the parallel processor 200 of FIG. 16, which, in one embodiment, is a variant of the parallel processor(s) 112 of FIG. 1. The various parallel processing systems can implement the graphics processing pipeline 1900 via one or more instances of the parallel processing unit (e.g., parallel processing unit 202 of FIG. 2) as described herein. For example, a shader unit (e.g., graphics multiprocessor 234 of FIG. 3) may be configured to perform the functions of one or more of a vertex processing unit 1904, a tessellation control processing unit 1908, a tessellation evaluation processing unit 1912, a geometry processing unit 1916, and a fragment/pixel processing unit 1924. The functions of data assembler 1902, primitive assemblers 1906, 1914, 1918, tessellation unit 1910, rasterizer 1922, and raster operations unit 1926 may also be performed by other processing engines within a processing cluster (e.g., processing cluster 1614 of FIG. 17) and a corresponding partition unit (e.g., partition unit 1620A-1620N of FIG. 16). Alternately, the graphics processing pipeline 1900 may be implemented using dedicated processing units for one or more functions. In one embodiment, one or more portions of the graphics processing pipeline 1900 can be performed in by a parallel processing logic within a general purpose processor (e.g., CPU). In one embodiment, one or more portions of the graphics processing pipeline 1900 can access on-chip memory (e.g., parallel processor memory 222 as in FIG. 2) via a memory interface 1928, which may be an instance of the memory interface 1618 of FIG. 16.

In one embodiment the data assembler 1902 is a processing unit that collects vertex data for high-order surfaces, primitives, etc., and outputs the vertex data, including the vertex attributes, to the vertex processing unit 1904. The vertex processing unit 1904 is a programmable execution unit that is configured to execute vertex shader programs, lighting and transforming vertex data as specified by the vertex shader programs. For example, vertex processing unit 1904 may be programmed to transform the vertex data from an object-based coordinate representation (object space) to an alternatively based coordinate system such as world space or normalized device coordinates (NDC) space. Vertex processing unit 1904 may read data that is stored in cache, local or system memory for use in processing the vertex data.

A first instance of a primitive assembler 1906 receives vertex attributes from the vertex processing unit 1904, reading stored vertex attributes as needed, and constructs graphics primitives for processing by tessellation control processing unit 1908, where the graphics primitives include triangles, line segments, points, patches, and so forth, as supported by various graphics processing application programming interfaces (APIs).

The tessellation control processing unit 1908 treats the input vertices as control points for a geometric patch and transforms these control points from the patch's input representation, often called the patch's basis, into a representation suitable for efficient surface evaluation by the tessellation evaluation processing unit 1912. The tessellation control processing unit 1908 also computes tessellation factors for edges of geometric patches. A tessellation factor applies to a single edge and quantifies a view-dependent level of detail associated with the edge. A tessellation unit 1910 is configured to receive the tessellation factors for edges of a patch and to tessellate the patch into multiple geometric primitives such as line, triangle, or quadrilateral primitives, which are transmitted to a tessellation evaluation processing unit 1912. The tessellation evaluation processing unit 1912 operates on parameterized coordinates of the subdivided patch to generate a surface representation and vertex attributes for each vertex associated with the geometric primitives.

A second instance of a primitive assembler 1914 receives vertex attributes from the tessellation evaluation processing unit 1912, reading stored vertex attributes as needed, and constructs graphics primitives for processing by the geometry processing unit 1916. The geometry processing unit 1916 is a programmable execution unit that is configured to execute geometry shader programs, transforming graphics primitives received from primitive assembler 1914 as specified by the geometry shader programs. For example, the geometry processing unit 1916 may be programmed to subdivide the graphics primitives into one or more new graphics primitives and calculate parameters, such as plane equation coefficients, that are used to rasterize the new graphics primitives.

In some embodiments the geometry processing unit 1916 may also add or delete elements in the geometry stream. Geometry processing unit 1916 outputs the parameters and vertices specifying new graphics primitives to primitive assembler 1918, which receives the parameters and vertices from the geometry processing unit 1916, reading stored vertex attributes, as needed, and constructs graphics primitives for processing by a viewport scale, cull, and clip unit 1920. The geometry processing unit 1916 may read data that is stored in parallel processor memory or system memory for use in processing the geometry data. The viewport scale, cull, and clip unit 1920 performs clipping, culling, and viewport scaling and outputs processed graphics primitives to a rasterizer 1922.

The rasterizer 1922 scan converts the new graphics primitives and outputs fragment and coverage data to the fragment/pixel processing unit 1924. Additionally, the rasterizer 1922 may be configured to perform z culling and other z-based optimizations.

The fragment/pixel processing unit 1924 is a programmable execution unit that is configured to execute fragment shader programs or pixel shader programs. The fragment/pixel processing unit 1924 transforming fragments or pixels received from rasterizer 1922, as specified by the fragment or pixel shader programs. For example, the fragment/pixel processing unit 1924 may be programmed to perform operations such as perspective correction, texture mapping, shading, blending, and the like, to produce shaded fragments or pixels that are output to raster operations unit 1926. The fragment/pixel processing unit 1924 may read data that is stored in parallel processor memory or system memory for use in processing the fragment data. Fragment or pixel shader programs may be configured to shade at the sample, pixel, tile, or other granularity, depending on the programmed sampling rate.

The raster operations unit 1926 is a processing unit that performs raster operations, such as stencil, z test, blending, and the like, and outputs pixel data as processed graphics data for storage in graphics memory. The processed graphics data may be stored in graphics memory, e.g., parallel processor memory 222 as in FIG. 16, and/or system memory 1504 as in FIG. 15, for display on one of the one or more display device(s) 1510 or for further processing by one of the one or more processor(s) 1502 or parallel processor(s) 1512. In some embodiments the raster operations unit 1926 is configured to compress z or color data that is written to memory and decompress z or color data that is read from memory.

Ray Tracing Apparatus and Method Utilizing 4D Data Structures

As mentioned, ray tracing is a time consuming part of movie production rendering. When dealing with dynamic content, rendering of motion blur is essential for high visual quality, but also very challenging. In particular, the preferred method for rendering movies today is Monte Carlo path tracing, which handles motion blur by integrating over the camera's shutter time; i.e., any ray being traced has a certain "time" associated with it. This in turn complicates the job of the underlying ray tracing kernel in that it has to find the proper intersection for that given time stored with the ray (different rays will have different time stamps). In particular, for objects that are moving quickly (such as rotor blades, etc.) the respective primitives' locations can vary significantly over the time the shutter is open, making it significantly harder for the ray tracer to quickly find which primitives may intersect the given ray at that point in time.

The simplest form of motion blur geometry is linear motion blur, where each primitive is specified through a start- and end-point, and is interpolated linearly in-between. Many systems already have support for linear motion blur; however, for very quickly moving objects that do not move in a straight trajectory (typically, anything that is rotating quickly, such as a rotor, waving arms, a carousel, etc.), linearly interpolating between two points is not enough, so this content is specified as multi-segment motion blur, where each primitive (or vertex of a primitive) follows along a path of N linear line segments, or along some spline defined by multiple control points. This can no longer be realized efficiently with a simple linear-time motion blur bounding volume hierarchy (BVH).

Different approaches have been used to handle motion blur in rendering. For example, linear motion blur can be rendered using linearly interpolated bounds [Hou et al. 2010, Micropolygon Ray Tracing with Defocus and Motion Blur], however, this algorithm cannot handle fast curved motion as described above. In the case of multi-segment linear motion, a straightforward extension of this method to support multi-segment motion blur is to use a linear motion BVH per time segment. However, this has two major issues. First, it requires N independent linear motion blur BVHs, which is quite expensive. This is particularly an issue if different geometries use different number of time steps, as then one would have to build as many linear motion blur BVHs, as the maximal number of time steps. If one object has much more time steps than other objects, this can result in a significant overhead. Second, since each time segment essentially stores its own BVH, ray packet and ray stream traversal approaches are problematic if (as can be expected) the different rays in a packet or stream have different time steps. In this case, the packet or stream "diverges" into different BVHs right at the first traversal step.

Instead of building a different BVH over each time segment, an alternative algorithm is to use a single, shared, BVH topology over all time segments, but store multiple bounding volumes (e.g., one per time segment) per node [Gruenschloss et al. 2011, MSBVH: An Efficient Acceleration Data Structure for Ray Traced Motion Blur]. Each node always stores the maximal number of time segments of its children (even if the amount of motion is low), which again results in increased memory consumption. Also, this approach is typically limited to power of two time segments. Further, a single topology cannot be optimal for each time step of some motion. E.g. if two objects are close together in time step A, but are far apart in time step B, then a good topology for time step A might put the objects into the same leaf node, but the topology for B should best keep the objects separated.

A different approach relies on a 4D kd-tree, in which time splitting nodes are introduced [Olsson 2007, Ray-Tracing Time-Continuous Animations using 4D KD-Trees]. The advantage of this approach is that it introduces time splits only where necessary. However, kd-trees cannot efficiently handle linear motion in the first place, making many time splits necessary, and thus the data structure inefficient.

Finally, rather than rendering one frame over the entire shutter time, the renderer could render a separate frame for each time segment, and average/blend those partial frames. In each frame it can then use linear motion blur. However, this approach is highly inconvenient for the renderer, and limits what the renderer can do (e.g., it can no longer easily do post-frame filtering); it also requires the renderer to re-build a different BVH for each of the N frames, and to re-compute all other per-frame data for each such time region (which often does not make sense).

One embodiment of the invention uses a 4-dimensional (4D) bounding volume hierarchy (BVH) that combines the concept of linearly blended bounding boxes with the concept of time splits. More specifically, "time split nodes" are inserted into the BVH hierarchy. Each time split node specifies that each of its children will, from that node on, only encode geometry for a specific sub-range of time, significantly restricting the motion inside this subtree (and ideally allowing this subtree to use linear motion blur), while restricting the use of such nodes to only those regions of the BVH that actually require this time resolution.

The embodiments of the invention include three parts: (I) a new data structure, (II) hardware and/or software for building that data structure, and (III) hardware/software for traversing rays through that data structure.

I. Data Structure

One embodiment of the data structure is a bounding volume hierarchy with two node types: spatial nodes and temporal nodes. Spatial nodes store, for each child, 3D spatial bounding volumes (just like regular BVHs do); either using a single bounding box, an oriented bounding box, or linearly blended bounding boxes. Temporal nodes specify, for each child, a range of time that the subtree of this child will represent. All spatial nodes inside that child's subtree will then only bound space for the primitives' motion in that range of time. Alternatively, rather than using two separate node types a single node type may be used that stores, for each child, both spatial bounds (possibly linearly blended) and temporal bounds.

Figure 20:
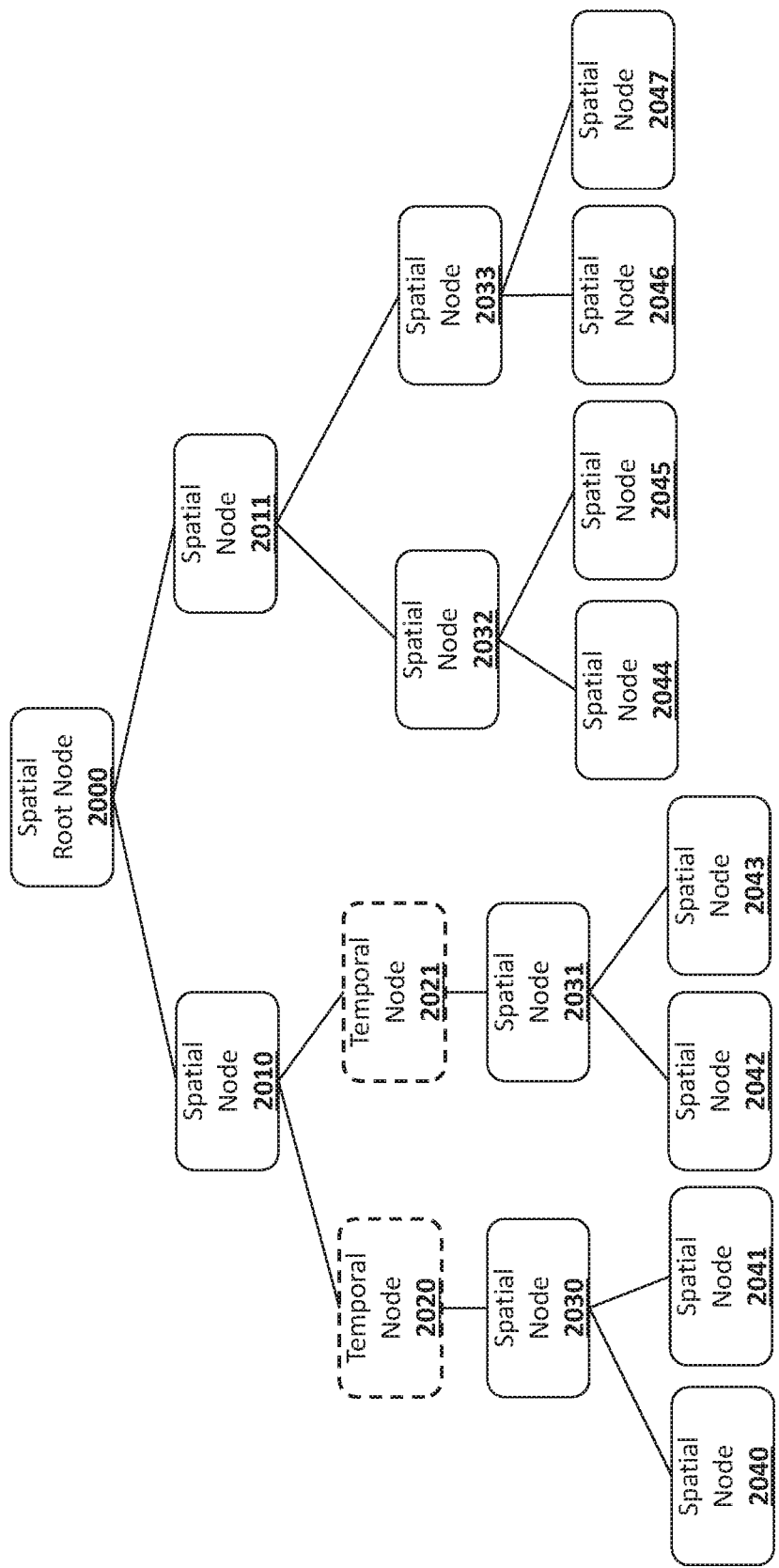
FIG. 20 illustrates one embodiment of a bounding volume hierarchy comprising a plurality of temporal and spatial nodes.

FIG. 20 illustrates an exemplary node structure with spatial nodes and temporal nodes. In the illustrated embodiment, spatial root node 2000 includes two child spatial nodes 2010-2011. For example, spatial root node 2000 may comprise a primary bounding volume enclosing all primitives for which ray tracing is being performed. Spatial node 2010 represents a first portion of the primary bounding volume and spatial node 2011 represents a second portion of the primary bounding volume (e.g., dividing the spatial root node 2000 in two).

Temporal nodes 2020-2021 are positioned beneath spatial node 2010 and temporal nodes 2022-2023 are positioned beneath spatial node 2011. In one embodiment, each temporal node 2020-2023 represents a range of time that its subtree represents. For example, temporal node 2020 may represent a sub-tree for time range $t_{range0}=t_0$ to $t_1$ while temporal node 2021 may represent a sub-tree for time range $t_{range1}=t_1$ to $t_2$. Thus, when traversing the BVH, when temporal nodes 2020 and 2021 are reached, a determination is made as to whether their sub-trees should be traversed based on a timestamp associated with one or more rays (as mentioned, each ray or ray group may be associated with a timestamp). If the timestamp falls within $t_0$ to $t_1$ then spatial node 2030 will be traversed, including traversal of child nodes 2040-2041. Conversely if the timestamp falls within range=$t_1$ to $t_2$ then spatial nodes 2031 will be traversed including child spatial nodes 2042-2043. In this manner, the BVH is effectively subdivided based on temporal information.

Figure 21:
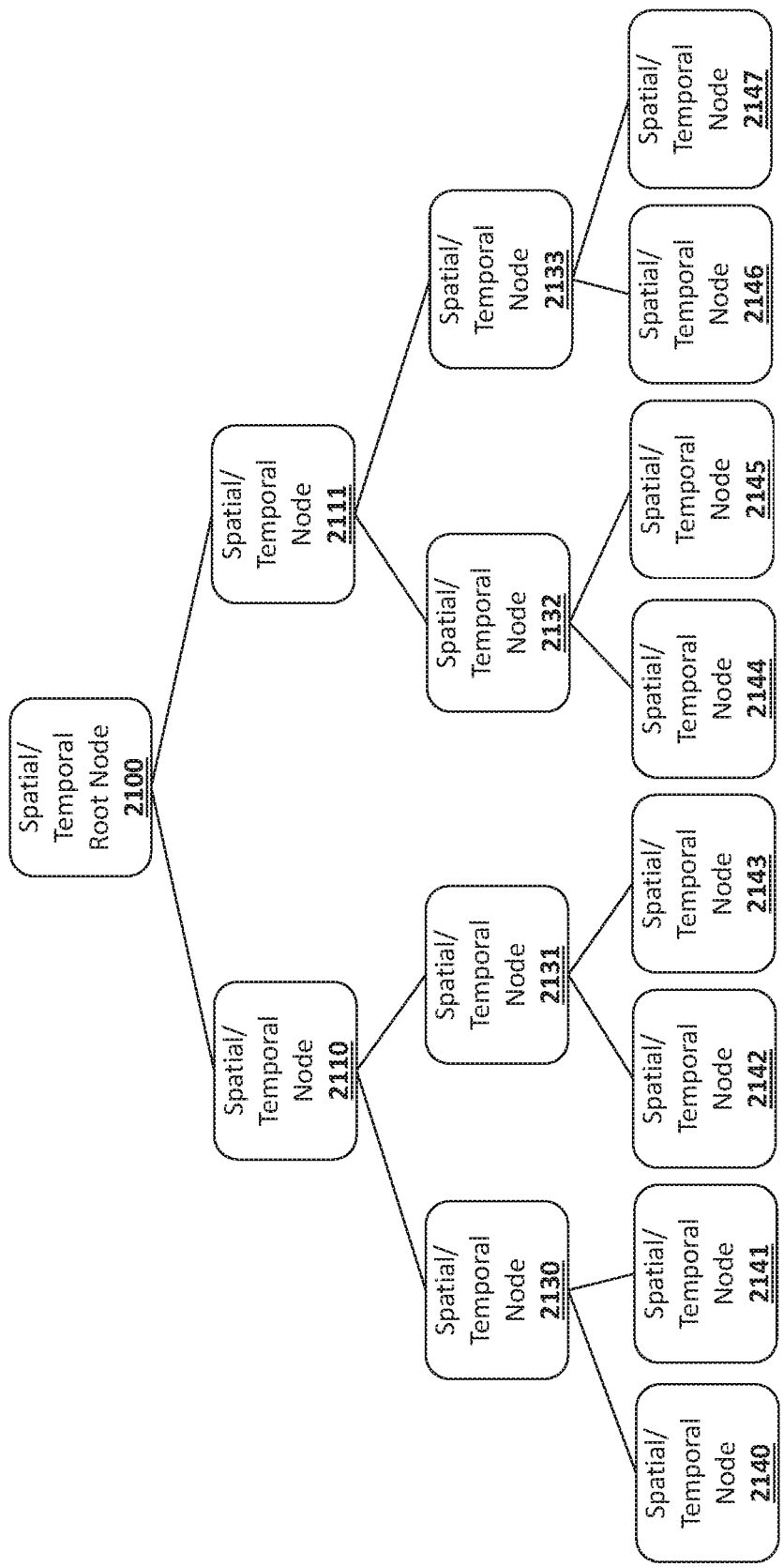
FIG. 21 illustrates another embodiment of a bounding volume hierarchy comprising a plurality nodes containing spatial and temporal data.

FIG. 21 illustrates an alternative implementation in which each node may include both spatial and temporal data. For example, spatial/temporal root node 2100 includes bounding volume data indicating a bounding volume enclosing all primitives in a designated region and also includes temporal data specifying a particular range of time for which the BVH is valid. Similarly, spatial/temporal nodes 2110-2111 each include spatial data (defining a sub-volume within the volume defined by node 2100) and temporal data specifying a range of time for which each respective sub-tree is valid. For example, if the timestamp of a ray or group of rays falls within a range specified by spatial/temporal node 2110, then traversal will continue through spatial/temporal nodes 2130-2131 and 2140-2143. Similarly, if the timestamp of the ray or group of rays falls within a range specified by spatial/temporal node 2111, then traversal will continue through spatial/temporal nodes 2132-2133 and 2144-2147. In this way, large portions of the BVH may be bypassed in accordance with the temporal data.

At least two options may be used to store the linearly blended bounds for a time segment [t0, t1]:

1) Bounds L0 and L1 are stored, such that linearly blending these bounds with the normalized time t'=(t-t0)/(t1-t0) encloses the child at time t. Here t0 to t1 is the time-segment belonging to the child bounded with L0 and L1.

2) Bounds G0 and G1 may be stored, such that linearly blending these bounds with the global time t encloses the child at time t.

Figure 22:
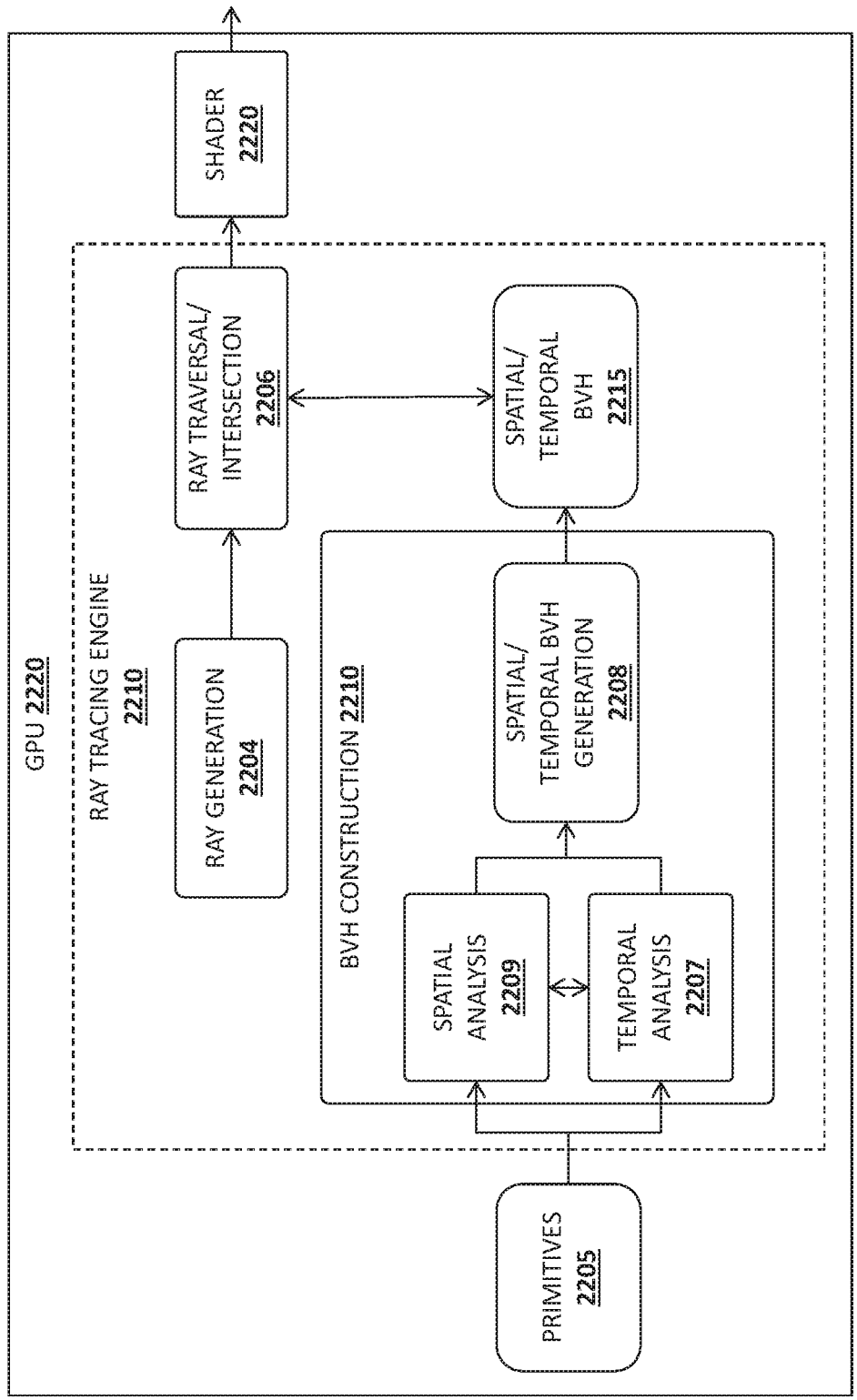
FIG. 22 illustrates an architecture in accordance with one embodiment of the invention.

FIG. 22 illustrates an exemplary architecture of a GPU 2220 with a ray tracing engine 2210 for constructing and using a spatial/temporal BVH 2215. In particular, BVH construction module 2210 includes a spatial analysis component 2209 to perform spatial analysis of the set of input primitives 2205 and temporal analysis module 2207 performs a temporal analysis based on animation data associated with the input primitives 2205 (e.g., based on the motion of the primitives across multiple time steps). Using the analysis performed by the spatial analysis module 2209 and temporal analysis module 2207, a spatial/temporal BVH generation module 2208 generates the spatial/temporal BVH (e.g., such as described with respect to FIGS. 20-21).

In one embodiment, a ray generation module 2204 generates sets of rays which a ray traversal/intersection unit 2206 traverses through the spatial/temporal BVH 2215, using a time attached to the ray. The results may be shaded by a shader 2220 and stored in a frame buffer for display.

II. Build Algorithm

In one embodiment, the BVH build algorithm implemented by the BVH construction module 2210 implements spatial partitions and temporal partitions as discussed below.

a. Spatial Partitions

The spatial partitioning performed by the spatial analysis module 2209 and/or spatial/temporal BVH generation module 2208 should partition a list of build primitives AB into two sets A and B in a way that minimize the motion blur surface area heuristic (MBSAH). That motion blur surface area heuristic is a generalization of some general surface area heuristic (SAH):

$$SAH(A,B)=C\_T+P(A)*|A|*C\_I+P(B)*|B|*C\_I$$

Here A and B denote two disjoint sets of primitives and AB is the original unsplit set containing the primitives from A and B. |A| and |B| are the size of the sets A and B. C_T and C_I are some implementation dependent constants. P(A) and P(B) are estimates of the probability that the bounds of the primitives A or B are hit. State of the art techniques use the surface areas of the bounding boxes to compute probability estimates and the number of primitives as size of the sets:

$$SAH(A,B)=SA(AB)*C\_T+SA(A)*|A|*C\_I+SA(B)*|B|*C\_I,$$

where SA(AB), SA(A), and SA(B) are the surface areas of the bounds of the primitives AB, A, and B.

Our motion blur surface area heuristic is different:

$$MBSAH(A,V)=SA(\text{linear\_bounds}(AB))*|T(AB)|*C\_T+$$
$$SA(\text{linear\_bounds}(A))*|T(A)|*|A|*C\_I+$$
$$SA(\text{linear\_bounds}(B))*|T(B)|*|B|*C\_I.$$

We essentially use the product of the surface area of the bounding box with the size of the time range for estimating the probability, and introduce a different way of calculating the size of the sets.

T(AB) is a time range associated with the original set AB, and T(A) and T(B) are the time ranges of A and B. As we do not split time here, these ranges are identical (T(AB)=T(A)=T(B)). |T(AB)|, |T(A)|, and |T(B)| denote the size of the time ranges. Each primitive may have multiple time segments. As size of the sets (|A| and |B|) we use the sum of the number of time segments over all primitives in these sets. We only count time segments that overlap the time range associated to the set. The linear bounds linear_bounds (X) for a set of build primitives X is a pair of bounds (B0,B1), which, linearly interpolated, bound the contained primitives at all times in the time range T(X) associated to the set. The expected surface area of such a pair of bounds is the averaged area over all times:

$$SA(B0,B1)=\text{integral}(t=0\ldots 1,SA((1.0f-t)*B0+t*B1))$$

For efficiency reasons the following approximation may be used:

$$SA(B0,B1)\approx 0.5*(SA(B0)+SA(B1))$$

Current approaches which attempt to find some partitioning that minimizes the surface area heuristic are so called "scan approaches" or "binning approaches". The former ones iterate over all dimensions x, y, z, sort the primitive centers along that dimension, and test the SAH of all splits into left and right sets of this sorted list at any location. The latter ones iterate over all dimensions, but insert the build primitives into a set of bins. After that the bins contain the merged bounding box of all primitives that fall into the bin, such that the SAH can be evaluated for the partitions at the bin boundaries.

Both approaches can be used with the modified surface area heuristic described herein, some differences being:

1) One always treats pairs of bounds instead of single bounding boxes. Thus after binning for instance, a bin contains a pair of merged bounding boxes, whose linear interpolation encloses the geometry that fell into the bin.

2) The scanning and binning approaches need the center of some bounding box. The center of the bounding box is chosen at some time t. This provides a further dimension to minimize the SAH over, or some time for binning could just be selected (e.g., by using the center of the linear bounding box interpolated to the center time).

b. Temporal Partitions

The temporal partitions generated by temporal analysis module 2207 should partition time into two time ranges T(A) and T(B) as well as sets of primitives A and B that are active in that time range, such that the motion blur surface area heuristic is minimized.

In contrast to spatial partitions, T(AB), T(A), and T(B) are no longer identical, as the time range T(AB) got split into non-overlapping time ranges T(A) and T(B). Further, the sets A and B are typically not disjoint as most primitives are valid in both time segments. Good candidate times to use to split T(AB) are boundaries between time segments of the stored primitives. The implementation may for instance calculate the maximal number of time segments used by the primitives in T(AB), and split at discrete time locations associated with this maximal number of time segments. The implementation may also find the number of time segments of most primitives in T(AB), and split at the discrete locations associated with that number of time segments.

To perform the SAH calculation, the linear bounds for the time ranges T(A) and T(B) have to be calculated for each primitive (in order to calculate the linear bounds of the sets A and B over the time ranges T(A) and T(B), linear_bounds (A) and linear_bounds(B)). To calculate linear bounds for some time range for a primitive, linear bounds for a sequence of bounds B_0, B_1, . . . , B_t have to get calculated (as multiple time steps of the primitive might fall into the time range and to handle border cases properly). The calculation for the upper bounds is sketched in one dimension; lower bounds and more dimensions work similarly.

To find linear upper bounds for a sequence of values a0, a_t, a start value b0 at t0 is chosen and an end value b1 at t1 is chosen, such as b0=a_0 and b1=a_t for instance. When linearly interpolated, these two values make a line. The line will typically not be an upper bound of all values a_i. However, the line can be corrected by moving it upward until it is an upper bound. The following algorithm illustrates the approach:

```
b0 = a_0
b1 = a_t
db = 0
for i in 0 ... t
{
   x = i/t;              // x is the normalized time for item i
   b = (1.0f-x) * b0 + x*b1; // interpolates initial bounds to time x
   db = max(db,a_i-b)    // calculates maximal error to a_i
}
b0 += db // move line upward
b1 += db
```

If different forms of spatial bounding nodes are supported (e.g., single AABB, linearly interpolated AABB, and oriented bounding boxes) then the build code can furthermore decide which of those node types to pick based on the trade-off in memory to store this node (or cost to process the node) vs expected chance of hitting this node. For example, in a region where there is zero to very low motion the builder may decide to create a single AABB node (or, in case of a highly oriented geometry such as hair, a single OBB); while in other regions it may use linearly interpolated bounds. Similarly, if a subtree is built over more than one time segment (which is perfectly possible), that subtree may use a single AABB that bounds motion over the entirety of those multiple time segments, and may only switch to linearly interpolated AABBs once a subtree only encodes a single time interval.

III. Traversal

In one embodiment, the ray traversal/intersection unit 2206 traverses a ray through the described data structure as follows. As with a standard BVH, tests are performed recursively to determine which children a ray intersects, and these children are entered in an intersection-distance-based order. Once a leaf is reached, the geometry contained in the leaf is intersected.

Intersecting the linear bounding boxes stored in the nodes works by linearly interpolating them to the time t stored in the ray. If the nodes also store time intervals, we additionally check if the ray falls into the time interval, to decide whether we need to traverse the subtree. When time split nodes are present, these nodes do not perform spatial bounding tests, but only check the stored time intervals.

IV. Extensions a. Compression

In order to save BVH memory consumption, we could quantize the lower and upper bounds in a BVH node, e.g. using 8-bit values. Therefore we need to store the maximum extent of the combined lower and upper bounds (of all children) in each dimension. The lower and upper bounds per child are now expressed relative to this maximum extent, and store as quantized values. De-quantizing e.g. the byte value "q" works simply by evaluating v=lower_min_extent+ (float)q/255.0f*(upper_max_extent-lower_min_extent).

Similarly, the time split nodes can use a compressed/ quantized form of specifying the time bounds. In the extreme case of having a fixed, and relatively small number of time segments this could be done with only a few bits to specify the respective begin/end time interval IDs.

b. Extension to Higher-Order Motion

Though the sections above discussed this technique only for multi-segment linear motion blur, the same technique also works for higher-order interpolation techniques as long as there is a good way of computing a bounding box of an object for a given time range.

Embodiments of the invention may include various steps, which have been described above. The steps may be embodied in machine-executable instructions which may be used to cause a general-purpose or special-purpose processor to perform the steps. Alternatively, these steps may be performed by specific hardware components that contain hardwired logic for performing the steps, or by any combination of programmed computer components and custom hardware components.

As described herein, instructions may refer to specific configurations of hardware such as application specific integrated circuits (ASICs) configured to perform certain operations or having a predetermined functionality or software instructions stored in memory embodied in a non-transitory computer readable medium. Thus, the techniques shown in the figures can be implemented using code and data stored and executed on one or more electronic devices (e.g., an end station, a network element, etc.). Such electronic devices store and communicate (internally and/or with other electronic devices over a network) code and data using computer machine-readable media, such as non-transitory computer machine-readable storage media (e.g., magnetic disks; optical disks; random access memory; read only memory; flash memory devices; phase-change memory) and transitory computer machine-readable communication media (e.g., electrical, optical, acoustical or other form of propagated signals—such as carrier waves, infrared signals, digital signals, etc.). In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). The storage device and signals carrying the network traffic respectively represent one or more machine-readable storage media and machine-readable communication media. Thus, the storage device of a given electronic device typically stores code and/or data for execution on the set of one or more processors of that electronic device. Of course, one or more parts of an embodiment of the invention may be implemented using different combinations of software, firmware, and/or hardware. Throughout this detailed description, for the purposes of explanation, numerous specific details were set forth in order to provide a thorough understanding of the present invention. It will be apparent, however, to one skilled in the art that the invention may be practiced without some of these specific details. In certain instances, well known structures and functions were not described in elaborate detail in order to avoid obscuring the subject matter of the present invention. Accordingly, the scope and spirit of the invention should be judged in terms of the claims which follow.

What is claimed is:

1. A graphics processing apparatus comprising:
bounding volume hierarchy (BVH) construction circuitry to perform a spatial analysis and temporal analysis related to a plurality of input primitives and responsively generate a BVH comprising both spatial and temporal components,
wherein the spatial components include a plurality of spatial nodes hierarchically arranged in accordance with spatial subdivisions of a primary bounding volume and the temporal components comprise temporal nodes that are associated with specified temporal ranges, wherein each temporal node represents one subtree of the BVH in one time range; and
ray traversal/intersection circuitry to traverse a ray or a set of rays through the BVH in accordance with the spatial and temporal components, wherein traversal of a first ray comprises traversing through a subtree whose corresponding time range matches timing data of the first ray.

2. The graphics processing apparatus as in claim 1 wherein the ray traversal/intersection circuitry is to determine the match by comparing the timing data to first temporal components of the subtree to determine whether to traverse the first ray through one or more spatial nodes associated with the first temporal components.

3. The graphics processing apparatus as in claim 2 wherein the first temporal components comprise a range of time specified as a temporal node.

4. The graphics processing apparatus as in claim 3 wherein the range of time is specified as a temporal node having a set of child spatial nodes, the ray traversal/intersection circuitry to traverse the first ray through the set of child spatial nodes only if the timing data associated with the first ray is within the range of time specified by the temporal node.

5. A graphics processing apparatus comprising:
bounding volume hierarchy (BVH) construction circuitry to perform a spatial analysis and temporal analysis related to a plurality of input primitives and responsively generate a BVH comprising both spatial and temporal components,
wherein the spatial components include a plurality of spatial nodes hierarchically arranged in accordance with spatial subdivisions of a primary bounding volume and the temporal components comprise temporal data included in the spatial nodes identifying portions of the plurality of nodes that are associated with specified temporal ranges, wherein each temporal data represents one subtree of the BVH in one time range; and
ray traversal/intersection circuitry to traverse a ray or a set of rays through the BVH in accordance with the spatial and temporal components, wherein traversal of a first ray comprises traversing through a subtree whose corresponding time range matches timing data of the first ray.

6. The graphics processing apparatus as in claim 5 wherein the ray traversal/intersection circuitry is to determine the match by comparing the timing data to first temporal components of the subtree to determine whether to traverse the first ray through one or more spatial nodes associated with the first temporal components.

7. The graphics processing apparatus as in claim 6 wherein the first temporal components comprise a range of time specified as temporal data within one or more of the spatial nodes.

8. The graphics processing apparatus as in claim 5 wherein the temporal data comprising temporal bounds, and wherein if a first ray has timing data within the temporal bounds then a spatial node including the temporal bounds is to be traversed by the first ray.

* * * * *